US010433257B2

(12) United States Patent
Yan et al.

(10) Patent No.: US 10,433,257 B2
(45) Date of Patent: Oct. 1, 2019

(54) POWER CONTROL METHOD AND APPARATUS FOR UPLINK CONTROL CHANNEL

(71) Applicant: Huawei Technologies Co., Ltd., Shenzhen (CN)

(72) Inventors: Zhiyu Yan, Shenzhen (CN); Yongxia Lyu, Ottawa (CA); Lei Guan, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/934,682

(22) Filed: Mar. 23, 2018

(65) Prior Publication Data

US 2018/0220374 A1 Aug. 2, 2018

Related U.S. Application Data

(63) Continuation of application No. PCT/CN2015/094029, filed on Nov. 6, 2015.

(30) Foreign Application Priority Data

Sep. 25, 2015 (WO) ................ PCT/CN2015/090750

(51) Int. Cl.
*H04W 52/14* (2009.01)
*H04W 52/10* (2009.01)
(Continued)

(52) U.S. Cl.
CPC ......... *H04W 52/146* (2013.01); *H04W 52/10* (2013.01); *H04W 52/242* (2013.01);
(Continued)

(58) Field of Classification Search
CPC .................................................... H04W 52/146
See application file for complete search history.

(56) References Cited

U.S. PATENT DOCUMENTS

2013/0286948 A1* 10/2013 Gao .................... H04W 52/146 370/328
2014/0029532 A1* 1/2014 Han .................. H04W 72/0413 370/329

(Continued)

FOREIGN PATENT DOCUMENTS

CA 2926378 A1 2/2014
CN 101969685 A 2/2011

(Continued)

OTHER PUBLICATIONS

"Power control details for PUCCH format 3," 3GPP TSG RAN WG1 Meeting #63, Jacksonville, USA, R1-105914, 3rd Generation Partnership Project, Valbonne, France (Nov. 15-19, 2010).

(Continued)

*Primary Examiner* — Ankur Jain
(74) *Attorney, Agent, or Firm* — Leydig, Voit & Mayer, Ltd.

(57) ABSTRACT

A power control method and apparatus for an uplink control channel are provided. The method includes: determining, by user equipment, to send first uplink control information on a first PUCCH and in a subframe i; determining transmit power for sending the first uplink control information on the first PUCCH and in the subframe i. In the embodiments of the present invention, the transmit power is determined by using a sum of a base power adjustment value and any one of a first power adjustment value determined according to a quantity of bits of the first uplink control information.

20 Claims, 3 Drawing Sheets

User equipment determines to send first uplink control information on a first PUCCH and in a subframe *i*, where the first uplink control information includes at least one of channel state information CSI, a hybrid automatic repeat request-acknowledgment HARQ-ACK, or a scheduling request SR — S101

The user equipment determines transmit power for sending the first uplink control information on the first PUCCH and in the subframe *i*, where the transmit power is a sum of a base power adjustment value and any one of a first power adjustment value, a second power adjustment value, a third power adjustment value, a fourth power adjustment value, or a fifth power adjustment value — S102

The user equipment sends the first uplink control information on the first PUCCH by using power that is not greater than the transmit power — S103

(51) Int. Cl.
*H04W 52/24* (2009.01)
*H04W 52/58* (2009.01)
*H04W 72/12* (2009.01)

(52) U.S. Cl.
CPC ......... *H04W 52/244* (2013.01); *H04W 52/58* (2013.01); *H04W 72/12* (2013.01)

(56) References Cited

U.S. PATENT DOCUMENTS

| | | | | |
|---|---|---|---|---|
| 2014/0135055 A1* | 5/2014 | Fu | H04W 52/146 | 455/522 |
| 2014/0307643 A1* | 10/2014 | Froberg Olsson | H04L 5/0053 | 370/329 |
| 2015/0215875 A1* | 7/2015 | Nakashima | H04W 72/0473 | 370/336 |
| 2015/0264678 A1* | 9/2015 | Yin | H04W 52/22 | 370/329 |
| 2016/0353387 A1* | 12/2016 | Gao | H04W 52/146 | |

FOREIGN PATENT DOCUMENTS

| | | | |
|---|---|---|---|
| CN | 102045827 | A | 5/2011 |
| CN | 103518406 | A | 1/2014 |
| CN | 103813433 | A | 5/2014 |
| CN | 104429014 | A | 3/2015 |
| CN | 104812046 | A | 7/2015 |
| CN | 104936275 | A | 9/2015 |
| WO | 2014021753 | A2 | 2/2014 |
| WO | 2015113486 | A1 | 8/2015 |

OTHER PUBLICATIONS

"3rd Generation Partnership Project; Technical Specification Group Radio Access Network; Evolved Universal Terrestrial Radio Access (E-UTRA); Physical channels and modulation," 3GPP TS 36.211, V12.6.0, pp. 1-136, 3rd Generation Partnership Project, Valbonne, France (Jun. 2015).

"Power control for Periodic CSI and Multi-Cell HARQ-ACK Multiplexing for PUCCH format 3," 3GPP TSG-RAN WG1 #70bis, San Diego, USA, R1-124142, 3rd Generation Partnership Project, Valbonne, France (Oct. 8-12, 2012).

"3rd Generation Partnership Project; Technical Specification Group Radio Access Network; Evolved Universal Terrestrial Radio Access (E-UTRA); Physical layer procedures (Release 12)," 3GPP TS 36.213, V12.6.0, pp. 1-241, 3rd Generation Partnership Project, Valbonne, France (Jun. 2015).

"Remaining issues for PUCCH on Scell",3GPP TSG RAN WG1 Meeting #81,Fukuoka, Japan, XP050970901 R1-152461 (May 25-29, 2015).

* cited by examiner

POWER CONTROL METHOD AND APPARATUS FOR UPLINK CONTROL CHANNEL

CROSS-REFERENCE TO RELATED APPLICATIONS

This application is a continuation of International Application No. PCT/CN 2015/094029, filed on Nov. 6, 2015, which claims priority to International Application No. PCT/CN 2015/090750, filed on Sep. 25, 2015, the disclosures of which are hereby incorporated by reference in their entireties.

TECHNICAL FIELD

Embodiments of the present invention relate to the field of communications technologies, and in particular, to a power control method and apparatus for an uplink control channel.

BACKGROUND

In a Long Term Evolution (LTE) system, service transmission is based on scheduling by a network device. A basic time unit for scheduling is one subframe. One subframe includes multiple time-domain symbols. A specific scheduling process is: The network device configures multiple carriers for user equipment, where each carrier includes at least one physical uplink shared channel (PUSCH); the network device sends control information to the user equipment; the user equipment sends, according to the control information and on a PUSCH indicated by the network device, uplink data, uplink control information, or both uplink data and uplink control information; in addition, one of the multiple carriers includes a physical uplink control channel (PUCCH), and the user equipment sends uplink control information on the PUCCH.

PUCCH In the conventional art, transmit power $P_{PUCCH}(i)$ for sending, by user equipment, uplink control information on a PUCCH and in a subframe i is determined according to a formula (1):

$$P_{PUCCH}(i)=\min\left\{\begin{array}{l}P_{CMAX,c}(i),\\ P_{0\_PUCCH}+PL_c+h(n_{CQI},n_{HARQ},n_{SR})+\Delta_{F\_PUCCH}(F)+\Delta_{T\times D}(F')+g(i)\end{array}\right\},\quad(1)$$

where $P_{CMAX,c}(i)$ is maximum transmit power of the user equipment; $P_{O\_PUCCH}$ is a value configured for the user equipment by a network device by using higher layer signaling, and is used to describe target receive power of a PUCCH; $PL_c$ is a path loss that is estimated by the user equipment and that is of a downlink of a cell c in which the PUCCH is located; $n_{CQI}$, $n_{HARQ}$, and $n_{SR}$ are respectively quantities of bits of a CQI, a HARQ-ACK, and an SR that are to be fed back by the user equipment, where a total of the quantities of bits of the CQI, the HARQ-ACK, and the SR that are to be fed back by the user equipment is not greater than 22 bits; $\Delta_{F\_PUCCH}(F)$ is one of power offset values that are configured for the user equipment by the network device and that are of a format of a current PUCCH relative to a second PUCCH format; $\Delta_{TxD}(F')$ is a power adjustment value that is configured for the user equipment by the network device and that is used when the PUCCH in a first PUCCH format uses multi-antenna transmit diversity; and g(i) is a power adjustment value that is in the subframe i and that is configured for the user equipment by the network device by using physical layer signaling.)

In the conventional art, transmit power $P_{PUSCH,c}(i)$ for sending, by the user equipment, information on a PUSCH of a cell c and in the subframe i is determined according to a formula (2) and a formula (3):

when the user equipment sends information simultaneously on the PUSCH and the PUCCH:

$$P_{PUSCH,c}(i)=\min\left\{\begin{array}{l}P_{CMAX,c}(i),\\ 10\log_{10}(M_{PUSCH,c}(i))+P_{0\_PUSCH,c}(j)+\alpha_c(j)\cdot PL_c+\Delta_{TF,c}(i)+f_c(i)\end{array}\right\};\quad(2)$$

or when the user equipment sends information not simultaneously on the PUSCH and the PUCCH:

$$P_{PUSCH,c}(i)=\min\left\{\begin{array}{l}10\log_{10}(P_{CMAX,c}(i)-P_{PUCCH}(i)),\\ 10\log_{10}(M_{PUSCH,c}(i))+P_{0\_PUSCH,c}(j)+\alpha_c(j)\cdot PL_c+\Delta_{TF,c}(i)+f_c(i)\end{array}\right\}.\quad(3)$$

The current channel format of the PUCCH is any one of a PUCCH format 1, 1a, 1b, 2, 2a, 2b, or 3. Herein, it is defined that the first PUCCH format is different from any one of the PUCCH format 1, 1a, 1b, 2, 2a, 2b, or 3, the second PUCCH format is the PUCCH format 1a, and a third PUCCH format is different from the first PUCCH format and different from any one of the PUCCH format 1, 1a, 1b, 2, 2a, 2b, or 3. For a PUCCH in the first PUCCH format or the third PUCCH format, the user equipment is incapable of determining, according to transmit power used for sending information on an existing PUSCH or PUCCH, transmit power for sending information on the PUCCH in the first PUCCH format or the third PUCCH format.

SUMMARY

Embodiments of the present invention provide a power control method and apparatus for an uplink control channel, so as to determine transmit power for sending information on a PUCCH in a first PUCCH format.

A first aspect provides a power control method for an uplink control channel, including:

determining, by user equipment, to send first uplink control information on a first PUCCH and in a subframe i, where the first uplink control information includes at least one of channel state information CSI, a hybrid automatic repeat request-acknowledgment HARQ-ACK, or a scheduling request SR;

determining, by the user equipment, transmit power for sending the first uplink control information on the first PUCCH and in the subframe i, where the transmit power is a sum of a base power adjustment value and any one of a first power adjustment value, a second power adjustment value, a third power adjustment value, a fourth power adjustment value, or a fifth power adjustment value; and sending, by the user equipment, the first uplink control information on the first PUCCH by using power that is not greater than the transmit power, where the first power adjustment value is a power adjustment value determined by the user equipment according to a quantity of bits of the first uplink control information, the second power adjustment value is a power adjustment value determined by the user equipment according to the quantity of the bits of the first uplink control information and a quantity of resources of the first PUCCH, the third power adjustment value is a power adjustment value determined by the user equipment according to the quantity of the resources of the first PUCCH and a ratio of the quantity of the bits of the first uplink control information to the quantity of the resources of the first PUCCH, the fourth power adjustment value is a power adjustment value determined by the user equipment according to the quantity of the resources of the first PUCCH, and the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information; and the base power adjustment value includes a sum of $P_{O\_PUCCH}$ and $PL_c$, or the base power adjustment value includes a sum of $P_{O\_PUCCH}$ and $\alpha_c \cdot PL_c$, where $P_{O\_PUCCH}$ is a value configured for the user equipment by the network device by using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

With reference to the first aspect, in a first possible implementation of the first aspect, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

With reference to the first aspect or the first possible implementation of the first aspect, in a second possible implementation of the first aspect, the first PUCCH is in a first physical uplink control channel PUCCH format, and the PUCCH in the first PUCCH format is characterized in that:

the PUCCH occupies at least one RB, and in a case of a normal cyclic prefix, only one time-domain symbol in the middle of each timeslot corresponding to the PUCCH bears a demodulation reference signal, or two time-domain symbols in each timeslot bear a demodulation reference signal, or in a case of an extended cyclic prefix, the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

With reference to any one of the first aspect to the second possible implementation of the first aspect, in a third possible implementation of the first aspect, if a quantity of RBs occupied by the first PUCCH is not greater than $N_u$, the transmit power for sending, by the user equipment, the first uplink control information on the first PUCCH and in the subframe i is a sum of the first power adjustment value and the base power adjustment value, or the transmit power is a sum of the second power adjustment value and the base power adjustment value; or if a quantity of RBs occupied by the first PUCCH is greater than $N_u$, the transmit power for sending, by the user equipment, the first uplink control information on the first PUCCH and in the subframe i is a sum of the third power adjustment value and the base power adjustment value, where $N_u$ is 1, 2, 3, or 4.

With reference to any one of the first aspect to the third possible implementation of the first aspect, in a fourth possible implementation of the first aspect, the quantity of the resources of the first PUCCH is $K_{RE}$, a quantity of modulation symbols occupied by the first PUCCH; or the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH; or the quantity of the resources of the first PUCCH is $M_{RB}^{PUCCH}(i)$, a quantity of RBs included in the first PUCCH; and the quantity of the resources occupied on the first PUCCH by the second uplink control information is $M_{RE}$, a quantity of modulation symbols occupied on the first PUCCH by the second uplink control information; or the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

With reference to any one of the first aspect to the fourth possible implementation of the first aspect, in a fifth possible implementation of the first aspect, the first power adjustment value determined according to the quantity of the bits of the first uplink control information is $h'(n_{bit}(i))$, where $n_{bit}(i)$ indicates the quantity of the bits of the first uplink control information sent on the first PUCCH; and if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i))=P_2$, and $8.2\le P_2\le 12.12$;

if $n_{bit}(i)$ is greater than 64 and $n_{bit}(i)$ is not greater than 128, $h'(n_{bit}(i))=P_3$, and $11.4\le P_3\le 17.24$; or $$h'(n_{bit}(i))=K_1\cdot n_{bit}(i)+K_2, \text{ where } 0.05\le K_1\le 0.08, \text{ and } 5\le K_2\le 7.$$

With reference to any one of the first aspect to the fourth possible implementation of the first aspect, in a sixth possible implementation of the first aspect, the second power adjustment value determined according to the quantity of the bits of the first uplink control information and the quantity of the resources of the first PUCCH is $h'(n_{bit}(i),M_{RB}^{PUCCH}(i))$ where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i),M_{RB}^{PUCCH}(i))$ is determined by $n_{bit}(i)$ and $M_{RB}^{PUCCH}(i)$.

With reference to the sixth possible implementation of the first aspect, in a seventh possible implementation of the first aspect, $h'(n_{bit}(i),M_{RB}^{PUCCH}(i))=10\log_{10}(M_{RB}^{PUCCH}(i))+h'(n_{bit}(i))$, where when $M_{RB}^{PUCCH}(i)=1$:

if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i))=P_2$, and $8.2\le P_2\le 12.12$;

if $n_{bit}(i)$ is greater than 64 and $n_{bit}(i)$ is not greater than 128, $h'(n_{bit}(i))=P_3$, and $11.4\le P_3\le 17.24$; or $$h'(n_{bit}(i))=K_1\cdot n_{bit}(i)+K_2, \text{ where } 0.05\le K_1\le 0.08, \text{ and } 5\le K_2\le 7; \text{ or}$$

when $M_{RB}^{PUCCH}(i)=2$:

if $n_{bit}(i)$ is not greater than 22, $h'(n_{bit}(i))=P_1$, and $5.9\le P_1\le 8.4$;

if $n_{bit}(i)$ is greater than 22 and $n_{bit}(i)$ is not greater than 64, $h'(n_{bit}(i))=P_2$, and $6.8\le P_2\le 10$;

if $n_{bit}(i)$ is greater than 64 and $n_{bit}(i)$ is not greater than 128, $h'(n_{bit}(i))=P_3$, and $8\le P_3\le 12.6$;

if $n_{bit}(i)$ is greater than 128 and $n_{bit}(i)$ is not greater than 256, $h'(n_{bit}(i))=P_4$, and $10.6\le P_4\le 17.7$; or $$h'(n_{bit}(i))=K_1\cdot n_{bit}(i)+K_2, \text{ where } 0.02\le K_1\le 0.04, \text{ and } 5.5\le K_2\le 7.5.$$

With reference to any one of the first aspect to the fourth possible implementation of the first aspect, in an eighth possible implementation of the first aspect, the second power adjustment value determined according to the quantity of the bits of the first uplink control information and the quantity of the resources of the first PUCCH is $h'(n'_{bit}(i),M_{RB}^{PUCCH}(i))$, where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i)$ is the quantity of the RBs included in the first PUCCH, and a value of $h'(n'_{bit}(i),M_{RB}^{PUCCH}(i))$ is determined by $n'_{bit}(i)$ and $M_{RB}^{PUCCH}(i)$.

With reference to the eighth possible implementation of the first aspect, in a ninth possible implementation of the first aspect, $h'(n'_{bit}(i),M_{RB}^{PUCCH}(i))=10\log_{10}(M_{RB}^{PUCCH}(i))+h'(n'_{bit}(i))$, where when $M_{RB}^{PUCCH}(i)=1$, $h'(n'_{bit}(i))=K_1\times n'_{bit}(i)+K_2$, where $0.05\le K_1\le 0.08$, and $-1.6\le K_2\le -0.7$; or when $M_{RB}^{PUCCH}(i)=2$, $h'(n'_{bit}(i))=K_1\times n'_{bit}(i)+K_2$, where $0.03\le K_1\le 0.05$, and $-0.3\le K_2\le 0.5$.

With reference to the eighth possible implementation of the first aspect, in a tenth possible implementation of the first aspect, $h'(n'_{bit}(i),M_{RB}^{PUCCH}(i))=10\log_{10}(M_{RB}^{PUCCH}(i))+h'(n'_{bit}(i))$, where when $M_{RB}^{PUCCH}(i)=1$, $h'(n'_{bit}(i))=K_1\times(n'_{bit}(i)+8)+K_2$, where $0.05\le K_1\le 0.075$, and $-2.2\le K_2\le -1.1$; or when $M_{RB}^{PUCCH}(i)=2$, $h'(n'_{bit}(i))=K_1\times(n'_{bit}(i)+8)+K_2$, where $0.03\le K_1\le 0.08$, and $-0.6\le K_2\le 0.1$.

With reference to any one of the first aspect to the fourth possible implementation of the first aspect, in an eleventh possible implementation of the first aspect, the third power adjustment value determined according to the quantity of the resources of the first PUCCH and the ratio of the quantity of the bits of the first uplink control information to the quantity of the resources of the first PUCCH is $k(m(i),M_{RB}^{PUCCH}(i))$, where $m(i)$ indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by $m(i)$ and $M_{RB}^{PUCCH}(i)$.

With reference to the eleventh possible implementation of the first aspect, in a twelfth possible implementation of the first aspect, when the quantity of the resources of the first PUCCH is $M_{RB}^{PUCCH}(i)$, the quantity of the RBs included in the first PUCCH, $k(m(i),M_{RB}^{PUCCH}(i))=10\log_{10}(M_{RB}^{PUCCH}(i))+q'(m(i))$, where when $M_{RB}^{PUCCH}(i)=1$:

if $m(i)$ is not greater than 22, $q'(m(i))=P_1$, and $6.1\le P_1\le 8.76$;

if $m(i)$ is greater than 22 and $m(i)$ is not greater than 64, $q'(m(i))=P_2$, and $8.2\le P_2\le 12.12$;

if $m(i)$ is greater than 64 and $m(i)$ is not greater than 128, $q'(m(i))=P_3$, and $11.4\le P_3\le 17.24$; or $$q'(m(i))=K_1\cdot m(i)+K_2, \text{ where } 0.05\le K_1\le 0.08, \text{ and } 5\le K_2\le 7; \text{ or}$$

when $M_{RB}^{PUCCH}(i)=2$:

if $m(i)$ is not greater than 22, $q'(m(i))=P_1$, and $5.9\le P_1\le 8.4$;

if $m(i)$ is greater than 22 and $m(i)$ is not greater than 64, $q'(m(i))=P_2$, and $6.8\le P_2\le 10$;

if $m(i)$ is greater than 64 and $m(i)$ is not greater than 128, $q'(m(i))=P_3$, and $8\le P_3\le 12.6$;

if $m(i)$ is greater than 128 and $m(i)$ is not greater than 256, $q'(m(i))=P_4$, and $10.6\le P_4\le 17.7$; or $$q'(m(i))=K_1\cdot m(i)+K_2, \text{ where } 0.02\le K_1\le 0.04, \text{ and } 5.5\le K_2\le 7.5$$

With reference to the eleventh possible implementation of the first aspect, in a thirteenth possible implementation of the first aspect, when the quantity of the resources of the first PUCCH is $K_{RE}$, the quantity of the modulation symbols occupied by the first PUCCH, $k(m(i),M_{RB}^{PUCCH}(i))=10\log_{10}(M_{RB}^{PUCCH}(i))+q'(m(i))$, where when $M_{RB}^{PUCCH}(i)=1$, $q'(m(i))=K_1\cdot m(i)+K_2$, where $8\le K_1\le 11$, and $5\le K_2\le 7$; or when $M_{RB}^{PUCCH}(i)=2$, $q'(m(i))=K_1\cdot m(i)+K_2$, where $8.5\le K_1\le 10.5$, and $6\le K_2\le 8$.

With reference to any one of the first aspect to the fourth possible implementation of the first aspect, in a fourteenth possible implementation of the first aspect, the determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is 10 $\log_{10}(M_{RB}^{PUCCH}(i))+10\log_{10}((2^{K_S \cdot BPRE}-1)\cdot\beta_{offset}^{PUCCH})$, where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the PUCCH first PUCCH, $\beta_{offset}^{PUCCH}$ is a value configured for the user equipment by the network device by using higher layer signaling, and $K_S$ is a value configured for the user equipment by the network device by using higher layer signaling.

With reference to the fourteenth possible implementation of the first aspect, in a fifteenth possible implementation of the first aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

With reference to any one of the first aspect to the fourth possible implementation of the first aspect, in a sixteenth possible implementation of the first aspect, the fourth power adjustment value determined according to the quantity of the resources of the first PUCCH is 10 $\log_{10}(M_{RB}^{PUCCH}(i))$, where $M_{RB}^{PUCCH}(i)$ is the quantity of the RBs included in the first PUCCH.

With reference to any one of the first aspect to the fourth possible implementation of the first aspect, in a seventeenth possible implementation of the first aspect, the fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i), M_{RB}^{PUCCH}(i))$, where r(i) indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by r(i) and $M_{RB}^{PUCCH}(i)$.

With reference to the first aspect or the first possible implementation of the first aspect, in an eighteenth possible implementation of the first aspect, the first PUCCH is in a third physical uplink control channel PUCCH format, and the PUCCH in the third PUCCH format is characterized in that:

the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

With reference to any one of the first aspect or the first or the eighteenth possible implementation of the first aspect, in a nineteenth possible implementation of the first aspect, the first power adjustment value determined according to the quantity of the bits of the first uplink control information is $k'(n_{bit}(i))$, where $n_{bit}(i)$ indicates the quantity of the bits of the first uplink control information sent on the first PUCCH; and $$k'(n_{bit}(i))=K_1\cdot n_{bit}(i)+K_2,\text{ where } 0.08\le K_1\le 0.12,\text{ and } -3.7\le K_2\le 2.7$$

With reference to any one of the first aspect or the first or the eighteenth possible implementation of the first aspect, in a twentieth possible implementation of the first aspect, the third power adjustment value determined according to the quantity of the resources of the first PUCCH and the ratio of the quantity of the bits of the first uplink control information to the quantity of the resources of the first PUCCH is 10 $\log_{10}((2^{K_S \cdot BPRE}-1)\cdot\beta_{offset}^{PUCCH})$, where BPRE is a ratio of the quantity of the bits of the first uplink control information to $K_{RE}$, a quantity of modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

With reference to the twentieth possible implementation of the first aspect, in a twenty-first possible implementation of the first aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

A second aspect provides a power control method for an uplink control channel, including:

determining, by a network device, that user equipment is to send first uplink control information on a first PUCCH and in a subframe i, where the first uplink control information includes at least one of channel state information CSI, a hybrid automatic repeat request-acknowledgment HARQ-ACK, or a scheduling request SR;

determining, by the network device, transmit power for sending, by the user equipment, the first uplink control information on the first PUCCH and in the subframe i, where the transmit power is a sum of a base power adjustment value and any one of a first power adjustment value, a second power adjustment value, a third power adjustment value, a fourth power adjustment value, or a fifth power adjustment value; and receiving, by the network device, the first uplink control information that is sent by the user equipment on the first PUCCH by using power that is not greater than the transmit power, where the first power adjustment value is a power adjustment value determined by the user equipment according to a quantity of bits of the first uplink control information, the second power adjustment value is a power adjustment value determined by the user equipment according to the quantity of the bits of the first uplink control information and a quantity of resources of the first PUCCH, the third power adjustment value is a power adjustment value determined by the user equipment according to the quantity of the resources of the first PUCCH and a ratio of the quantity of the bits of the first uplink control information to the quantity of the resources of the first PUCCH, the fourth power adjustment value is a power adjustment value determined by the user equipment according to the quantity of the resources of the first PUCCH, and the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information; and the base power adjustment value includes a sum of $P_{O\_PUCCH}$ and $PL_c$, or the base power adjustment value includes a sum of $P_{O\_PUCCH}$ and $\alpha_c \cdot PL_c$, where $P_{O\_PUCCH}$ is a value configured for the user equipment by the network device by using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

With reference to the second aspect, in a first possible implementation of the second aspect, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

With reference to the second aspect or the first possible implementation of the second aspect, in a second possible implementation of the second aspect, the first PUCCH is in a first physical uplink control channel PUCCH format, and the PUCCH in the first PUCCH format is characterized in that:

the PUCCH occupies at least one RB, and in a case of a normal cyclic prefix, only one time-domain symbol in the middle of each timeslot corresponding to the PUCCH bears a demodulation reference signal, or two time-domain symbols in each timeslot bear a demodulation reference signal, or in a case of an extended cyclic prefix, the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

With reference to any one of the second aspect to the second possible implementation of the second aspect, in a third possible implementation of the second aspect, if a quantity of RBs occupied by the first PUCCH is not greater than $N_u$, the transmit power for sending, by the user equipment, the first uplink control information on the first PUCCH and in the subframe i is a sum of the first power adjustment value and the base power adjustment value, or the transmit power is a sum of the second power adjustment value and the base power adjustment value; or if a quantity of RBs occupied by the first PUCCH is greater than $N_u$, the transmit power for sending, by the user equipment, the first uplink control information on the first PUCCH and in the subframe i is a sum of the third power adjustment value and the base power adjustment value, where $N_u$ is 1, 2, 3, or 4.

With reference to any one of the second aspect to the third possible implementation of the second aspect, in a fourth possible implementation of the second aspect, the quantity of the resources of the first PUCCH is $K_{RE}$, a quantity of modulation symbols occupied by the first PUCCH; or the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH; or the quantity of the resources of the first PUCCH is $M_{RB}^{PUCCH}(i)$, a quantity of RBs included in the first PUCCH; and the quantity of the resources occupied on the first PUCCH by the second uplink control information is $M_{RE}$, a quantity of modulation symbols occupied on the first PUCCH by the second uplink control information; or the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

With reference to any one of the second aspect to the fourth possible implementation of the second aspect, in a fifth possible implementation of the second aspect, the first power adjustment value determined according to the quantity of the bits of the first uplink control information is $h'(n_{bit}(i))$, where $n_{bit}(i)$ indicates the quantity of the bits of the first uplink control information sent on the first PUCCH; and if $n_{bit}(i)$ is not greater than 22, $h'(n_{bit}(i))=P_1$, and $6.1 \le P_1 \le 8.76$;

if $n_{bit}(i)$ is greater than 22 and $n_{bit}(i)$ is not greater than 64, $h'(n_{bit}(i))=P_2$, and $8.2 \le P_2 \le 12.12$;

if $n_{bit}(i)$ is greater than 64 and $n_{bit}(i)$ bit is not greater than 128, $h'(n_{bit}(i))=P_3$, and $11.4 \le P_3 \le 17.24$; or $$h'(n_{bit}(i))=K_1 \cdot n_{bit}(i)+K_2, \text{ where } 0.05 \le K_1 \le 0.08, \text{ and } 5 \le K_2 \le 7.$$

With reference to any one of the second aspect to the fourth possible implementation of the second aspect, in a sixth possible implementation of the second aspect, the second power adjustment value determined according to the quantity of the bits of the first uplink control information and the quantity of the resources of the first PUCCH is $h'(n_{bit}(i),M_{RB}^{PUCCH}(i))$, where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i), M_{RB}^{PUCCH}(i))$, is determined by $n_{bit}(i)$ and $M_{RB}^{PUCCH}(i)$.

With reference to the sixth possible implementation of the second aspect, in a seventh possible implementation of the second aspect, $h'(n_{bit}(i),M_{RB}^{PUCCH}(i))=10\log_{10}(M_{RB}^{PUCCH}(i))+h'(n_{bit}(i))$, where when $M_{RB}^{PUCCH}(i)=1$:

if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i))=P_2$, and $8.2\le P_2\le 12.12$;

if $n_{bit}(i)$ is greater than 64 and $n_{bit}(i)$ is not greater than 128, $h'(n_{bit}(i))=P_3$, and $11.4\le P_3\le 17.24$; or $$h'(n_{bit}(i))=K_1\cdot n_{bit}(i)+K_2,\text{ where }0.05\le K_1\le 0.08,\text{ and }5\le K_2\le 7;\text{ or}$$

when $M_{RB}^{PUCCH}(i)=2$:

if $n_{bit}(i)$ is not greater than 22, $h'(n_{bit}(i))=P_1$, and $5.9\le P_1\le 8.4$;

if $n_{bit}(i)$ is greater than 22 and $n_{bit}(i)$ is not greater than 64, $h'(n_{bit}(i))=P_2$, and $6.8\le P_2\le 10$;

if $n_{bit}(i)$ is greater than 64 and $n_{bit}(i)$ is not greater than 128, $h'(n_{bit}(i))=P_3$, and $8\le P_3\le 12.6$;

if $n_{bit}(i)$ is greater than 128 and $n_{bit}(i)$ is not greater than 256, $h'(n_{bit}(i))=P_4$, and $10.6\le P_4\le 17.7$; or $$h'(n_{bit}(i))=K_1\cdot n_{bit}(i)+K_2,\text{ where }0.02\le K_1\le 0.04,\text{ and }5.5\le K_2\le 7.5.$$

With reference to any one of the second aspect to the fourth possible implementation of the second aspect, in an eighth possible implementation of the second aspect, the second power adjustment value determined according to the quantity of the bits of the first uplink control information and the quantity of the resources of the first PUCCH is $h'(n'_{bit}(i),M_{RB}^{PUCCH}(i))$, where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i)$ is the quantity of the RBs included in the first PUCCH, and a value of $h'(n'_{bit}(i),M_{RB}^{PUCCH}(i))$ is determined by $n'_{bit}(i)$ and $M_{RB}^{PUCCH}(i)$.

With reference to the eighth possible implementation of the second aspect, in a ninth possible implementation of the second aspect, $h'(n'_{bit}(i),M_{RB}^{PUCCH}(i))=10\log_{10}(M_{RB}^{PUCCH}(i))+h'(n'_{bit}(i))$, where when $M_{RB}^{PUCCH}(i)=1$, $h'(n'_{bit}(i))=K_1\times n'_{bit}(i)+K_2$, where $0.05\le K_1\le 0.08$, and $-1.6\le K_2\le -0.7$; or when $M_{RB}^{PUCCH}(i)=2$, $h'(n'_{bit}(i))=K_1\times n'_{bit}(i)+K_2$, where $0.03\le K_1\le 0.05$, and $-0.3\le K_2\le 0.5$.

With reference to the eighth possible implementation of the second aspect, in a tenth possible implementation of the second aspect, $h'(n'_{bit}(i),M_{RB}^{PUCCH}(i))=10\log_{10}(M_{RB}^{PUCCH}(i))+h'(n'_{bit}(i))$, where when $M_{RB}^{PUCCH}(i)=1$, $h'(n'_{bit}(i))=K_1\times(n'_{bit}(i)+8)+K_2$, where $0.05\le K_1\le 0.075$, and $-2.2\le K_2\le -1.1$; or when $M_{RB}^{PUCCH}(i)=2$, $h'(n'_{bit}(i))=K_1\times(n'_{bit}(i)+8)+K_2$, where $0.03\le K_1\le 0.08$, and $-0.6\le K_2\le 0.1$.

With reference to any one of the second aspect to the fourth possible implementation of the second aspect, in an eleventh possible implementation of the second aspect, the third power adjustment value determined according to the quantity of the resources of the first PUCCH and the ratio of the quantity of the bits of the first uplink control information to the quantity of the resources of the first PUCCH is $k(m(i),M_{RB}^{PUCCH}(i))$, where $m(i)$ indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by $m(i)$ and $M_{RB}^{PUCCH}(i)$.

With reference to the eleventh possible implementation of the second aspect, in a twelfth possible implementation of the second aspect, when the quantity of the resources of the $k(m(i),M_{RB}^{PUCCH}(i))=10\log_{10}(M_{RB}^{PUCCH}(i))+q'(m(i))$, where when $M_{RB}^{PUCCH}(i)=1$:

if $m(i)$ is not greater than 22, $q'(m(i))=P_1$, and $6.1\le P_1\le 8.76$;

if $m(i)$ is greater than 22 and $m(i)$ is not greater than 64, $q'(m(i))=P_2$, and $8.2\le P_2\le 12.12$;

if $m(i)$ is greater than 64 and $m(i)$ is not greater than 128, $q'(m(i))=P_3$, and $11.4\le P_3\le 17.24$; or $$q'(m(i))=K_1\cdot m(i)+K_2,\text{ where }0.05\le K_1\le 0.08,\text{ and }5\le K_2\le 7;\text{ or}$$

when $M_{RB}^{PUCCH}(i)=2$:

if $m(i)$ is not greater than 22, $q'(m(i))=P_1$, and $5.9\le P_1\le 8.4$;

if $m(i)$ is greater than 22 and $m(i)$ is not greater than 64, $q'(m(i))=P_2$, and $6.8\le P_2\le 10$;

if $m(i)$ is greater than 64 and $m(i)$ is not greater than 128, $q'(m(i))=P_3$, and $8\le P_3\le 12.6$;

if $m(i)$ is greater than 128 and $m(i)$ is not greater than 256, $q'(m(i))=P_4$, and $10.6\le P_4\le 17.7$; or $$q'(m(i))=K_1\cdot m(i)+K_2,\text{ where }0.02\le K_1\le 0.04,\text{ and }5.5\le K_2\le 7.5$$

With reference to the eleventh possible implementation of the second aspect, in a thirteenth possible implementation of the second aspect, when the quantity of the resources of the first PUCCH is $K_{RE}$, the quantity of the modulation symbols occupied by the first PUCCH, $k(m(i),M_{RB}^{PUCCH}(i))=10\log_{10}(M_{RB}^{PUCCH}(i))+q'(m(i))$, where when $M_{RB}^{PUCCH}(i)=1$, $q'(m(i))=K_1\cdot m(i)+K_2$, where $8\le K_1\le 11$, and $5\le K_2\le 7$; or when $M_{RB}^{PUCCH}(i)=2$, $q'(m(i))=K_1\cdot m(i)+K_2$, where $8.5\le K_1\le 10.5$, and $6\le K_2\le 8$.

With reference to any one of the second aspect to the fourth possible implementation of the second aspect, in a fourteenth possible implementation of the second aspect, the determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is $10\log_{10}(M_{RB}^{PUCCH}(i))+10\log_{10}((2^{K_S\cdot BPRE}-1)\cdot\beta_{offset}^{PUCCH})$, where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

With reference to any one of the fourteenth possible implementation of the second aspect, in a fifteenth possible implementation of the second aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

With reference to any one of the second aspect to the fourth possible implementation of the second aspect, in a sixteenth possible implementation of the second aspect, the fourth power adjustment value determined according to the quantity of the resources of the first PUCCH is $10\log_{10}(M_{RB}^{PUCCH}(i))$, where $M_{RB}^{PUCCH}(i)$ is the quantity of the RBs included in the first PUCCH.

With reference to any one of the second aspect to the fourth possible implementation of the second aspect, in a seventeenth possible implementation of the second aspect, the fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i),M_{RB}^{PUCCH}(i))$, where r(i) indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by r(i) and $M_{RB}^{PUCCH}(i)$.

With reference to the second aspect or the first possible implementation of the second aspect, in an eighteenth possible implementation of the second aspect, the first PUCCH is in a third physical uplink control channel PUCCH format, and the PUCCH in the third PUCCH format is characterized in that:

the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

With reference to any one of the second aspect or the first or the eighteenth possible implementation of the second aspect, in a nineteenth possible implementation of the second aspect, the first power adjustment value determined according to the quantity of the bits of the first uplink control information is $k'(n_{bit}(i))$, where $n_{bit}(i)$ indicates the quantity of the bits of the first uplink control information sent on the first PUCCH; and $$k'(n_{bit}(i))=K_1\cdot n_{bit}(i)+K_2,\text{ where } 0.08\le K_1\le 0.12,\text{ and } -3.7\le K_2\le -2.7.$$

With reference to any one of the second aspect or the first or the eighteenth possible implementation of the second aspect, in a twentieth possible implementation of the second aspect, the third power adjustment value determined according to the quantity of the resources of the first PUCCH and the ratio of the quantity of the bits of the first uplink control information to the quantity of the resources of the first PUCCH is $10\log_{10}((2^{K_S\cdot BPRE}-1)\cdot\beta_{offset}^{PUCCH})$, where BPRE is a ratio of the quantity of the bits of the first uplink control information to $K_{RE}$, a quantity of modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

With reference to the twentieth possible implementation of the second aspect, in a twenty-first possible implementation of the second aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

A third aspect provides user equipment, including:

a first processing unit, configured to: determine that first uplink control information is to be sent on a first PUCCH and in a subframe i, where the first uplink control information includes at least one of channel state information CSI, a hybrid automatic repeat request-acknowledgment HARQ-ACK, or a scheduling request SR; determine transmit power for sending the first uplink control information on the first PUCCH and in the subframe i, where the transmit power is a sum of a base power adjustment value and any one of a first power adjustment value, a second power adjustment value, a third power adjustment value, a fourth power adjustment value, or a fifth power adjustment value; and a sending unit, configured to send the first uplink control information on the first PUCCH by using power that is not greater than the transmit power, where the first power adjustment value is a power adjustment value determined by the user equipment according to a quantity of bits of the first uplink control information, the second power adjustment value is a power adjustment value determined by the user equipment according to the quantity of the bits of the first uplink control information and a quantity of resources of the first PUCCH, the third power adjustment value is a power adjustment value determined by the user equipment according to the quantity of the resources of the first PUCCH and a ratio of the quantity of the bits of the first uplink control information to the quantity of the resources of the first PUCCH, the fourth power adjustment value is a power adjustment value determined by the user equipment according to the quantity of the resources of the first PUCCH, and the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information; and the base power adjustment value includes a sum of $P_{O\_PUCCH}$ and $PL_c$, or the base power adjustment value includes a sum of $P_{O\_PUCCH}$ and $\alpha_c \cdot PL_c$, where $P_{O\_PUCCH}$ is a value configured for the user equipment by the network device by using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

With reference to the third aspect, in a first possible implementation of the third aspect, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

With reference to the third aspect or the first possible implementation of the third aspect, in a second possible implementation of the third aspect, the first PUCCH is in a first physical uplink control channel PUCCH format, and the PUCCH in the first PUCCH format is characterized in that:

the PUCCH occupies at least one RB, and in a case of a normal cyclic prefix, only one time-domain symbol in the middle of each timeslot corresponding to the PUCCH bears a demodulation reference signal, or two time-domain symbols in each timeslot bear a demodulation reference signal, or in a case of an extended cyclic prefix, the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

With reference to any one of the third aspect to the second possible implementation of the third aspect, in a third possible implementation of the third aspect, if a quantity of RBs occupied by the first PUCCH is not greater than $N_u$, the transmit power for sending, by the user equipment, the first uplink control information on the first PUCCH and in the subframe i is a sum of the first power adjustment value and the base power adjustment value, or the transmit power is a sum of the second power adjustment value and the base power adjustment value; or if a quantity of RBs occupied by the first PUCCH is greater than $N_u$, the transmit power for sending, by the user equipment, the first uplink control information on the first PUCCH and in the subframe i is a sum of the third power adjustment value and the base power adjustment value, where $N_u$ is 1, 2, 3, or 4.

With reference to any one of the third aspect to the third possible implementation of the third aspect, in a fourth possible implementation of the third aspect, the quantity of the resources of the first PUCCH is $K_{RE}$, a quantity of modulation symbols occupied by the first PUCCH; or the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH; or the quantity of the resources of the first PUCCH is $M_{RB}^{PUCCH}(i)$, a quantity of RBs included in the first PUCCH; and the quantity of the resources occupied on the first PUCCH by the second uplink control information is $M_{RE}$, a quantity of modulation symbols occupied on the first PUCCH by the second uplink control information; or the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

With reference to any one of the third aspect to the fourth possible implementation of the third aspect, in a fifth possible implementation of the third aspect, the first power adjustment value determined according to the quantity of the bits of the first uplink control information is $h'(n_{bit}(i))$, where $n_{it}(i)$ indicates the quantity of the bits of the first uplink control information sent on the first PUCCH; and if $n_{bit}(i)$ is not greater than 22, $h'(n_{bit}(i))=P_1$, and $6.1 \le P_1 \le 8.76$;

if $n_{bit}(i)$ is greater than 22 and $n_{bit}(i)$ is not greater than 64, $h'(n_{bit}(i))=P_2$, and $8.2 \le P_2 \le 12.12$;

if $n_{bit}(i)$ is greater than 64 and $n_{bit}(i)$ is not greater than 128, $h'(n_{bit}(i))=P_3$, and $11.4 \le P_3 \le 17.24$; or $$h'(n_{bit}(i))=K_1 \cdot n_{bit}(i)+K_2,\text{ where } 0.05 \le K_1 \le 0.08,\text{ and } 5 \le K_2 \le 7.$$

With reference to any one of the third aspect to the fourth possible implementation of the third aspect, in a sixth possible implementation of the third aspect, the second power adjustment value determined according to the quantity of the bits of the first uplink control information and the quantity of the resources of the first PUCCH is $h'(n_{bit}(i), M_{RB}^{PUCCH}(i))$ where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i),M_{RB}^{PUCCH}(i))$ is determined by $n_{bit}(i)$ and $M_{RB}^{PUCCH}(i)$.

With reference to the sixth possible implementation of the third aspect, in a seventh possible implementation of the third aspect, $h'(n_{bit}(i),M_{RB}^{PUCCH}(i))=10\log_{10}(M_{RB}^{PUCCH}(i))+h'(n_{bit}(i))$, where when $M_{RB}^{PUCCH}(i)=1$:

if $n_{bit}(i)$ is not greater than 22, $h'(n_{bit}(i))=P_1$, and $6.1 \le P_1 \le 8.76$;

if $n_{bit}(i)$ is greater than 22 and $n_{bit}(i)$ is not greater than 64, $h'(n_{bit}(i))=P_2$, and $8.2 \le P_2 \le 12.12$;

if $n_{bit}(i)$ is greater than 64 and $n_{bit}(i)$ is not greater than 128, $h'(n_{bit}(i))=P_3$, and $11.4 \le P_3 \le 17.24$; or $h'(n_{bit}(i))=K_1 \cdot n_{bit}(i)+K_2$, where $0.05 \le K_1 \le 0.08$, and $5 \le K_2 \le 7$; or when $M_{RB}^{PUCCH}(i)=2$:

if $n_{bit}(i)$ is not greater than 22, $h'(n_{bit}(i))=P_1$, and $5.9 \le P_1 \le 8.4$;

if $n_{bit}(i)$ is greater than 22 and $n_{bit}(i)$ is not greater than 64, $h'(n_{bit}(i))=P_2$, and $6.8 \le P_2 \le 10$;

if $n_{bit}(i)$ is greater than 64 and $n_{bit}(i)$ is not greater than 128, $h'(n_{bit}(i))=P_3$, and $8 \le P_3 \le 12.6$;

if $n_{bit}(i)$ is greater than 128 and $n_{bit}(i)$ is not greater than 256, $h'(n_{bit}(i))=P_4$, and $10.6 \le P_4 \le 17.7$; or $h'(n_{bit}(i))=K_1 \cdot n_{bit}(i)+K_2$, where $0.02 \le K_1 \le 0.04$, and $5.5 \le K_2 \le 7.5$.

With reference to any one of the third aspect to the fourth possible implementation of the third aspect, in an eighth possible implementation of the third aspect, the second power adjustment value determined according to the quantity of the bits of the first uplink control) information and the quantity of the resources of the first PUCCH is $h'(n'_{bit}(i), M_{RB}^{PUCCH}(i))$ where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i)$ is the quantity of the RBs included in the first PUCCH, and a value of $h'(n'_{bit}(i),M_{RB}^{PUCCH}(i))$ is determined by $n'_{bit}(i)$ and $M_{RB}^{PUCCH}(i)$.

With reference to the eighth possible implementation of the third aspect, in a ninth possible implementation of the third aspect, $h'(n'_{bit}(i),M_{RB}^{PUCCH}(i))=10 \log_{10}(M_{RB}^{PUCCH}(i))+h'(n'_{bit}(i))$, where when $M_{RB}^{PUCCH}(i)=1$, $h'(n'_{bit}(i))=K_1 \times n'_{bit}(i)+K_2$, where $0.05 \le K_1 \le 0.08$, and $-1.6 \le K_2 \le -0.7$; or when $M_{RB}^{PUCCH}(i)=2$, $h'(n'_{bit}(i))=K_1 \times n'_{bit}(i)+K_2$, where $0.03 \le K_1 \le 0.05$, and $-0.3 \le K_2 \le 0.5$.

With reference to the eighth possible implementation of the third aspect, in a tenth possible implementation of the third aspect, $h'(n'_{bit}(i),M_{RB}^{PUCCH}(i))=10 \log_{10}(M_{RB}^{PUCCH}(i))+h'(n'_{bit}(i))$, where when $M_{RB}^{PUCCH}(i)=1$, $h'(n'_{bit}(i))=K_1 \times (n'_{bit}(i)+8)+K_2$, where $0.05 \le K_1 \le 0.075$, and $-2.2 \le K_2 \le -1.1$; or when $M_{RB}^{PUCCH}(i)=2$, $h'(n'_{bit}(i))=K_1 \times (n'_{bit}(i)+8)+K_2$, where $0.03 \le K_1 \le 0.08$, and $-0.6 \le K_2 \le 0.1$.

With reference to any one of the third aspect to the fourth possible implementation of the third aspect, in an eleventh possible implementation of the third aspect, the third power adjustment value determined according to the quantity of the resources of the first PUCCH and the ratio of the quantity of the bits of the first uplink control information to the quantity of the resources of the first PUCCH is $k(m(i),M_{RB}^{PUCCH}(i))$, where m(i) indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by m(i) and $M_{RB}^{PUCCH}(i)$.

With reference to the eleventh possible implementation of the third aspect, in a twelfth possible implementation of the third aspect, when the quantity of the resources of the first PUCCH is $M_{RB}^{PUCCH}(i)$, the quantity of the RBs included in the first PUCCH, $k(m(i),M_{RB}^{PUCCH}(i))=10 \log_{10}(M_{RB}^{PUCCH}(i))+q'(m(i))$, where when $M_{RB}^{PUCCH}(i)=1$:

if m(i) is not greater than 22, $q'(m(i))=P_1$, and $6.1 \le P_1 \le 8.76$;

if m(i) is greater than 22 and m(i) is not greater than 64, $q'(m(i))=P_2$, and $8.2 \le P_2 \le 12.12$;

if m(i) is greater than 64 and m(i) is not greater than 128, $q'(m(i))=P_3$, and $11.4 \le P_3 \le 17.24$; or $q'(m(i))=K_1 \cdot m(i)+K_2$, where $0.05 \le K_1 \le 0.08$, and $5 \le K_2 \le 7$; or when $M_{RB}^{PUCCH}(i)=2$:

if m(i) is not greater than 22, $q'(m(i))=P_1$, and $5.9 \le P_1 \le 8.4$;

if m(i) is greater than 22 and m(i) is not greater than 64, $q'(m(i))=P_2$, and $6.8 \le P_2 \le 10$;

if m(i) is greater than 64 and m(i) is not greater than 128, $q'(m(i))=P_3$, and $8 \le P_3 \le 12.6$;

if m(i) is greater than 128 and m(i) is not greater than 256, $q'(m(i))=P_4$, and $10.6 \le P_4 \le 17.7$; or $q'(m(i))=K_1 \cdot m(i)+K_2$, where $0.02 \le K_1 \le 0.04$, and $5.5 \le K_2 \le 7.5$ With reference to the eleventh possible implementation of the third aspect, in a thirteenth possible implementation of the third aspect, when the quantity of the resources of the first PUCCH is $K_{RE}$, the quantity of the modulation symbols occupied by the first PUCCH, $k(m(i),M_{RB}^{PUCCH}(i))=10 \log_{10}(M_{RB}^{PUCCH}(i))+q'(m(i))$, where when $M_{RB}^{PUCCH}(i)=1$, $q'(m(i))=K_1 \cdot m(i)+K_2$, where $8 \le K_1 \le 11$, and $5 \le K_2 \le 7$; or when $M_{RB}^{PUCCH}(i)=2$, $q'(m(i))=K_1 \cdot m(i)+K_2$, where $8.5 \le K_1 \le 10.5$, and $6 \le K_2 \le 8$.

With reference to any one of the third aspect to the fourth possible implementation of the third aspect, in a fourteenth possible implementation of the third aspect, the determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is $10 \log_{10}(M_{RB}^{PUCCH}(i))+10 \log_{10}((2^{K_S BPRE}-1) \cdot \beta_{offset}^{PUCCH})$, where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

With reference to any one of the third aspect to the fourteenth possible implementation of the third aspect, in a fifteenth possible implementation of the third aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

With reference to any one of the third aspect to the fourth possible implementation of the third aspect, in a sixteenth possible implementation of the third aspect, the fourth power adjustment value determined according to the quantity of the resources of the first PUCCH is 10 $\log_{10}(M_{RB}^{PUCCH}(i))$, where $M_{RB}^{PUCCH}(i)$ is the quantity of the RBs included in the first PUCCH.

With reference to any one of the third aspect to the fourth possible implementation of the third aspect, in a seventeenth possible implementation of the third aspect, the fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i), M_{RB}^{PUCCH}(i))$, where r(i) indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by r(i) and $M_{RB}^{PUCCH}(i)$.

With reference to the third aspect or the first possible implementation of the third aspect, in an eighteenth possible implementation of the third aspect, the first PUCCH is in a third physical uplink control channel PUCCH format, and the PUCCH in the third PUCCH format is characterized in that:

the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

With reference to any one of the third aspect or the first or the eighteenth possible implementation of the third aspect, in a nineteenth possible implementation of the third aspect, the first power adjustment value determined according to the quantity of the bits of the first uplink control information is $k'(n_{bit}(i))$, where $n_{bit}(i)$ indicates the quantity of the bits of the first uplink control information sent on the first PUCCH; and $$k'(n_{bit}(i))=K_1 \cdot n_{bit}(i)+K_2, \text{ where } 0.08 \le K_1 \le 0.12, \text{ and } -3.7 \le K_2 \le -2.7.$$

With reference to any one of the third aspect or the first or the eighteenth possible implementation of the third aspect, in a twentieth possible implementation of the third aspect, the third power adjustment value determined according to the quantity of the resources of the first PUCCH and the ratio of the quantity of the bits of the first uplink control information to the quantity of the resources of the first PUCCH is 10 $\log_{10}((2^{K_S \cdot BPRE}-1)\cdot\beta_{offset}^{PUCCH})$, where BPRE is a ratio of the quantity of the bits of the first uplink control information to $K_{RE}$, a quantity of modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

With reference to the twentieth possible implementation of the third aspect, in a twenty-first possible implementation of the third aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

A fourth aspect provides a network device, including:

a second processing unit, configured to: determine that user equipment is to send first uplink control information on a first PUCCH and in a subframe i, where the first uplink control information includes at least one of channel state information CSI, a hybrid automatic repeat request-acknowledgment HARQ-ACK, or a scheduling request SR; determine transmit power for sending the first uplink control information on the first PUCCH and in the subframe i, where the transmit power is a sum of a base power adjustment value and any one of a first power adjustment value, a second power adjustment value, a third power adjustment value, a fourth power adjustment value, or a fifth power adjustment value; and a receiving unit, configured to receive the first uplink control information that is sent by the user equipment on the first PUCCH by using power that is not greater than the transmit power, where the first power adjustment value is a power adjustment value determined by the user equipment according to a quantity of bits of the first uplink control information, the second power adjustment value is a power adjustment value determined by the user equipment according to the quantity of the bits of the first uplink control information and a quantity of resources of the first PUCCH, the third power adjustment value is a power adjustment value determined by the user equipment according to the quantity of the resources of the first PUCCH and a ratio of the quantity of the bits of the first uplink control information to the quantity of the resources of the first PUCCH, the fourth power adjustment value is a power adjustment value determined by the user equipment according to the quantity of the resources of the first PUCCH, and the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information; and the base power adjustment value includes a sum of $P_{O\_PUCCH}$ and $PL_c$, or the base power adjustment value includes a sum of $P_{O\_PUCCH}$ and $\alpha_c \cdot PL_c$, where $P_{O\_PUCCH}$ is a value configured for the user equipment by the network device by using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

With reference to the fourth aspect, in a first possible implementation of the fourth aspect, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

With reference to the fourth aspect or the first possible implementation of the fourth aspect, in a second possible implementation of the fourth aspect, the first PUCCH is in a first physical uplink control channel PUCCH format, and the PUCCH in the first PUCCH format is characterized in that:

the PUCCH occupies at least one RB, and in a case of a normal cyclic prefix, only one time-domain symbol in the middle of each timeslot corresponding to the PUCCH bears a demodulation reference signal, or two time-domain symbols in each timeslot bear a demodulation reference signal, or in a case of an extended cyclic prefix, the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

With reference to any one of the fourth aspect to the second possible implementation of the fourth aspect, in a third possible implementation of the fourth aspect, if a quantity of RBs occupied by the first PUCCH is not greater than $N_u$, the transmit power for sending, by the user equipment, the first uplink control information on the first PUCCH and in the subframe i is a sum of the first power adjustment value and the base power adjustment value, or the transmit power is a sum of the second power adjustment value and the base power adjustment value; or if a quantity of RBs occupied by the first PUCCH is greater than $N_u$, the transmit power for sending, by the user equipment, the first uplink control information on the first PUCCH and in the subframe i is a sum of the third power adjustment value and the base power adjustment value, where $N_u$ is 1, 2, 3, or 4.

With reference to any one of the fourth aspect to the third possible implementation of the fourth aspect, in a fourth possible implementation of the fourth aspect, the quantity of the resources of the first PUCCH is $K_{RE}$, a quantity of modulation symbols occupied by the first PUCCH; or the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH; or the quantity of the resources of the first PUCCH is $M_{RB}^{PUCCH}(i)$, a quantity of RBs included in the first PUCCH; and the quantity of the resources occupied on the first PUCCH by the second uplink control information is $M_{RE}$, a quantity of modulation symbols occupied on the first PUCCH by the second uplink control information; or the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

With reference to any one of the fourth aspect to the fourth possible implementation of the fourth aspect, in a fifth possible implementation of the fourth aspect, the first power adjustment value determined according to the quantity of the bits of the first uplink control information is $h'(n_{bit}(i))$, where $n_{bit}(i)$ indicates the quantity of the bits of the first uplink control information sent on the first PUCCH; and if $n_{bit}(i)$ is not greater than 22, $h'(n_{bit}(i))=P_1$, and $6.1 \le P_1 \le 8.76$;

if $n_{bit}(i)$ is greater than 22 and $n_{bit}(i)$ is not greater than 64, $h'(n_{bit}(i))=P_2$, and $8.2 \le P_2 \le 12.12$;

if $n_{bit}(i)$ is greater than 64 and $n_{bit}(i)$ is not greater than 128, $h'(n_{bit}(i))=P_3$, and $11.4 \le P_3 \le 17.24$; or $h'(n_{bit}(i))=K_1 \cdot n_{bit}(i)+K_2$, where $0.05 \le K_1 \le 0.08$, and $5 \le K_2 \le 7$.

With reference to any one of the fourth aspect to the fourth possible implementation of the fourth aspect, in a sixth possible implementation of the fourth aspect, the second power adjustment value determined according to the quantity of the bits of the first uplink control information and the quantity of the resources of the first PUCCH is $h'(n_{bit}(i), M_{RB}^{PUCCH}(i))$, where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i),M_{RB}^{PUCCH}(i))$ is determined by $n_{bit}(i)$ and $M_{RB}^{PUCCH}(i)$.

With reference to the sixth possible implementation of the fourth aspect, in a seventh possible implementation of the fourth aspect, $h'(n_{bit}(i),M_{RB}^{PUCCH}(i))=10 \log_{10}(M_{RB}^{PUCCH}(i))+h'(n_{bit}(i))$, where when $M_{RB}^{PUCCH}(i)=1$:

if $n_{bit}(i)$ is not greater than 22, $h'(n_{bit}(i))=P_1$, and $6.1 \le P_1 \le 8.76$;

if $n_{bit}(i)$ is greater than 22 and $n_{bit}(i)$ is not greater than 64, $h'(n_{bit}(i))=P_2$, and $8.2 \le P_2 \le 12.12$;

if $n_{bit}(i)$ is greater than 64 and $n_{bit}(i)$ is not greater than 128, $h'(n_{bit}(i))=P_3$, and $11.4 \le P_3 \le 17.24$; or $h'(n_{bit}(i))=K_1 \cdot n_{bit}(i)+K_2$, where $0.05 \le K_1 \le 0.08$, and $5 \le K_2 \le 7$; or when $M_{RB}^{PUCCH}(i)=2$:

if $n_{bit}(i)$ is not greater than 22, $h'(n_{bit}(i))=P_1$, and $5.9 \le P_1 \le 8.4$;

if $n_{bit}(i)$ is greater than 22 and $n_{bit}(i)$ is not greater than 64, $h'(n_{bit}(i))=P_2$, and $6.8 \le P_2 \le 10$;

if $n_{bit}(i)$ is greater than 64 and $n_{bit}(i)$ is not greater than 128, $h'(n_{bit}(i))=P_3$, and $8 \le P_3 \le 12.6$;

if $n_{bit}(i)$ is greater than 128 and $n_{bit}(i)$ is not greater than 256, $h'(n_{bit}(i))=P_4$, and $10.6 \le P_4 \le 17.7$; or $h'(n_{bit}(i))=K_1 \cdot n_{bit}(i)+K_2$, where $0.02 \le K_1 \le 0.04$, and $5.5 \le K_2 \le 7.5$.

With reference to any one of the fourth aspect to the fourth possible implementation of the fourth aspect, in an eighth possible implementation of the fourth aspect, the second power adjustment value determined according to the quantity of the bits of the first uplink control information and the quantity of the resources of the first PUCCH is $h'(n'_{bit}(i), M_{RB}^{PUCCH}(i))$, where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i)$ is the quantity of the RBs included in the first PUCCH, and a value of $h'(n'_{bit}(i),M_{RB}^{PUCCH}(i))$ is determined by $n'_{bit}(i)$ and $M_{RB}^{PUCCH}(i)$.

With reference to the eighth possible implementation of the fourth aspect, in a ninth possible implementation of the fourth aspect, $h'(n'_{bit}(i),M_{RB}^{PUCCH}(i))=10\log_{10}(M_{RB}^{PUCCH}(i))+h'(n'_{bit}(i))$, where when $M_{RB}^{PUCCH}(i)=1$, $h'(n'_{bit}(i))=K_1\times n'_{bit}(i)+K_2$, where $0.05\le K_1\le 0.08$, and $-1.6\le K_2\le -0.7$; or when $M_{RB}^{PUCCH}(i)=2$, $h'(n'_{bit}(i))=K_1\times n'_{bit}(i)+K_2$, where $0.03\le K_1\le 0.05$, and $-0.3\le K_2\le 0.5$.

With reference to the eighth possible implementation of the fourth aspect, in a tenth possible implementation of the fourth aspect, $h'(n'_{bit}(i),M_{RB}^{PUCCH}(i))=10\log_{10}(M_{RB}^{PUCCH}(i))+h'(n'_{bit}(i))$, where when $M_{RB}^{PUCCH}(i)=1$, $h'(n'_{bit}(i))=K_1\times(n'_{bit}(i)+8)+K_2$, where $0.05\le K_1\le 0.075$, and $-2.2\le K_2\le -1.1$; or when $M_{RB}^{PUCCH}(i)=2$, $h'(n'_{bit}(i))=K_1\times(n'_{bit}(i)+8)+K_2$, where $0.03\le K_1\le 0.08$, and $-0.6\le K_2\le 0.1$.

With reference to any one of the fourth aspect to the fourth possible implementation of the fourth aspect, in an eleventh possible implementation of the fourth aspect, the third power adjustment value determined according to the quantity of the resources of the first PUCCH and the ratio of the quantity of the bits of the first uplink control information to the quantity of the resources of the first PUCCH is $k(m(i), M_{RB}^{PUCCH}(i))$, where m(i) indicates the ratio of the quantity of the bits of the first uplink control information sent by the user equipment on the first PUCCH to the quantity of the resources of the first PUCCH, and a value of $k(m(i), M_{RB}^{PUCCH}(i))$ is determined by m(i) and $M_{RB}^{PUCCH}(i)$.

With reference to the eleventh possible implementation of the fourth aspect, in a twelfth possible implementation of the fourth aspect, when the quantity of the resources of the first PUCCH is $M_{RB}^{PUCCH}(i)$ the quantity of the RBs included in the first PUCCH, $k(m(i),M_{RB}^{PUCCH}(i))=10\log_{10}(M_{RB}^{PUCCH}(i))+q'(m(i))$, where when $M_{RB}^{PUCCH}(i)=1$:

if m(i) is not greater than 22, $q'(m(i))=P_1$, and $6.1\le P_1\le 8.76$;

if m(i) is greater than 22 and m(i) is not greater than 64, $q'(m(i))=P_2$, and $8.2\le P_2\le 12.12$;

if m(i) is greater than 64 and m(i) is not greater than 128, $q'(m(i))=P_3$, and $11.4\le P_3\le 17.24$; or $$q'(m(i))=K_1\cdot m(i)+K_2,\text{ where }0.05\le K_1\le 0.08,\text{ and }5\le K_2\le 7;\text{ or}$$

when $M_{RB}^{PUCCH}(i)=2$:

if m(i) is not greater than 22, $q'(m(i))=P_1$, and $5.9\le P_1\le 8.4$;

if m(i) is greater than 22 and m(i) is not greater than 64, $q'(m(i))=P_2$, and $6.8\le P_2\le 10$;

if m(i) is greater than 64 and m(i) is not greater than 128, $q'(m(i))=P_3$, and $8\le P_3\le 12.6$;

if m(i) is greater than 128 and m(i) is not greater than 256, $q'(m(i))=P_4$, and $10.6\le P_4\le 17.7$; or $$q'(m(i))=K_1\cdot m(i)+K_2,\text{ where }0.02\le K_1\le 0.04,\text{ and }5.5\le K_2\le 7.5$$

With reference to the eleventh possible implementation of the fourth aspect, in a thirteenth possible implementation of the fourth aspect, when the quantity of the resources of the first PUCCH is $K_{RE}$, the quantity of the modulation symbols occupied by the first PUCCH, $k(m(i),M_{RB}^{PUCCH}(i))=10\log_{10}(M_{RB}^{PUCCH}(i))+q'(m(i))$, where when $M_{RB}^{PUCCH}(i)=1$, $q'(m(i))=K_1\cdot m(i)+K_2$, where $8\le K_1\le 11$, and $5\le K_2\le 7$; or when $M_{RB}^{PUCCH}(i)=2$, $q'(m(i))=K_1\cdot m(i)+K_2$, where $8.5\le K_1\le 10.5$, and $6\le K_2\le 8$.

With reference to any one of the first aspect to the fourth possible implementation of the fourth aspect, in a fourteenth possible implementation of the fourth aspect, the determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is $10\log_{10}(M_{RB}^{PUCCH}(i))+10\log_{10}((2^{K_S\cdot BPRE}-1)\cdot\beta_{offset}^{PUCCH})$, where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

With reference to any one of the fourth aspect to the fourteenth possible implementation of the fourth aspect, in a fifteenth possible implementation of the fourth aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

With reference to any one of the fourth aspect to the fourth possible implementation of the fourth aspect, in a sixteenth possible implementation of the fourth aspect, the fourth power adjustment value determined according to the quantity of the resources of the first PUCCH is $10\log_{10}(M_{RB}^{PUCCH}(i))$, where $M_{RB}^{PUCCH}(i)$ is the quantity of the RBs included in the first PUCCH.

With reference to any one of the fourth aspect to the fourth possible implementation of the fourth aspect, in a seventeenth possible implementation of the fourth aspect, the fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i), M_{RB}^{PUCCH}(i))$ where r(i) indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by r(i) and $M_{RB}^{PUCCH}(i)$.

With reference to the fourth aspect or the first possible implementation of the fourth aspect, in an eighteenth possible implementation of the fourth aspect, the first PUCCH is in a third physical uplink control channel PUCCH format, and the PUCCH in the third PUCCH format is characterized in that:

the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

With reference to any one of the fourth aspect or the first or the eighteenth possible implementation of the fourth aspect, in a nineteenth possible implementation of the fourth aspect, the first power adjustment value determined according to the quantity of the bits of the first uplink control information is $k'(n_{bit}(i))$, where $n_{bit}(i)$ indicates the quantity of the bits of the first uplink control information sent on the first PUCCH; and $$k'(n_{bit}(i))=K_1\cdot n_{bit}(i)+K_2, \text{ where } 0.08\le K_1\le 0.12, \text{ and } -3.7\le K_2\le -2.7.$$

With reference to any one of the fourth aspect or the first or the eighteenth possible implementation of the fourth aspect, in a twentieth possible implementation of the fourth aspect, the third power adjustment value determined according to the quantity of the resources of the first PUCCH and the ratio of the quantity of the bits of the first uplink control information to the quantity of the resources of the first PUCCH is $10\log_{10}((2^{K_S BPRE}-1)\cdot\beta_{offset}^{PUCCH})$, where BPRE is a ratio of the quantity of the bits of the first uplink control information to $K_{RE}$, a quantity of modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

With reference to the twentieth possible implementation of the fourth aspect, in a twenty-first possible implementation of the fourth aspect, $\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI; and if the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

According to the power control method and apparatus for an uplink control channel that are provided in the embodiments of the present invention, the transmit power for sending the first uplink control information on the first PUCCH and in the subframe i is determined by the user equipment by using the sum of the base power adjustment value and any one of the first power adjustment value determined according to the quantity of the bits of the first uplink control information that is to be sent on the first PUCCH, the second power adjustment value determined according to the quantity of the bits of the first uplink control information and the quantity of the resources of the first PUCCH, the third power adjustment value determined according to the quantity of the resources of the first PUCCH and the ratio of the quantity of the bits of the first uplink control information to the quantity of the resources of the first PUCCH, the fourth power adjustment value determined according to the quantity of the resources of the first PUCCH, the fifth power adjustment value determined according to the quantity of the resources of the first PUCCH and the ratio of the quantity of the bits of the second uplink control information to the quantity of the resources occupied on the first PUCCH by the second uplink control information, or the fifth power adjustment value determined according to the quantity of the resources of the first PUCCH and the ratio of the quantity of the bits of the second uplink control information to the quantity of the resources of the first PUCCH. Therefore, a method for determining the transmit power for sending the first uplink control information on the first PUCCH is provided.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
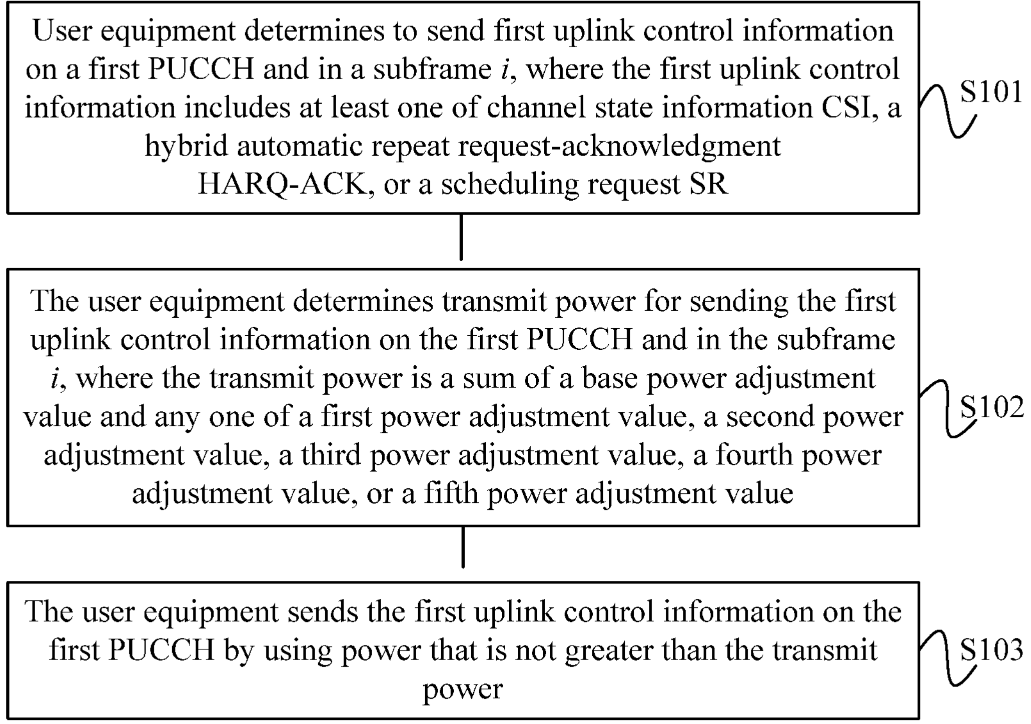
FIG. 1 is a flowchart of a power control method for an uplink control channel according to an embodiment of the present invention.

FIG. 1 is a flowchart of a power control method for an uplink control channel according to an embodiment of the present invention. In this embodiment of the present invention, it is defined that a first physical uplink control channel PUCCH format, that is, a first PUCCH format, is different from any one of a PUCCH format 1, 1a, 1b, 2, 2a, 2b, or 3 in the prior art, a second physical uplink control channel PUCCH format, that is, a second PUCCH format, is the PUCCH format 1a, and a third physical uplink control channel PUCCH format, that is, a third PUCCH format, is different from the first PUCCH format and different from any one of the PUCCH format 1, 1a, 1b, 2, 2a, 2b, or 3 in the conventional art. For a problem that user equipment cannot determine, according to transmit power used for sending information on an existing PUSCH or PUCCH, transmit power for sending information on a PUCCH in the first PUCCH format or the third PUCCH format, the power control method for an uplink control channel is provided. Specific steps of the method are as follows.

Step S101: User equipment determines to send first uplink control information on a first PUCCH and in a subframe i, where the first uplink control information includes at least one of channel state information CSI, a hybrid automatic repeat request-acknowledgment HARQ-ACK, or a scheduling request SR.

In the conventional art, formats of a PUCCH include the format 1, the format 1a, the format 1b, the format 2, the format 2a, the format 2b, and the format 3. In this embodiment of the present invention, a format of the first PUCCH is the first physical uplink control channel PUCCH format, or a format of the first PUCCH is the third physical uplink control channel PUCCH format, and both the first PUCCH format and the third PUCCH format are different from any PUCCH format in the prior art.

A network device configures multiple PUCCHs for the user equipment. The user equipment determines the first PUCCH from the multiple PUCCHs, and sends the first uplink control information in the subframe i by using the first PUCCH. Alternatively, a network device instructs, by using physical layer signaling, the user equipment to send the first uplink control information in the subframe i by using the first PUCCH. This embodiment of the present invention does not limit a method for determining the first PUCCH in the subframe i by the user equipment. The first uplink control information includes at least one of channel state information CSI, a hybrid automatic repeat request-acknowledgment HARQ-ACK, or a scheduling request SR. That is, the first uplink control information generated by the current user equipment may include one of the channel state information CSI, the hybrid automatic repeat request-acknowledgment HARQ-ACK, or the scheduling request SR; may include any two of the channel state information CSI, the hybrid automatic repeat request-acknowledgment HARQ-ACK, or the scheduling request SR; or may include all of the channel state information CSI, the hybrid automatic repeat request-acknowledgment HARQ-ACK, and the scheduling request SR.

Step S102: The user equipment determines transmit power for sending the first uplink control information on the first PUCCH and in the subframe i, where the transmit power is a sum of a base power adjustment value and any one of a first power adjustment value, a second power adjustment value, a third power adjustment value, a fourth power adjustment value, or a fifth power adjustment value.

The first power adjustment value is a power adjustment value determined by the user equipment according to a quantity of bits of the first uplink control information. The second power adjustment value is a power adjustment value determined by the user equipment according to the quantity of the bits of the first uplink control information and a quantity of resources of the first PUCCH. The third power adjustment value is a power adjustment value determined by the user equipment according to the quantity of the resources of the first PUCCH and a ratio of the quantity of the bits of the first uplink control information to the quantity of the resources of the first PUCCH. The fourth power adjustment value is a power adjustment value determined by the user equipment according to the quantity of the resources of the first PUCCH. The fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information.

The base power adjustment value includes a sum of $P_{O\_PUCCH}$ and $PL_c$, or the base power adjustment value includes a sum of $P_{O\_PUCCH}$ and $\alpha_c \cdot PL_c$, where $P_{O\_PUCCH}$ is a value configured for the user equipment by the network device by using higher layer signaling, $PL_c$ is a path loss that is determined by the user equipment and that is of a downlink of a cell c in which the first PUCCH is located, and $\alpha_c$ is a path loss factor that is configured for the user equipment by the network device and that is of the cell c in which the first PUCCH is located.

In this embodiment of the present invention, when the base power adjustment value includes the sum of $P_{O\_PUCCH}$ and $PL_c$, the base power adjustment value further includes at least one of $\Delta_{TxD}(F')$, g(i), or $\Delta_{F\_PUCCH}(F)$. $\Delta_{TxD}(F')$ is a power adjustment value that is configured for the user equipment by the network device and that is used when the PUCCH in the first UCCH format uses multi-antenna transmit diversity. Optionally, a value of $\Delta_{TxD}(F')$ is −2 dB or 0 dB. g(i) is determined by using a sixth power adjustment value that is in the subframe i and that is configured for the user equipment by the network device by using physical control information. $\Delta_{F\_PUCCH}(F)$ is a power offset value that is configured for the user equipment by the network device and that is of a PUCCH in the first PUCCH format relative to a PUCCH in the second PUCCH format. Optionally, a value of $\Delta_{F\_PUCCH}(F)$ is one of −2 dB, 0 dB, 1 dB, or 2 dB. Preferably, the base power adjustment value in this embodiment of the present invention includes a sum of $P_{O\_PUCCH}$, $PL_c$, $\Delta_{TxD}$ (F') g(i) and $\Delta_{F\_PUCCH}(F)$ that is, the base power adjustment value is $P_{O\_PUCCH}+PL_c+\Delta_{TxD}(F')+g(i)+\Delta_{F\_PUCCH}(F)$. Alternatively, preferably, the base power adjustment value in this embodiment of the present invention includes a sum of $P_{O\_PUCCH}$, $PL_c$, g(i), and $\Delta_{F\_PUCCH}(F)$, that is, the base power adjustment value is $P_{O\_PUCCH}+PL_c+g(i)+\Delta_{F\_PUCCH}(F)$. Alternatively, preferably, the base power adjustment value in this embodiment of the present invention includes a sum of $P_{O\_PUCCH}$, $PL_c$, and g(i), that is, the base power adjustment value is $P_{O\_PUCCH}+PL_c+g(i)$.

When the base power adjustment value includes the sum of $P_{O\_PUCCH}$ and $\alpha_c \cdot PL_c$, the base power adjustment value further includes $\Delta_{TF,c}(i)$ and/or $f_c(i)$. When $K_S=0$, $\Delta_{TF,c}(i)=0$; or when $K_S=1.25$, $\Delta_{TF,c}(i)=10\log_{10}((2^{BPRE\cdot K_S}-1)\cdot\beta_{offset}^{PUCCH})$. $K_S$ is a parameter that is configured for the user equipment by the network device by using higher layer signaling and that is of the cell c in which the first PUCCH is located. $\beta_{offset}^{PUCCH}$ is a parameter configured for the user equipment by the network device by using higher layer signaling, or $\beta_{offset}^{PUCCH}$ is equal to 1. $BPRE=O/N_{RE}$, where O is a quantity of bits of third uplink control information sent by the user equipment on the first PUCCH, the quantity of the bits of the third uplink control information includes a quantity of bits of a cyclic redundancy code CRC corresponding to the third uplink control information, and $N_{RE}$ is a quantity of modulation symbols occupied by the first PUCCH. The third uplink control information is a subset of the first uplink control information. $f_c(i)$ is a seventh power adjustment value that is in the subframe i and that is configured for the user equipment by the network device by using physical control information. Preferably, the base power adjustment value in this embodiment of the present invention includes a sum of $P_{O\_PUCCH}$, $\alpha_c \cdot PL_c$, $\Delta_{TF,c}$ (i), and $f_c(i)$, that is, the base power adjustment value may be $P_{O\_PUCCH}+\alpha_c \cdot PL_c+\Delta_{TF,c}(i)+f_c(i)$. Alternatively, preferably, the base power adjustment value in this embodiment of the present invention includes a sum of $P_{O\_PUCCH}$, $\alpha_c \cdot PL_c$, and $f_c(i)$, that is, the base power adjustment value may be $P_{O\_PUCCH}+\alpha_c \cdot PL_c+f_c(i)$.

In addition, in this embodiment of the present invention, $P_{O\_PUCCH}=P_{O\_PUSCH}+\Delta P$ where $P_{O\_PUSCH}$ and $\Delta P$ are values configured for the user equipment by the network device by using higher layer signaling, and $\alpha_c$ may be equal to 1.

Step S103: The user equipment sends the first uplink control information on the first PUCCH by using power that is not greater than the transmit power.

If the transmit power determined in the foregoing step is greater than a maximum transmit power of the user equipment, the user equipment sends the first uplink control information on the first PUCCH by using the maximum transmit power. If the transmit power determined in the foregoing step is not greater than a maximum transmit power of the user equipment, the user equipment sends the first uplink control information on the first PUCCH by using the transmit power.

In this embodiment of the present invention, the transmit power for sending the first uplink control information on the first PUCCH and in the subframe i is determined by the user equipment by using the sum of the base power adjustment value and any one of the first power adjustment value determined according to the quantity of the bits of the first uplink control information that is to be sent on the first PUCCH, the second power adjustment value determined according to the quantity of the bits of the first uplink control information and the quantity of the resources of the first PUCCH, the third power adjustment value determined according to the quantity of the resources of the first PUCCH and the ratio of the quantity of the bits of the first uplink control information to the quantity of the resources of the first PUCCH, the fourth power adjustment value determined according to the quantity of the resources of the first PUCCH, the fifth power adjustment value determined according to the quantity of the resources of the first PUCCH and the ratio of the quantity of the bits of the second uplink control information to the quantity of the resources occupied on the first PUCCH by the second uplink control information, or the fifth power adjustment value determined according to the quantity of the resources of the first PUCCH and the ratio of the quantity of the bits of the second uplink control information to the quantity of the resources of the first PUCCH. Therefore, a method for determining the transmit power for sending the first uplink control information on the first PUCCH is provided.

Based on the foregoing embodiment, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

The first PUCCH is in the first physical uplink control channel PUCCH format. The PUCCH in the first PUCCH format is characterized in that: the PUCCH occupies at least one RB, and in a case of a normal cyclic prefix (normal CP), only one time-domain symbol in the middle of each timeslot corresponding to the PUCCH bears a demodulation reference signal, or two time-domain symbols in each timeslot bear a demodulation reference signal, or in a case of an extended cyclic prefix (extended CP), the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

The quantity of the resources of the first PUCCH is $K_{RE}$, a quantity of modulation symbols occupied by the first PUCCH. Alternatively, the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH. Alternatively, the quantity of the resources of the first PUCCH is $M_{RB}^{PUCCH}(i)$, a quantity of RBs included in the first PUCCH.

The quantity of the resources occupied on the first PUCCH by the second uplink control information is $M_{RE}$, a quantity of modulation symbols occupied on the first PUCCH by the second uplink control information. Alternatively, the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

Specifically, $K_{RE}=M_{sc}^{PUCCH}\cdot N_{symb}^{PUCCH}$, where $M_{sc}^{PUCCH}$ is a quantity of subcarriers of the first PUCCH, and $N_{symb}^{PUCCH}$ is a quantity of OFDM symbols of the first PUCCH. For QPSK, $Q_m=2$. For 16QAM, $Q_m=4$.

This embodiment of the present invention specifically defines characteristics of the PUCCH in the first PUCCH format, to distinguish between the PUCCH in the first PUCCH format and a PUCCH in an existing PUCCH format, and also specifically defines a method for determining the quantity of the resources of the first PUCCH and the quantity of the resources occupied on the first PUCCH by the second uplink control information.

Based on the foregoing embodiment, a specific method for determining the transmit power includes the following five cases. Optionally, if a quantity of RBs occupied by the first PUCCH is not greater than $N_u$, the transmit power for sending, by the user equipment, the first uplink control information on the first PUCCH and in the subframe i is a sum of the first power adjustment value and the base power adjustment value, or the transmit power is a sum of the second power adjustment value and the base power adjustment value. If a quantity of RBs occupied by the first PUCCH is greater than $N_u$, the transmit power for sending, by the user equipment, the first uplink control information on the first PUCCH and in the subframe i is a sum of the third power adjustment value and the base power adjustment value. $N_u$ is 1, 2, 3, or 4.

First case: The first power adjustment value determined according to the quantity of the bits of the first uplink control information is $h'(n_{bit}(i))$, where $n_{bit}(i)$ indicates the quantity of the bits of the first uplink control information sent on the first PUCCH.

In the first case, the transmit power is a sum of the first power adjustment value $h'(n_{bit}(i))$ and the base power adjustment value $P_{O\_PUCCH}+PL_c+\Delta_{TxD}(F')+g(i)+\Delta_{F\_PUCCH}(F)$. The transmit power is $P_{PUCCH}(i)=P_{O\_PUCCH}+PL_c+h'(n_{bit}(i))+\Delta_{F\_PUCCH}(F)+\Delta_{TxD}(F')+g(i)$. A value of $h'(n_{bit}(i))$ is determined by $n_{bit}(i)$. A specific determining relationship is as follows:

if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i)=P_2$, and $8.2\le P_2\le 12.12$;

if $n_{bit}(i)$ is greater than 64 and $n_{bit}(i)$ is not greater than 128, $h'(n_{bit}(i)=P_3$, and $11.4\le P_3\le 17.24$; or $$h'(n_{bit}(i))=K_1\cdot n_{bit}(i)+K_2, \text{ where } 0.05\le K_1\le 0.08, \text{ and } 5\le K_2\le 7.$$

Preferably, $K_1=0.07$, and $K_2=5.6$. Alternatively, preferably, $K_1=0.06$, and $K_2=6.2$.

$n_{bit}(i)$ indicates the quantity of the bits of the first uplink control information sent on the first PUCCH. For example, $n_{bit}(i)$ may be specifically expressed as $n_{bit}(i)=n_{CSI}+n_{HARQ}+n_{SR}$, where $n_{CSI}$ is a quantity of bits of the channel state information CSI, $n_{HARQ}$ is a quantity of bits of the hybrid automatic repeat request-acknowledgment HARQ-ACK, $n_{SR}$ is a quantity of bits of the scheduling request SR, and any one of $n_{CSI}$, $n_{HARQ}$, or $n_{SR}$ may be 0.

Second case: The second power adjustment value determined according to the quantity of the bits of the first uplink control information and the quantity of the resources of the first PUCCH is $h'(n_{bit}(i),M_{RB}^{PUCCH}(i))$, where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i),M_{RB}^{PUCCH}(i))$ is determined by $n_{bit}(i)$ and $M_{RB}^{PUCCH}(i)$.

In the second case, the transmit power is a sum of the second power adjustment value $h'(n_{bit}(i),M_{RB}^{PUCCH}(i))$ and the base power adjustment value $P_{O\_PUCCH}+PL_c+\Delta_{TxD}(F')+g(i)+\Delta_{F\_PUCCH}(F)$. The transmit power is $P_{PUCCH}(i)=P_{O\_PUCCH}+PL_c+h'(n_{bit}(i),M_{RB}^{PUCCH}(i))+\Delta_{F\_PUCCH}(F)+\Delta_{TxD}(F')+g(i)$, where $h'(n_{bit}(i),M_{RB}^{PUCCH}(i))$ indicates the second power adjustment value, $n_{bit}(i)$ indicates the quantity of the bits of the first uplink control information sent on the first PUCCH, and a value of $h'(n_{bit}(i),M_{RB}^{PUCCH}(i))$ is determined by $n_{bit}(i)$ and $M_{RB}^{PUCCH}(i)$. A specific determining relationship is as follows: $h'(n_{bit}(i),M_{RB}^{PUCCH}(i))=10\log_{10}(M_{RB}^{PUCCH}(i))+h'(n_{bit}(i))$.

When $M_{RB}^{PUCCH}(i)=1$:

if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i))=P_2$, and $8.2\le P_2\le 12.12$;

if $n_{bit}(i)$ is greater than 64 and $n_{bit}(i)$ is not greater than 128, $h'(n_{bit}(i))=P_3$, and $11.4\le P_3\le 17.24$; or $$h'(n_{bit}(i))=K_1\cdot n_{bit}(i)+K_2, \text{ where } 0.05\le K_1\le 0.08, \text{ and } 5\le K_2\le 7.$$

Preferably, $K_1=0.07$, and $K_2=5.6$. Alternatively, preferably, $K_1=0.06$, and $K_2=6.2$.

When $M_{RB}^{PUCCH}(i)=2$:

if $n_{bit}(i)$ is not greater than 22, $h'(n_{bit}(i))=P_1$, and $5.9\le P_1\le 8.4$;

if $n_{bit}(i)$ is greater than 22 and $n_{bit}(i)$ is not greater than 64, $h'(n_{bit}(i))=P_2$, and $6.8\le P_2\le 10$;

if $n_{bit}(i)$ is greater than 64 and $n_{bit}(i)$ is not greater than 128, $h'(n_{bit}(i))=P_3$, and $8\le P_3\le 12.6$;

if $n_{bit}(i)$ is greater than 128 and $n_{bit}(i)$ is not greater than 256, $h'(n_{bit}(i))=P_4$, and $10.6\le P_4\le 17.7$; or $$h'(n_{bit}(i))=K_1\cdot n_{bit}(i)+K_2, \text{ where } 0.02\le K_1\le 0.04, \text{ and } 5.5\le K_2\le 7.5.$$

Preferably, $K_1=0.03$, and $K_2=6.7$.

Alternatively, in the second case, the second power adjustment value determined according to the quantity of the bits of the first uplink control information and the quantity of the resources of the first PUCCH is $h'(n'_{bit}(i),M_{RB}^{PUCCH}(i))$, where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i))$ is the quantity of the RBs included in the first PUCCH, and a value of $h'(n'_{bit}(i),M_{RB}^{PUCCH}(i))$ is determined by $n'_{bit}(i)$ and $M_{RB}^{PUCCH}(i)$.

Preferably, $h'(n'_{bit}(i),M_{RB}^{PUCCH}(i))=10\log_{10}(M_{RB}^{PUCCH}(i))+h'(n'_{bit}(i))$, where when $M_{RB}^{PUCCH}(i)=1$, $h'(n'_{bit}(i))=K_1\times n'_{bit}(i)+K_2$, where $0.05\le K_1\le 0.08$, and $-1.6\le K_2\le -0.7$; or when $M_{RB}^{PUCCH}(i)=2$, $h'(n'_{bit}(i))=K_1\times n'_{bit}(i)+K_2$, where $0.03\le K_1\le 0.05$, and $-0.3\le K_2\le 0.5$.

Alternatively, preferably, $h'(n'_{bit}(i),M_{RB}^{PUCCH}(i))=10\log_{10}(M_{RB}^{PUCCH}(i))+h'(n'_{bit}(i))$ where when $M_{RB}^{PUCCH}(i)=1$, $h'(n'_{bit}(i))=K_1\times(n'_{bit}(i)+8)+K_2$, where $0.05\le K_1\le 0.075$, and $-2.2K_2\le -1.1$; or when $M_{RB}^{PUCCH}(i)=2$, $h'(n'_{bit}(i))=K_1\times(n'_{bit}(i)+8)+K_2$, where $0.03\le K_1\le 0.08$, and $-0.6\le K_2\le 0.1$.

When the second power adjustment value is $h'(n'_{bit}(i),M_{RB}^{PUCCH}(i))$, the transmit power is $P_{PUCCH}(i)=P_{O\_PUCCH}+PL_c+h'(n'_{bit}(i),M_{RB}^{PUCCH}(i))+\Delta_{F\_PUCCH}(F)+\Delta_{TxD}(F')+g(i)$ or $P_{PUCCH}(i)=P_{O\_PUCCH}+\alpha_c\cdot PL_c+h'(n'_{bit}(i),M_{RB}^{PUCCH}(i))+\Delta_{F\_PUCCH}(F)+\Delta_{TxD}(F')+f_c(i)$.

When the first PUCCH is in the first physical uplink control channel PUCCH format, and the PUCCH in the first physical uplink control channel PUCCH format does not support a transmit diversity solution, the transmit power is $P_{PUCCH}(i)=P_{O\_PUCCH}+PL_c+h'(n'_{bit}(i),M_{RB}^{PUCCH}(i))+\Delta_{F\_PUCCH}(F)+\Delta_{TxD}(F')+g(i)$ or $P_{PUCCH}(i)=P_{O\_PUCCH}+\alpha_c\cdot PL_c+h'(n'_{bit}(i),M_{RB}^{PUCCH}(i))+\Delta_{F\_PUCCH}(F)+f_c(i)$, where $P_{O\_PUCCH}$ is a value configured for the user equipment by the network device by using higher layer signaling, and is used to determine the transmit power of the first PUCCH in the first physical uplink control channel. $P_{O\_PUCCH}$ is determined by a cell-level parameter $P_{O\_NOMINAL\_PUCCH\_2}$ and a user-level parameter $P_{O\_UE\_PUCCH\_2}$ that are configured for the user equipment by the network device. In the prior art, a network device configures a cell-level parameter $P_{O\_NOMINAL\_PUCCH\_1}$ and a user-level parameter $P_{O\_UE\_PUCCH\_1}$ for the user equipment by using higher layer signaling. A value of $P_{O\_NOMINAL\_PUCCH\_1}$ ranges from −127 dBm to −96 dBm. A value of $P_{O\_UE\_PUCCH\_1}$ ranges from −8 dB to 7 dB. A sum $P_{O\_PUCCH\_1}$ of values of the two parameters is configured for the user equipment by the network device and is used to adjust transmit power for performing, by the user equipment, sending on a PUCCH in an existing PUCCH format (including the PUCCH format 1, the PUCCH format 1a, the PUCCH format 1b, the PUCCH format 2, the PUCCH format 2a, the PUCCH format 2b, and the PUCCH format 3). In the prior art, the network device further configures a cell-level parameter $P_{O\_NOMINAL\_\ PUSCH}$ and a user-level parameter $P_{O\_UE\_PUSCH}$ for the user equipment by using higher layer signaling. A value of $P_{O\_NOMINAL\_\ PUSCH}$ ranges from −126 dBm to 24 dBm. A value of $P_{O\_UE\_PUSCH}$ ranges from −8 dB to 7 dB. A sum $P_{O\_PUSCH}$ of values of the two parameters is configured for the user equipment by the network device and is used to adjust transmit power for performing, by the user equipment, sending on a PUSCH. $P_{O\_PUCCH}$ is determined by the cell-level parameter $P_{O\_NOMINAL\_PUCCH\_2}$ and the user-level parameter $P_{O\_UE\_PUCCH\_2}$ that are configured for the user equipment by the network device. $P_{O\_NOMINAL\_PUCCH\_2}$ may be any one of the cell-level parameter $P_{O\_NOMINAL\_PUCCH\_1}$ or $P_{O\_NOMINAL\_\ PUSCH}$ that is configured for an existing PUCCH format by the network device, or may be determined by another parameter configured by the network device. $P_{O\_UE\_PUCCH\_2}$ may be any one of the user-level parameter $P_{O\_UE\_PUCCH\_1}$ or $P_{O\_UE\_PUSCH}$ that is configured for an existing PUCCH format by the network device, or may be determined by another parameter configured by the network device. If $P_{O\_NOMINAL\_PUCCH\_2}$ is determined by the another parameter configured by the network device, a value of the parameter ranges from −126 dBm to 24 dBm. If $P_{O\_UE\_PUCCH\_2}$ is determined by the another parameter configured by the network device, a value of the parameter ranges from −8 dB to 7 dB.

$\Delta_{F\_PUCCH}(F)$ is the power offset value that is configured for the user equipment by the network device and that is of the PUCCH in the first PUCCH format relative to the PUCCH in the second PUCCH format.

g(i) and $f_c(i)$ indicate power adjustment values that are sent to the user equipment by the network device by using a physical downlink control channel.

Third case: The third power adjustment value determined according to the quantity of the resources of the first PUCCH and the ratio of the quantity of the bits of the first uplink control information to the quantity of the resources of the first PUCCH is $k(m(i),M_{RB}^{PUCCH}(i))$ where m(i) indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by m(i) and $M_{RB}^{PUCCH}(i)$ In this case, the transmit power is the sum of the third power adjustment value $k(m(i),M_{RB}^{PUCCH}(i))$ and the base power adjustment value $P_{O\_PUCCH}+PL_c+\Delta_{TxD}(F')+g(i)+\Delta_{F\_PUCCH}(F)$. The transmit power is $P_{PUCCH}(i)=P_{O\_PUCCH}+PL_c+k(m(i),M_{RB}^{PUCCH}(i))+\Delta_{F\_PUCCH}(F)+\Delta_{TxD}(F')+g(i)$, where $k(m(i),M_{RB}^{PUCCH}(i))$ indicates the third power adjustment value, m(i) indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by m(i) and $M_{RB}^{PUCCH}(i)$. A specific determining relationship is as follows.

When the quantity of the resources of the first PUCCH is $M_{RB}^{PUCCH}(i)$, the quantity of the RBs included in the first PUCCH, $k(m(i),M_{RB}^{PUCCH}(i))=10\log_{10}(M_{RB}^{PUCCH}(i))+q'(m(i))$.

When $M_{RB}^{PUCCH}(i)=1$:

if m(i) is not greater than 22, $q'(m(i))=P_1$, and $6.1\le P_1\le 8.76$;

if m(i) is greater than 22 and m(i) is not greater than 64, $q'(m(i))=P_2$, and $8.2\le P_2\le 12.12$;

if m(i) is greater than 64 and m(i) is not greater than 128, $q'(m(i))=P_3$, and $11.4\le P_3\le 17.24$; or $$q'(m(i))=K_1\cdot m(i)+K_2,\text{ where } 0.05\le K_1\le 0.08,\text{ and } 5\le K_2\le 7.$$

Preferably, $K_1=0.07$, and $K_2=5.6$. Alternatively, preferably, $K_1=0.06$, and $K_2=6.2$.

When $M_{RB}^{PUCCH}(i)=2$:

if m(i) is not greater than 22, $q'(m(i))=P_1$, and $5.9\le P_1\le 8.4$;

if m(i) is greater than 22 and m(i) is not greater than 64, $q'(m(i))=P_2$, and $6.8\le P_2\le 10$;

if m(i) is greater than 64 and m(i) is not greater than 128, $q'(m(i))=P_3$, and $8\le P_3\le 12.6$; or $$q'(m(i))=K_1\cdot m(i)+K_2,\text{ where } 0.02\le K_1\le 0.04,\text{ and } 5.5\le K_2\le 7.5.$$

Preferably, $K_1=0.03$, and $K_2=6.7$.

When the quantity of the resources of the first PUCCH is $K_{RE}$, the quantity of the modulation symbols occupied by the first PUCCH, $k(m(i),M_{RB}^{PUCCH}(i))=10\log_{10}(M_{RB}^{PUCCH}(i))+q'(m(i))$.

When $M_{RB}^{PUCCH}(i)=1$:

$$q'(m(i))=K_1\cdot m(i)+K_2,\text{ where } 8\le K\le 11,\text{ and } 5\le K_2\le 7$$

Preferably, $K_1=8.4$, and $K_2=6.3$.

When $M_{RB}^{PUCCH}(i)=2$:

$$q'(m(i))=K_1\cdot m(i)+K_2,\text{ where } 8.5\le K_1\le 10.5,\text{ and } 6\le K_2\le 8.$$

Preferably, $K_1=9.5$ and $K_2=6.7$.

Alternatively, the determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is $10\log_{10}(M_{RB}^{PUCCH}(i))+10\log_{10}((2^{K_S BPRE}-1)\cdot\beta_{offset}^{PUCCH})$, where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

Preferably, $K_S=1.25$. In this case, the transmit power is the sum of the third power adjustment value $10\log_{10}(M_{RB}^{PUCCH}(i))+10\log_{10}((2^{1.25BPRE}-1)\cdot\beta_{offset}^{PUCCH})$, and the base power adjustment value $P_{O\_PUCCH}+PL_c+g(i)$, that is, the transmit power of the PUCCH is $P_{PUCCH}(i)=P_{O\_PUCCH}+PL_c+10\log_{10}(M_{RB}^{PUCCH}(i))+10\log_{10}((2^{1.25BPRE}-1)\cdot\beta_{offset}^{PUCCH})+g(i)$.

Alternatively, the transmit power is the sum of the third power adjustment value $10\log_{10}(M_{RB}^{PUCCH}(i))+10\log_{10}((2^{1.25BPRE}-1)\cdot\beta_{offset}^{PUCCH})$ and the base power adjustment value $P_{O\_PUCCH}+\alpha_c\cdot PL_c+f_c(i)$, that is, the transmit power of the PUCCH is $P_{PUCCH}(i)\ P_{O\_PUCCH}+\alpha_c\cdot PL_c+10\log_{10}(M_{RB}^{PUCCH}(i))+10\log_{10}((2^{1.25BPRE}-1)\cdot\beta_{offset}^{PUCCH})+f_c(i)$, where $P_{O\_PUCCH}$ is the same as $P_{O\_PUCCH}$ in the second case, $PL_c$ is the path loss that is determined by the user equipment and that is of the downlink of the cell c in which the first PUCCH is located, $\alpha_c$ is the path loss factor that is configured for the user equipment by the network device and that is of the cell c in which the first PUCCH is located, g(i) is the same as g(i) in the second case, and $f_c(i)$ is the same as $f_c(i)$ in the second case.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following: a channel quality indicator CQI and/or a precoding matrix indicator PMI, a hybrid automatic repeat request HARQ-ACK, or a rank indication RI. If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

In the prior art, the network device configures parameters "betaOffset-ACK-Index", "betaOffset-RI-Index", and "betaOffset-CQI-Index" for the user equipment by using higher layer signaling. The parameters are respectively used to determine parameters $\beta_{offset}^{HARQ\text{-}ACK}$, $\beta_{offset}^{RI}$, and $\beta_{offset}^{CQI}$ that are required when the user equipment determines a quantity of PUSCH modulation symbols occupied for sending HARQ-ACK, rank indication (RI), and channel quality indicator (CQI)/precoding matrix indicator (PMI) information on a single-codeword PUSCH. Values of the parameters are integers within [0,15]. The network device configures parameters "betaOffset-ACK-Index-MC-r10", "betaOffset-RI-Index-MC-r10", and "betaOffset-CQI-Index-MC-r10" for the user equipment by using higher layer signaling. The parameters are respectively used to determine the parameters $\beta_{offset}^{HARQ\text{-}ACK}$, $\beta_{offset}^{RI}$, and $\beta_{offset}^{CQI}$ that are required when the user equipment determines a quantity of PUSCH modulation symbols occupied for sending the HARQ-ACK, RI, and CQI/PMI information on a multi-codeword PUSCH. Optionally, the user equipment determines that the quantity of the PUSCH modulation symbols occupied for sending the HARQ-ACK, RI, and CQI/PMI information on the multi-codeword PUSCH are a product of $\beta_{offset}^{HARQ\text{-}ACK}$ and a first ratio, a product of $\beta_{offset}^{RI}$ and the first ratio, and a product of $\beta_{offset}^{CQI}$ and the first ratio respectively. The first ratio is $$\frac{O\cdot M_{RE}}{R},$$

where O is a quantity of bits of the HARQ-ACK, the RI, or the CQI/PMI (if CRC parity bits are added before channel encoding when the HARQ-ACK, RI, or CQI/PMI information is transmitted on the PUSCH, the quantity of the bits includes a bit quantity of CRC parity bits corresponding to the HARQ-ACK, RI, or CQI/PMI information), $M_{RE}$ is a quantity of modulation symbols of the PUSCH, and R is a quantity of bits of uplink data sent on the PUSCH.

Optionally, $\beta_{offset}^{HARQ\text{-}ACK}$, $\beta_{offset}^{RI}$, and $\beta_{offset}^{CQI}$ are ratios of a first quantity of modulation symbols to a second quantity of modulation symbols. The first quantity of modulation symbols is a quantity of modulation symbols of the PUSCH that are occupied when first encoded modulation symbols obtained by encoding and modulating uplink control information of the HARQ-ACK, RI, or CQI/PMI are sent on the PUSCH. The second quantity of modulation symbols is a quantity of modulation symbols of the PUSCH that are occupied when second encoded modulation symbols obtained by encoding and modulating uplink data are sent on the PUSCH. A quantity of the first encoded modulation symbols is equal to a quantity of the second encoded modulation symbols.

$\beta_{offset}^{PUCCH}$ in the third power adjustment value may be one of the parameter $\beta_{offset}^{HARQ\text{-}ACK}$, $\beta_{offset}^{RI}$, or $\beta_{offset}^{CQI}$ that is corresponding to a parameter configured for the UE by the network device.

$\beta_{offset}^{PUCCH}$ in the third power adjustment value is configured for the user equipment by the network device by using the higher layer signaling. $\beta_{offset}^{PUCCH}$ may be $\beta_{offset}^{HARQ\text{-}ACK}$ corresponding to the parameter "betaOffset-ACK-Index" or "betaOffset-ACK-Index-MC-r10" that is configured for the UE by the network device. $\beta_{offset}^{HARQ\text{-}ACK}$ corresponding to the parameter "betaOffset-ACK-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{RI}$ corresponding to the parameter "betaOffset-RI-Index" or "betaOffset-RI-Index-MC-r10" that is configured for the UE by the network device. $\beta_{offset}^{RI}$ corresponding to the parameter "betaOffset-RI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{RI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{CQI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be one of $\beta_{offset}^{HARQ\text{-}ACK}$, $\beta_{offset}^{RI}$, or $\beta_{offset}^{CQI}$ that is corresponding to a parameter configured for the UE by the network device. Specifically, if the first uplink control information includes the HARQ-ACK or the RI, $\beta_{offset}^{PUCCH}$ in the third power adjustment value may be $\beta_{offset}^{HARQ\text{-}ACK}$ or $\beta_{offset}^{RI}$ that is corresponding to a parameter configured for the UE by the network device; if the first uplink control information does not include the HARQ-ACK and the RI, $\beta_{offset}^{PUCCH}$ in the third power adjustment value may be $\beta_{offset}^{CQI}$ that is corresponding to a parameter configured for the UE by the network device.

It should be noted that if the quantity of the resources of the PUCCH in the first PUCCH format is fixedly one RB, the third power adjustment value is a power adjustment value determined by the user equipment according to the ratio of the quantity of the bits of the first uplink control information to the quantity of the resources of the first PUCCH, and impact of the quantity of the resources of the first PUCCH on the third power adjustment value may not be considered.

Fourth case: The fourth power adjustment value determined according to the quantity of the resources of the first PUCCH is $10\log_{10}(M_{RB}^{PUCCH}(i))$, where $M_{RB}^{PUCCH}(i)$ (is the quantity of the RBs included in the first PUCCH.

In the fourth case, the transmit power is a sum of the fourth power adjustment value $10\log_{10}(M_{RB}^{PUCCH}(i))$ and the base power adjustment value $P_{O\_PUCCH}+\alpha_c \cdot PL_c+\Delta_{TF,c}(i)+f_c(i)$. The transmit power is $P_{PUCCH}(i)=10\log_{10}(M_{RB}^{PUCCH}(i))+P_{O\_PUCCH}+\alpha_c \cdot PL_c+\Delta_{TF,c}(i)+f_c(i)$, where $M_{RB}^{PUCCH}(i)$ is the quantity of the RBs included in the first PUCCH.

Fifth case: The fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i),M_{RB}^{PUCCH}(i))$ where r(i) indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by r(i) and $M_{RB}^{PUCCH}(i)$.

In the fifth case, the transmit power is a sum of the fifth power adjustment value and the base power adjustment value. The second uplink control information is a subset of the first uplink control information, and the second uplink control information is at least one type of uplink control information with a highest priority in the first uplink control information. A priority sequence includes at least one of the following cases: a priority of the HARQ-ACK is higher than a priority of the CSI, a priority of the SR is equal to or higher than a priority of the HARQ-ACK, a priority of an RI/PTI in the CSI is higher than a priority of a CQI/PMI in the CSI, or a priority of an RI/PTI in the CSI is equal to a priority of the HARQ-ACK. Alternatively, the second uplink control information is at least one type of uplink control information that is in the first uplink control information and that is used to determine a benchmark of a quantity of resources occupied on the first PUCCH by each piece of control information in the first uplink control information. For example, a quantity of resources occupied on the first PUCCH by other control information may be determined according to a preset ratio or difference between the quantity of the resources occupied on the first PUCCH by the other control information and a quantity of resources occupied on the first PUCCH by the at least one type of uplink control information.

It should be noted that if the quantity of the resources of the PUCCH in the first PUCCH format is fixedly one RB, the fifth power adjustment value is a power adjustment value determined by the user equipment according to the ratio of the quantity of the bits of the second uplink control information to the quantity of the resources occupied on the first PUCCH by the second uplink control information or a power adjustment value determined by the user equipment according to the ratio of the quantity of the bits of the second uplink control information to the quantity of the resources of the first PUCCH, and impact of the quantity of the resources of the first PUCCH on the fifth power adjustment value may not be considered.

In addition, the first PUCCH may be in the third physical uplink control channel PUCCH format. The PUCCH in the third PUCCH format is characterized in that: the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

When the first PUCCH is in the third physical uplink control channel PUCCH format, the first power adjustment value determined according to the quantity of the bits of the first uplink control information is $k'(n_{bit}(i))$, where $n_{bit}(i)$ indicates the quantity of the bits of the first uplink control information sent on the first PUCCH; and $$k'(n_{bit}(i))=K_1 \cdot n_{bit}(i)+K_2,\ \text{where } 0.08 \le K_1 \le 0.12, \text{ and } -3.7 \le K_2 \le -2.7.$$

In this case, the transmit power is the sum of the first power adjustment value $k'(n_{bit}(i))$ and the base power adjustment value $P_{O\_PUCCH}+PL_c+g(i)+\Delta_{F\_PUCCH}(F)$, that is, the transmit power is $P_{PUCCH}(i)=P_{O\_PUCCH}+PL_c+k'(n_{bit}(i))+\Delta_{F\_PUCCH}(F)+g(i)$.

When the first PUCCH is in the third physical uplink control channel PUCCH format, the third power adjustment value determined according to the quantity of the RBs included in the first PUCCH and the ratio of the quantity of the bits of the first uplink control information to $K_{RE}$, the quantity of the modulation symbols occupied by the first PUCCH is $10\log_{10}((2^{K_S BPRE}-1)\cdot\beta_{offset}^{PUCCH})$, where BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

Preferably, $K_S$=1.25. In this case, the transmit power is the sum of the third power adjustment value $10\log_{10}((2^{1.25BPRE}-1)\cdot\beta_{offset}^{PUCCH})$ and the base power adjustment value $P_{O\_PUCCH}+PL_c+g(i)$, that is, the transmit power is $P_{PUCCH}(i)=P_{O\_PUCCH}+PL_c+10\log_{10}((2^{1.25BPRE}-1)\cdot\beta_{offset}^{PUCCH})+g(i)$.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following: a channel quality indicator CQI and/or a precoding matrix indicator PMI, a hybrid automatic repeat request HARQ-ACK, or a rank indication RI. If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

$\beta_{offset}^{PUCCH}$ in the third power adjustment value may be one of the parameter $\beta_{offset}^{HARQ-ACK}$, $\beta_{offset}^{RI}$, or $\beta_{offset}^{CQI}$ set that is corresponding to a parameter configured for the UE by the network device.

$\beta_{offset}^{PUCCH}$ in the third power adjustment value is configured for the user equipment by the network device by using the higher layer signaling. $\beta_{offset}^{PUCCH}$ may be $\beta_{offset}^{HARQ-ACK}$ corresponding to the parameter "betaOffset-ACK-Index" or "betaOffset-ACK-Index-MC-r10" that is configured for the UE by the network device. $\beta_{offset}^{HARQ-ACK}$ corresponding to the parameter "betaOffset-ACK-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{RI}$ corresponding to the parameter "betaOffset-RI-Index" or "betaOffset-RI-Index-MC-r10" that is configured for the UE by the network device. $\beta_{offset}^{RI}$ corresponding to the parameter "betaOffset-RI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{CQI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{CQI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be one of $\beta_{offset}^{HARQ-ACK}$, $\beta_{offset}^{RI}$, or $\beta_{offset}^{CQI}$ that is corresponding to a parameter configured for the UE by the network device. Specifically, if the first uplink control information includes the HARQ-ACK or the RI, $\beta_{offset}^{PUCCH}$ in the third power adjustment value may be $\beta_{offset}^{HARQ-ACK}$ or $\beta_{offset}^{RI}$ that is corresponding to a parameter configured for the UE by the network device; if the first uplink control information does not include the HARQ-ACK and the RI, $\beta_{offset}^{PUCCH}$ in the third power adjustment value may be $\beta_{offset}^{CQI}$ that is corresponding to a parameter configured for the UE by the network device.

This embodiment of the present invention specifically provides an expression for calculating the transmit power according to the sum of the base power adjustment value and any one of the first power adjustment value, the second power adjustment value, the third power adjustment value, the fourth power adjustment value, or the fifth power adjustment value, and provides a method for calculating the transmit power for sending the first uplink control information on the first PUCCH.

Figure 2:
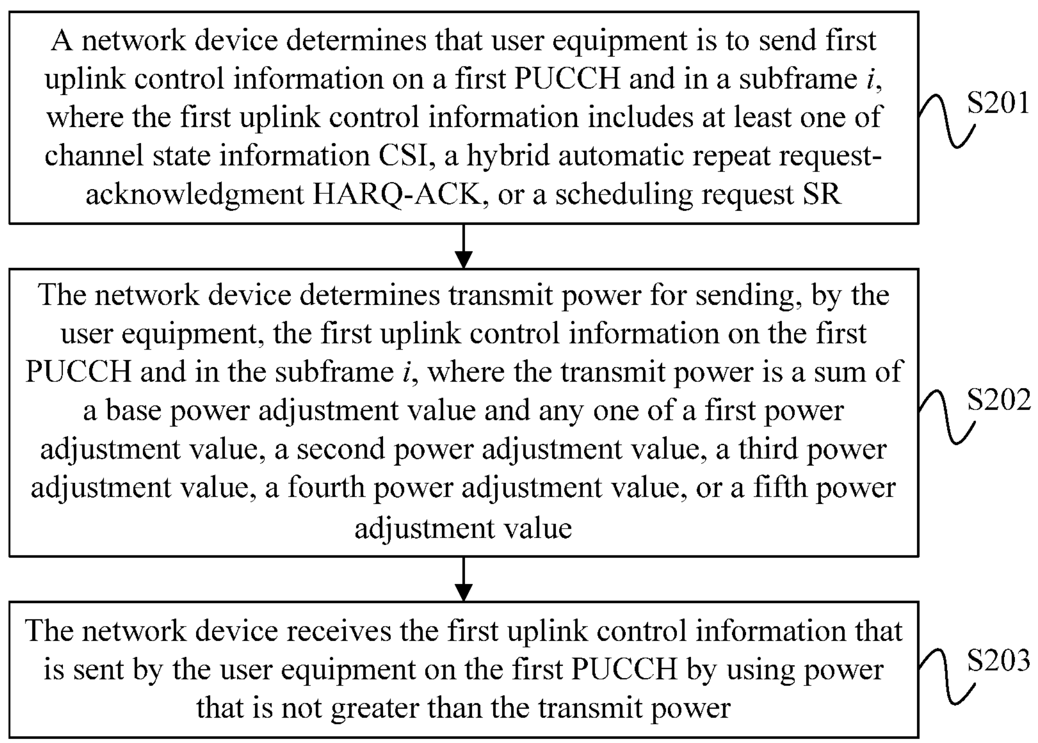
FIG. 2 is a flowchart of a power control method for an uplink control channel according to another embodiment of the present invention.

FIG. 2 is a flowchart of a power control method for an uplink control channel according to another embodiment of the present invention. In this embodiment of the present invention, it is defined that a first physical uplink control channel PUCCH format, that is, a first PUCCH format, is different from any one of a PUCCH format 1, 1a, 1b, 2, 2a, 2b, or 3 in the prior art, a second physical uplink control channel PUCCH format, that is, a second PUCCH format, is the PUCCH format 1a, and a third physical uplink control channel PUCCH format, that is, a third PUCCH format, is different from the first PUCCH format and different from any one of the PUCCH format 1, 1a, 1b, 2, 2a, 2b, or 3 in the prior art. For a problem that user equipment cannot determine, according to transmit power used for sending information on an existing PUSCH or PUCCH, transmit power for sending information on a PUCCH in the first PUCCH format or the third PUCCH format, the power control method for an uplink control channel is provided. Specific steps of the method are as follows.

Step S201: A network device determines that user equipment is to send first uplink control information on a first PUCCH and in a subframe i, where the first uplink control information includes at least one of channel state information CSI, a hybrid automatic repeat request-acknowledgment HARQ-ACK, or a scheduling request SR.

In the prior art, formats of a PUCCH include the format 1, the format 1a, the format 1b, the format 2, the format 2a, the format 2b, and the format 3. In this embodiment of the present invention, a format of the first PUCCH is the first physical uplink control channel PUCCH format, or a format of the first PUCCH is the third physical uplink control channel PUCCH format, and both the first PUCCH format and the third PUCCH format are different from any PUCCH format in the prior art.

A network device configures multiple PUCCHs for the user equipment. The user equipment determines the first PUCCH from the multiple PUCCHs, and sends the first uplink control information in the subframe i by using the first PUCCH. Alternatively, a network device instructs, by using physical layer signaling, the user equipment to send the first uplink control information in the subframe i by using the first PUCCH. This embodiment of the present invention does not limit a method for determining the first PUCCH in the subframe i by the user equipment. The first uplink control information includes at least one of channel state information CSI, a hybrid automatic repeat request-acknowledgment HARQ-ACK, or a scheduling request SR. That is, the first uplink control information generated by the current user equipment may include one of the channel state information CSI, the hybrid automatic repeat request-acknowledgment HARQ-ACK, or the scheduling request SR; may include any two of the channel state information CSI, the hybrid automatic repeat request-acknowledgment HARQ-ACK, or the scheduling request SR; or may include all of the channel state information CSI, the hybrid automatic repeat request-acknowledgment HARQ-ACK, and the scheduling request SR.

Step S202: The network device determines transmit power for sending, by the user equipment, the first uplink control information on the first PUCCH and in the subframe i, where the transmit power is a sum of a base power adjustment value and any one of a first power adjustment value, a second power adjustment value, a third power adjustment value, a fourth power adjustment value, or a fifth power adjustment value.

The first power adjustment value is a power adjustment value determined by the user equipment according to a quantity of bits of the first uplink control information. The second power adjustment value is a power adjustment value determined by the user equipment according to the quantity of the bits of the first uplink control information and a quantity of resources of the first PUCCH. The third power adjustment value is a power adjustment value determined by the user equipment according to the quantity of the resources of the first PUCCH and a ratio of the quantity of the bits of the first uplink control information to the quantity of the resources of the first PUCCH. The fourth power adjustment value is a power adjustment value determined by the user equipment according to the quantity of the resources of the first PUCCH. The fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information.

The base power adjustment value includes a sum of $P_{O\_PUCCH}$ and $PL_c$, or the base power adjustment value includes a sum of $P_{O\_PUCCH}$ and $\alpha_c \cdot PL_c$, where $P_{O\_PUCCH}$ is a value configured for the user equipment by the network device by using higher layer signaling, $PL_c$ is a path loss that is determined by the user equipment and that is of a downlink of a cell c in which the first PUCCH is located, and $\alpha_c$ is a path loss factor that is configured for the user equipment by the network device and that is of the cell c in which the first PUCCH is located.

In this embodiment of the present invention, when the base power adjustment value includes the sum of $P_{O\_PUCCH}$ and $PL_c$, the base power adjustment value further includes at least one of $\Delta_{TxD}(F')$, g(i), or $\Delta_{F\_PUCCH}(F)$ $\Delta_{TxD}(F')$ is a power adjustment value that is configured for the user equipment by the network device and that is used when the PUCCH in the first PUCCH format uses multi-antenna transmit diversity. Optionally, a value of $\Delta_{TxD}(F')$ is −2 dB or 0 dB. g(i) is determined by using a sixth power adjustment value that is in the subframe i and that is configured for the user equipment by the network device by using physical control information. $\Delta_{F\_PUCCH}(F)$ is a power offset value that is configured for the user equipment by the network device and that is of a PUCCH in the first PUCCH format relative to a PUCCH in the second PUCCH format. Optionally, a value of $\Delta_{F\_PUCCH}(F)$ is one of −2 dB, 0 dB, 1 dB, or 2 dB. Preferably, the base power adjustment value in this embodiment of the present invention includes a sum of $P_{O\_PUCCH}$, $PL_c$, $\Delta_{TxD}(F')$ g(i), and $\Delta_{F\_PUCCH}(F)$, that is, the base power adjustment value is $P_{O\_PUCCH}+PL_c+\Delta_{TxD}(F')$ $g(i)+\Delta_{F\_PUCCH}(F)$. Alternatively, preferably, the base power adjustment value in this embodiment of the present invention includes a sum of $P_{O\_PUCCH}$, $PL_c$, g(i), and $\Delta_{F\_PUCCH}(F)$, that is, the base power adjustment value is $P_{O\_PUCCH}+PL_c+g(i)+\Delta_{F\_PUCCH}(F)$. Alternatively, preferably, the base power adjustment value in this embodiment of the present invention includes a sum of $P_{O\_PUCCH}$, $PL_c$, and g(i), that is, the base power adjustment value is $P_{O\_PUCCH}+PL_c+g(i)$.

When the base power adjustment value includes the sum of $P_{O\_PUCCH}$ and $\alpha_c \cdot PL_c$, the base power adjustment value further includes $\Delta_{TF,c}(i)$ and/or $f_c(i)$. When $K_S=0$ $\Delta_{TF,c}(i)=0$; or when $K_S=1.25$ $\Delta_{TF,c}(i)=10 \log_{10}((2^{BPRE \cdot K_S}-1)\cdot\beta_{offset}^{PUCCH})$ $K_S$ is a parameter that is configured for the user equipment by the network device by using higher layer signaling and that is of the cell c in which the first PUCCH is located. $\beta_{offset}^{PUCCH}$ is a parameter configured for the user equipment by the network device by using higher layer signaling, or $\beta_{offset}^{PUCCH}$ is equal to 1. $BPRE=O/N_{RE}$, where O is a quantity of bits of third uplink control information sent by the user equipment on the first PUCCH, the quantity of the bits of the third uplink control information includes a quantity of bits of a cyclic redundancy code CRC corresponding to the third uplink control information, and $N_{RE}$ is a quantity of modulation symbols occupied by the first PUCCH. The third uplink control information is a subset of the first uplink control information. $f_c(i)$ is a seventh power adjustment value that is in the subframe i and that is configured for the user equipment by the network device by using physical control information. Preferably, the base power adjustment value in this embodiment of the present invention includes a sum of $P_{O\_PUCCH}$, $\alpha_c \cdot PL_c$, $\Delta_{TF,c}$ (i) and $f_c(i)$, that is, the base power adjustment value may be of $P_{O\_PUCCH}+\alpha_c \cdot PL_c+\Delta_{TF,c}(i)+f_c(i)$. Alternatively, preferably, the base power adjustment value in this embodiment of the present invention includes a sum of $P_{O\_PUCCH}$, $\alpha_c \cdot PL_c$, and $f_c(i)$, that is, the base power adjustment value may be $P_{O\_PUCCH}+\alpha_c \cdot PL_c+f_c(i)$.

In addition, in this embodiment of the present invention, $P_{O\_PUCCH}=P_{O\_PUSCH}+\Delta P$, where $P_{O\_PUSCH}$ and $\Delta P$ are values configured for the user equipment by the network device by using higher layer signaling, and $\alpha_c$ may be equal to 1.

Step S203: The network device receives the first uplink control information that is sent by the user equipment on the first PUCCH by using power that is not greater than the transmit power.

The network device receives the first uplink control information that is sent by the user equipment on the first PUCCH. In a sending process, if the transmit power determined in the foregoing step is greater than a maximum transmit power of the user equipment, the user equipment sends the first uplink control information on the first PUCCH by using the maximum transmit power; or if the transmit power determined in the foregoing step is not greater than a maximum transmit power of the user equipment, the user equipment sends the first uplink control information on the first PUCCH by using the transmit power.

In this embodiment of the present invention, the transmit power for sending the first uplink control information on the first PUCCH and in the subframe i is determined by the user equipment by using the sum of the base power adjustment value and any one of the first power adjustment value determined according to the quantity of the bits of the first uplink control information that is to be sent on the first PUCCH, the second power adjustment value determined according to the quantity of the bits of the first uplink control information and the quantity of the resources of the first PUCCH, the third power adjustment value determined according to the quantity of the resources of the first PUCCH and the ratio of the quantity of the bits of the first uplink control information to the quantity of the resources of the first PUCCH, the fourth power adjustment value determined according to the quantity of the resources of the first PUCCH, the fifth power adjustment value determined according to the quantity of the resources of the first PUCCH and the ratio of the quantity of the bits of the second uplink control information to the quantity of the resources occupied on the first PUCCH by the second uplink control information, or the fifth power adjustment value determined according to the quantity of the resources of the first PUCCH and the ratio of the quantity of the bits of the second uplink control information to the quantity of the resources of the first PUCCH. Therefore, a method for determining the transmit power for sending the first uplink control information on the first PUCCH is provided.

Based on the foregoing embodiment, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

The first PUCCH is in the first physical uplink control channel PUCCH format. The PUCCH in the first PUCCH format is characterized in that: the PUCCH occupies at least one RB, and in a case of a normal cyclic prefix (normal CP), only one time-domain symbol in the middle of each timeslot corresponding to the PUCCH bears a demodulation reference signal, or two time-domain symbols in each timeslot bear a demodulation reference signal, or in a case of an extended cyclic prefix (extended CP), the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

The quantity of the resources of the first PUCCH is $K_{RE}$, a quantity of modulation symbols occupied by the first PUCCH. Alternatively, the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH. Alternatively, the quantity of the resources of the first PUCCH is $M_{RB}^{PUCCH}$, a quantity of RBs included in the first PUCCH.

The quantity of the resources occupied on the first PUCCH by the second uplink control information is $M_{RE}$, a quantity of modulation symbols occupied on the first PUCCH by the second uplink control information. Alternatively, the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

Specifically, $K_{RE}=M_{sc}^{PUCCH}\cdot N_{symb}^{PUCCH}$, where $M_{sc}^{PUCCH}$ is a quantity of subcarriers of the first PUCCH, and $N_{symb}^{PUCCH}$ is a quantity of OFDM symbols of the first PUCCH. For QPSK, $Q_m=2$. For 16QAM, $Q_m=4$.

This embodiment of the present invention specifically defines characteristics of the PUCCH in the first PUCCH format, to distinguish between the PUCCH in the first PUCCH format and a PUCCH in an existing PUCCH format, and also specifically defines a method for determining the quantity of the resources of the first PUCCH and the quantity of the resources occupied on the first PUCCH by the second uplink control information.

Based on the foregoing embodiment, a specific method for determining the transmit power includes the following five cases. Optionally, if a quantity of RBs occupied by the first PUCCH is not greater than $N_u$, the transmit power for sending, by the user equipment, the first uplink control information on the first PUCCH and in the subframe i, is a sum of the first power adjustment value and the base power adjustment value, or the transmit power is a sum of the second power adjustment value and the base power adjustment value. If a quantity of RBs occupied by the first PUCCH is greater than $N_u$, the transmit power for sending, by the user equipment, the first uplink control information on the first PUCCH and in the subframe i is a sum of the third power adjustment value and the base power adjustment value. $N_u$ is 1, 2, 3, or 4.

First case: The first power adjustment value determined according to the quantity of the bits of the first uplink control information is $h'(n_{bit}(i))$, where $n_{bit}(i)$ indicates the quantity of the bits of the first uplink control information sent on the first PUCCH.

In the first case, the transmit power is a sum of the first power adjustment value $h'(n_{bit}(i))$ and the base power adjustment value $P_{O\_PUCCH}+PL_c+\Delta_{TxD}(F')+g(i)+\Delta_{F\_PUCCH}(F)$. The transmit power is $P_{PUCCH}(i)=P_{O\_PUCCH}+PL_c+h'(n_{bit}(i))+\Delta_{F\_PUCCH}(F)+\Delta_{TxD}(F')+g(i)$. A value of $h'(n_{bit}(i))$ is determined by $n_{bit}(i)$. A specific determining relationship is as follows:

if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i))=P_2$, and $8.2\le P\le 12.12$;

if $n_{bit}(i)$ is greater than 64 and $n_{bit}(i)$ is not greater than 128, $h'(n_{bit}(i))=P_3$, and $11.4\le P_3\le 17.24$; or $$h'(n_{bit}(i))=K_1\cdot n_{bit}(i)+K_2, \text{ where } 0.05\le K_1\le 0.08, \text{ and } 5\le K_2\le 7.$$

Preferably, $K_1=0.07$, and $K_2=5.6$. Alternatively, preferably, $K_1=0.06$, and $K_2=6.2$.

$n_{bit}(i)$ indicates the quantity of the bits of the first uplink control information sent on the first PUCCH. For example, $n_{bit}(i)$ may be specifically expressed as $n_{bit}(i)=n_{CSI}+n_{HARQ}+n_{SR}$, where $n_{CSI}$ is a quantity of bits of the channel state information CSI, $n_{HARQ}$ is a quantity of bits of the hybrid automatic repeat request-acknowledgment HARQ-ACK, $n_{SR}$ is a quantity of bits of the scheduling request SR, and any one of $n_{CSI}$, $n_{HARQ}$, or $n_{SR}$ may be 0.

Second case: The second power adjustment value determined according to the quantity of the bits of the first uplink control information and the quantity of the resources of the first PUCCH is $h'(n_{bit}(i),M_{RB}^{PUCCH}(i))$, where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i),M_{RB}^{PUCCH}(i))$ is determined by $n_{bit}(i)$ and $M_{RB}^{PUCCH}(i)$.

In the second case, the transmit power is a sum of the second power adjustment value $h'(n_{bit}(i),M_{RB}^{PUCCH}(i))$ and the base power adjustment value $P_{O\_PUCCH}+PL_c+\Delta_{TxD}(F')+g(i)+\Delta_{F\_PUCCH}(F)$. The transmit power is $P_{PUCCH}(i)=P_{O\_PUCCH}+PL_c+h'(n_{bit}(i),M_{RB}^{PUCCH}(i))+\Delta_{F\_PUCCH}(F)+\Delta_{TxD}(F')+g(i)$, where $h'(n_{bit}(i),M_{RB}^{PUCCH}(i))$ indicates the second power adjustment value, $n_{bit}(i)$ indicates the quantity of the bits of the first uplink control information sent on the first PUCCH, and a value of $h'(n_{bit}(i),M_{RB}^{PUCCH}(i))$ is determined by $n_{bit}(i)$ and $M_{RB}^{PUCCH}(i)$. A specific determining relationship is as follows: $h'(n_{bit}(i),M_{RB}^{PUCCH}(i))=10\log_{10}(M_{RB}^{PUCCH}(i))+h'(n_{bit}(i))$.

When $M_{RB}^{PUCCH}(i)=1$:

if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i))=P_2$, and $8.2\le P_2\le 1212$;

if $n_{bit}(i)$ is greater than 64 and $n_{bit}(i)$ is not greater than 128, $h'n_{bit}(i))=P_3$, and $11.4\le P_3\le 17.24$; or $$h'(n_{bit}(i))=K_1\cdot n_{bit}(i)+K_2 0.05\le K_1\le 0.08, \text{ where } 0.05\le K_1\le 0.08; \text{ and } 5\le K_2\le 7.$$

Preferably, $K_1=0.07$, and $K_2=5.6$. Alternatively, preferably, $K_1=0.06$, and $K_2=6.2$.

When $M_{RB}^{PUCCH}(i)=2$:

if $n_{bit}(i)$ is not greater than 22, $h'(n_{bit}(i))=P_1$, and $5.9\le P_1\le 8.4$;

if $n_{bit}(i)$ is greater than 22 and $n_{bit}(i)$ is not greater than 64, $h'(n_{bit}(i))=P_2$, and $6.8 \le P_2 \le 10$;

if $n_{bit}(i)$ is greater than 64 and $n_{bit}(i)$ is not greater than 128, $h'(n_{bit}(i))=P_3$, and $8 \le P_3 \le 12.6$;

if $n_{bit}(i)$ is greater than 128 and $n_{bit}(i)$ is not greater than 256, $h'(n_{bit}(i))=P_4$, and $10.6 \le P_4 \le 17.7$; or $h'(n_{bit}(i))=K_1 \cdot n_{bit}(i)+K_2$, where $0.02 \le K_1 \le 0.04$, and $5.5 \le K_2 \le 7.5$.

Preferably, $K_1=0.03$, and $K_2=6.7$.

Alternatively, in the second case, the second power adjustment value determined according to the quantity of the bits of the first uplink control information and the quantity of the resources of the first PUCCH is $h'(n'_{bit}(i),M_{RB}^{PUCCH}(i))$, where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i)$ is the quantity of the RBs included in the first PUCCH, and a value of $h'(n'_{bit}(i), M_{RB}^{PUCCH}(i))$ is determined by $n'_{bit}(i)$ and $M_{RB}^{PUCCH}(i)$.

Preferably, $h'(n'_{bit}(i),M_{RB}^{PUCCH}(i))=10 \log_{10}(M_{RB}^{PUCCH}(i))+h'(n'_{bit}(i))$, where when $M_{RB}^{PUCCH}(i)=1$, $h'(n'_{bit}(i))=K_1 \times n'_{bit}(i)+K_2$, where $0.05 \le K_1 \le 0.08$, and $-1.6 \le K_2 \le -0.7$; or when $M_{RB}^{PUCCH}(i)=2$, $h'(n'_{bit}(i))=K_1 \times n'_{bit}(i)+K_2$, where $0.03 \le K_1 \le 0.05$, and $-0.3 \le K_2 \le 0.5$.

Alternatively, preferably, $h'(n'_{bit}(i),M_{RB}^{PUCCH}(i))=10 \log_{10}(M_{RB}^{PUCCH}(i))+h'(n'_{bit}(i))$, where when $M_{RB}^{PUCCH}(i)=1$, $h'(n'_{bit}(i))=K_1 \times (n'_{bit}(i)+8)+K_2$, where $0.05 \le K_1 \le 0.075$, and $-2.2K_2 \le -1.1$; or when $M_{RB}^{PUCCH}(i)=2$, $h'(n'_{bit}(i))=K_1 \times (n'_{bit}(i)+8)+K_2$, where $0.03 \le K_1 \le 0.08$, and $-0.6 \le K_2 \le 0.1$.

When the second power adjustment value is $h'(n'_{bit}(i), M_{RB}^{PUCCH}(i))$, the transmit power is $P_{PUCCH}(i)= P_{O\_PUCCH}+PL_c+h'(n'_{bit}(i),M_{RB}^{PUCCH}(i))+\Delta_{F\_PUCCH}(F)+ \Delta_{TxD}(F')+g(i)$ or $P_{PUCCH}(i)=P_{O\_PUCCH}+\alpha_c \cdot PL_c+h'(n'_{bit}(i), M_{RB}^{PUCCH}(i))+\Delta_{F\_PUCCH}(F)+\Delta_{TxD}(F')+f_c(i)$.

When the first PUCCH is in the first physical uplink control channel PUCCH format, and the PUCCH in the first physical uplink control channel PUCCH format does not support a transmit diversity solution, the transmit power is $P_{PUCCH}(i)=P_{O\_PUCCH}+PL_c+h'(n'_{bit}(i),M_{RB}^{PUCCH}(i))+ \Delta_{F\_PUCCH}(F)+g(i)$ or $P_{PUCCH}(i)=P_{O\_PUCCH}+\alpha_c \cdot PL_c+ h'(n'_{bit}(i),M_{RB}^{PUCCH}(i))+\Delta_{F\_PUCCH}(F)+f_c(i)$, where $P_{O\_PUCCH}$ is a value configured for the user equipment by the network device by using higher layer signaling, and is used to determine the transmit power of the first PUCCH in the first physical uplink control channel. $P_{O\_PUCCH}$ is determined by a cell-level parameter $P_{O\_NOMINAL\_PUCCH\_2}$ and a user-level parameter $P_{O\_UE\_PUCCH\_2}$ that are configured for the user equipment by the network device. In the prior art, a network device configures a cell-level parameter $P_{O\_NOMINAL\_PUCCH\_1}$ and a user-level parameter $P_{O\_UE\_PUCCH\_1}$ for the user equipment by using higher layer signaling. A value of $P_{O\_NOMINAL\_PUCCH\_1}$ ranges from −127 dBm to −96 dBm. A value of $P_{O\_UE\_PUCCH\_1}$ ranges from −8 dB to 7 dB. A sum $P_{O\_PUCCH\_1}$ of values of the two parameters is configured for the user equipment by the network device and is used to adjust transmit power for performing, by the user equipment, sending on a PUCCH in an existing PUCCH format (including the PUCCH format 1, the PUCCH format 1a, the PUCCH format 1b, the PUCCH format 2, the PUCCH format 2a, the PUCCH format 2b, and the PUCCH format 3). In the prior art, the network device further configures a cell-level parameter $P_{O\_NOMINAL\_PUSCH}$ and a user-level parameter $P_{O\_UE\_PUSCH}$ a for the user equipment by using higher layer signaling. A value of $P_{O\_NOMINAL\_PUSCH}$ a ranges from −126 dBm to 24 dBm. A value of $P_{O\_UE\_PUSCH}$ a ranges from −8 dB to 7 dB. A sum $P_{O\_PUSCH}$ of values of the two parameters is configured for the user equipment by the network device and is used to adjust transmit power for performing, by the user equipment, sending on a PUSCH. $P_{O\_PUCCH}$ is determined by the cell-level parameter $P_{O\_NOMINAL\_PUCCH\_2}$ and the user-level parameter $P_{O\_UE\_PUCCH\_2}$ a that are configured for the user equipment by the network device. $P_{O\_NOMINAL\_PUCCH\_2}$ may be any one of the cell-level parameter $P_{O\_NOMINAL\_PUCCH\_1}$ or $P_{O\_NOMINAL\_PUSCH}$ that is configured for an existing PUCCH format by the network device, or may be determined by another parameter configured by the network device. $P_{O\_UE\_PUCCH\_2}$ may be any one of the user-level parameter $P_{O\_UE\_PUCCH\_1}$ or $P_{O\_UE\_PUSCH}$ that is configured for an existing PUCCH format by the network device, or may be determined by another parameter configured by the network device. If $P_{O\_NOMINAL\_PUCCH\_2}$ is determined by the another parameter configured by the network device, a value of the parameter ranges from −126 dBm to 24 dBm. If $P_{O\_UE\_PUCCH\_2}$ is determined by the another parameter configured by the network device, a value of the parameter ranges from −8 dB to 7 dB.

$\Delta_{F\_PUCCH}(F)$ is the power offset value that is configured for the user equipment by the network device and that is of the PUCCH in the first PUCCH format relative to the PUCCH in the second PUCCH format.

$g(i)$ and $f_c(i)$ indicate power adjustment values that are sent to the user equipment by the network device by using a physical downlink control channel.

Third case: The third power adjustment value determined according to the quantity of the resources of the first PUCCH and the ratio of the quantity of the bits of the first uplink control information to the quantity of the resources of the first PUCCH is $k(m(i),M_{RB}^{PUCCH}(i))$ where $m(i)$ indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by $m(i)$ and $M_{RB}^{PUCCH}(i)$. In this case, the transmit power is the sum of the third power adjustment value $k(m(i),M_{RB}^{PUCCH}(i))$ and the base power adjustment value $P_{O\_PUCCH}+P_L+\Delta_{TxD}(F')+ g(i)+\Delta_{F\_PUCCH}(F)$. The transmit power is $P_{PUCCH}(i)= P_{O\_PUCCH}+PL_c+k(m(i),M_{RB}^{PUCCH}(i))+\Delta_{F\_PUCCH}(F)+ \Delta_{TxD}(F')+g(i)$, where $k(m(i),M_{RB}^{PUCCH}(i))$ indicates the third power adjustment value, $m(i)$ indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by $m(i)$ and $M_{RB}^{PUCCH}(i)$. A specific determining relationship is as follows.

When the quantity of the resources of the first PUCCH is $M_{RB}^{PUCCH}(i)$, the quantity of the RBs included in the first PUCCH, $k(m(i),M_{RB}^{PUCCH}(i))=10 \log_{10}(M_{RB}^{PUCCH}(i))+ q'(m(i))$.

When $M_{RB}^{PUCCH}(i)=1$:

if $m(i)$ is not greater than 22, $q'(m(i))=P_1$, and $6.1 \le P_1 \le 8.76$;

if $m(i)$ is greater than 22 and $m(i)$ is not greater than 64, $q'(m(i))=P_2$, and $8.2 \le P_2 \le 12.12$;

if $m(i)$ is greater than 64 and $m(i)$ is not greater than 128, $q'(m(i))=P_3$, and $11.4 \le P_3 \le 17.24$; or $q'(m(i))=K_1 \cdot m(i)+K_2$, where $0.05 \le K_1 \le 0.08$, and $5 \le K_2 \le 7$.

Preferably, $K_1=0.07$, and $K_2=5.6$. Alternatively, preferably, $K_1=0.06$, and $K_2=6.2$.

When $M_{RB}^{PUCCH}(i)=2$:

if m(i) is not greater than 22, $q'(m(i))=P_1$, and $5.9 \le P_1 \le 8.4$;

if m(i) is greater than 22 and m(i) is not greater than 64, $q'(m(i))=P_2$, and $6.8 \le P_2 \le 10$;

if m(i) is greater than 64 and m(i) is not greater than 128, $q'(m(i))=P_3$, and $8 \le P_3 \le 12.6$;

if m(i) is greater than 128 and m(i) is not greater than 256, $q'(m(i))=P_4$, and $10.6 \le P_4 \le 17.7$; or $q'(m(i))=K_1 \cdot m(i)+K_2$, where $0.02 \le K_1 \le 0.04$, and $5.5 \le K_2 \le 7.5$.

Preferably, $K_1=0.03$, and $K_2=6.7$.

When the quantity of the resources of the first PUCCH is RE, the quantity of the modulation symbols occupied by the first PUCCH, $k(m(i),M_{RB}^{PUCCH}(i))=10 \log_{10}(M_{RB}^{PUCCH}(i))+q'(m(i))$.

When $M_{RB}^{PUCCH}(i)=1$:

$q'(m(i))=K_1 \cdot m(i)+K_2$, where $8 \le K_1 \le 11$, and $5 \le K_2 \le 7$.

Preferably, $K_1=8.4$, and $K_2=6.3$.

When $M_{RB}^{PUCCH}(i)=2$:

$q'(m(i))=K_1 \cdot m(i)+K_2$, where $8.5 \le K_1 \le 10.5$, and $6 \le K_2 \le 8$.

Preferably, $K_1=9.5$, and $K_2=6.7$.

Alternatively, the determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is $10 \log_{10}(M_{RB}^{PUCCH}(i))+10 \log_{10}((2^{K_S BPRE}-1)\cdot\beta_{offset}^{PUCCH})$ where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

Preferably, $K_S=1.25$. In this case, the transmit power is the sum of the third power adjustment value $10 \log_{10}(M_{RB}^{PUCCH}(i))+10 \log_{10}((2^{1.25BPRE}-1)\cdot\beta_{offset}^{PUCCH})$ and the base power adjustment value $P_{O\_PUCCH}+PL_c+g(i)$, that is, the transmit power of the PUCCH is $P_{PUCCH}(i)=P_{O\_PUCCH}+PL_c+10 \log_{10}(M_{RB}^{PUCCH}(i))+10 \log_{10}((2^{1.25BPRE}-1)\cdot\beta_{offset}^{PUCCH})+g(i)$.

Alternatively, the transmit power is the sum of the third power adjustment value $10 \log_{10}(M_{RB}^{PUCCH}(i))+10 \log_{10}((2^{1.25BPRE}-1)\cdot\beta_{offset}^{PUCCH})$ and the base power adjustment value $P_{O\_PUCCH}+\alpha_c\cdot PL_c+f_c(i)$, that is, the transmit power of the PUCCH is $P_{PUCCH}(i)=P_{O\_PUCCH}+\alpha_c\cdot PL_c+10 \log_{10}(M_{RB}^{PUCCH}(i))+10 \log_{10}((2^{1.25BPRE}-1)\cdot\beta_{offset}^{PUCCH})+f_c(i)$, where $P_{O\_PUCCH}$ is the same as $P_{O\_PUCCH}$ in the second case, $PL_c$ is the path loss that is determined by the user equipment and that is of the downlink of the cell c in which the first PUCCH is located, $\alpha_c$ is the path loss factor that is configured for the user equipment by the network device and that is of the cell c in which the first PUCCH is located, g(i) is the same as g(i) in the second case, and $f_c(i)$ is the same as $f_c(i)$ in the second case.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following: a channel quality indicator CQI and/or a precoding matrix indicator PMI, a hybrid automatic repeat request HARQ-ACK, or a rank indication RI. If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

In the prior art, the network device configures parameters "betaOffset-ACK-Index", "betaOffset-RI-Index", and "betaOffset-CQI-Index" for the user equipment by using higher layer signaling. The parameters are respectively used to determine parameters $\beta_{offset}^{HARQ\text{-}ACK}$, $\beta_{offset}^{RI}$, and $\beta_{offset}^{CQI}$ that are required when the user equipment determines a quantity of PUSCH modulation symbols occupied for sending HARQ-ACK, rank indication (RI), and channel quality indicator (CQI)/precoding matrix indicator (PMI) information on a single-codeword PUSCH. Values of the parameters are integers within [0,15]. The network device configures parameters "betaOffset-ACK-Index-MC-r10", "betaOffset-RI-Index-MC-r10", and "betaOffset-CQI-Index-MC-r10" for the user equipment by using higher layer signaling. The parameters are respectively used to determine the parameters $\beta_{offset}^{HARQ\text{-}ACK}$, $\beta_{offset}^{RI}$, and $\beta_{offset}^{CQI}$ that are required when the user equipment determines a quantity of PUSCH modulation symbols occupied for sending the HARQ-ACK, RI, and CQI/PMI information on a multi-codeword PUSCH. Optionally, the user equipment determines that the quantity of the PUSCH modulation symbols occupied for sending the HARQ-ACK, RI, and CQI/PMI information on the multi-codeword PUSCH are a product of $\beta_{offset}^{HARQ\text{-}ACK}$ and a first ratio, a product of $\beta_{offset}^{RI}$ and the first ratio, and a product of $\beta_{offset}^{CQI}$ and the first ratio respectively. The first ratio is $O\cdot M_{RE}/R$, where O is a quantity of bits of the HARQ-ACK, the RI, or the CQI/PMI (if CRC parity bits are added before channel encoding when the HARQ-ACK, RI, or CQI/PMI information is transmitted on the PUSCH, the quantity of the bits includes a bit quantity of CRC parity bits corresponding to the HARQ-ACK, RI, or CQI/PMI information), $M_{RE}$ is a quantity of modulation symbols of the PUSCH, and R is a quantity of bits of uplink data sent on the PUSCH.

Optionally, $\beta_{offset}^{HARQ\text{-}ACK}$, $\beta_{offset}^{RI}$, and $\beta_{offset}^{CQI}$ are ratios of a first quantity of modulation symbols to a second quantity of modulation symbols. The first quantity of modulation symbols is a quantity of modulation symbols of the PUSCH that are occupied when first encoded modulation symbols obtained by encoding and modulating uplink control information of the HARQ-ACK, RI, or CQI/PMI are sent on the PUSCH. The second quantity of modulation symbols is a quantity of modulation symbols of the PUSCH that are occupied when second encoded modulation symbols obtained by encoding and modulating uplink data are sent on the PUSCH. A quantity of the first encoded modulation symbols is equal to a quantity of the second encoded modulation symbols.

$\beta_{offset}^{PUCCH}$ in the third power adjustment value may be one of the parameter $\beta_{offset}^{HARQ-ACK}$, $\beta_{offset}^{RI}$, or $\beta_{offset}^{CQI}$ that is corresponding to a parameter configured for the UE by the network device.

$\beta_{offset}^{PUCCH}$ in the third power adjustment value is configured for the user equipment by the network device by using the higher layer signaling. $\beta_{offset}^{PUCCH}$ may be $\beta_{offset}^{HARQ-ACK}$ corresponding to the parameter "betaOffset-ACK-Index" or "betaOffset-ACK-Index-MC-r10" that is configured for the UE by the network device. $\beta_{offset}^{HARQ-ACK}$ corresponding to the parameter "betaOffset-ACK-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{RI}$ corresponding to the parameter "betaOffset-RI-Index" or "betaOffset-RI-Index-MC-r10" that is configured for the UE by the network device. $\beta_{offset}^{RI}$ corresponding to the parameter "betaOffset-RI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{CQI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{CQI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be one of $\beta_{offset}^{HARQ-ACK}$, $\beta_{offset}^{RI}$, or, $\beta_{offset}^{CQI}$ that is corresponding to a parameter configured for the UE by the network device. Specifically, if the first uplink control information includes the HARQ-ACK or the RI, $\beta_{offset}^{PUCCH}$ in the third power adjustment value may be $\beta_{offset}^{HARQ-ACK}$ or $\beta_{offset}^{RI}$ that is corresponding to a parameter configured for the UE by the network device; if the first uplink control information does not include the HARQ-ACK and the RI, $\beta_{offset}^{PUCCH}$ in the third power adjustment value may be $\beta_{offset}^{CQI}$ that is corresponding to a parameter configured for the UE by the network device.

It should be noted that if the quantity of the resources of the PUCCH in the first PUCCH format is fixedly one RB, the third power adjustment value is a power adjustment value determined by the user equipment according to the ratio of the quantity of the bits of the first uplink control information to the quantity of the resources of the first PUCCH, and impact of the quantity of the resources of the first PUCCH on the third power adjustment value may not be considered.

Fourth case: The fourth power adjustment value determined according to the quantity of the resources of the first PUCCH is $10\log_{10}(M_{RB}^{PUCCH}(i))$, here $M_{RB}^{PUCCH}(i)$ is the quantity of the RBs included in the first PUCCH.

In the fourth case, the transmit power is a sum of the fourth power adjustment value $10\log_{10}(M_{RB}^{PUCCH}(i))$ and the base power adjustment value $P_{O\_PUCCH}+\alpha_c\cdot PL_c+\Delta_{TF,c}(i)+f_c(i)$. The transmit power is $P_{PUCCH}(i)=10\log_{10}(M_{RB}^{PUCCH}(i))+P_{O\_PUCCH}+\alpha_c\cdot PL_c+\Delta_{TF,c}(i)+f_c(i)$, where $M_{RB}^{PUCCH}(i)$ is the quantity of the RBs included in the first PUCCH.

Fifth case: The fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i),M_{RB}^{PUCCH}(i))$ where r(i) indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by r(i) and $M_{RB}^{PUCCH}(i)$.

In the fifth case, the transmit power is a sum of the fifth power adjustment value and the base power adjustment value. The second uplink control information is a subset of the first uplink control information, and the second uplink control information is at least one type of uplink control information with a highest priority in the first uplink control information. A priority sequence includes at least one of the following cases: a priority of the HARQ-ACK is higher than a priority of the CSI, a priority of the SR is equal to or higher than a priority of the HARQ-ACK, a priority of an RI/PTI in the CSI is higher than a priority of a CQI/PMI in the CSI, or a priority of an RI/PTI in the CSI is equal to a priority of the HARQ-ACK. Alternatively, the second uplink control information is at least one type of uplink control information that is in the first uplink control information and that is used to determine a benchmark of a quantity of resources occupied on the first PUCCH by each piece of control information in the first uplink control information. For example, a quantity of resources occupied on the first PUCCH by other control information may be determined according to a preset ratio or difference between the quantity of the resources occupied on the first PUCCH by the other control information and a quantity of resources occupied on the first PUCCH by the at least one type of uplink control information.

It should be noted that if the quantity of the resources of the PUCCH in the first PUCCH format is fixedly one RB, the fifth power adjustment value is a power adjustment value determined by the user equipment according to the ratio of the quantity of the bits of the second uplink control information to the quantity of the resources occupied on the first PUCCH by the second uplink control information or a power adjustment value determined by the user equipment according to the ratio of the quantity of the bits of the second uplink control information to the quantity of the resources of the first PUCCH, and impact of the quantity of the resources of the first PUCCH on the fifth power adjustment value may not be considered.

In addition, the first PUCCH may be in the third physical uplink control channel PUCCH format. The PUCCH in the third PUCCH format is characterized in that: the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

When the first PUCCH is in the third physical uplink control channel PUCCH format, the first power adjustment value determined according to the quantity of the bits of the first uplink control information is $k'(n_{bit}(i))$, where $n_{bit}(i)$ indicates the quantity of the bits of the first uplink control information sent on the first PUCCH; and $$k'(n_{bit}(i))=K_1 \cdot n_{bit}(i)+K_2, \text{ where } 0.08 \le K_1 \le 0.12, \text{ and } -3.7 \le K_2 \le -2.7.$$

In this case, the transmit power is the sum of the first power adjustment value $k'(n_{bit}(i))$ and the base power adjustment value $P_{O\_PUCCH}+PL_c+g(i)+\Delta_{F\_PUCCH}(F)$, that is, the transmit power is $P_{PUCCH}(i)\ P_{O\_PUCCH}+PL_c+k'(n_{bit}(i))+\Delta_{F\_PUCCH}(F)+g(i)$.

When the first PUCCH is in the third physical uplink control channel PUCCH format, the third power adjustment value determined according to the quantity of the RBs included in the first PUCCH and the ratio of the quantity of the bits of the first uplink control information to $K_{RE}$, the quantity of the modulation symbols occupied by the first PUCCH is $10\log_{10}((2^{K_S BPRE}-1)\cdot\beta_{offset}^{PUCCH})$, where BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

Preferably, $K_S=1.25$. In this case, the transmit power is the sum of the third power adjustment value $10\log_{10}((2^{1.25BPRE}-1)\cdot\beta_{offset}^{PUCCH})$ and the base power adjustment value $P_{O\_PUCCH}+PL_c+g(i)$, that is, the transmit power is $P_{PUCCH}(i)=P_{O\_PUCCH}+PL_c+10\log_{10}((2^{1.25BPRE}-1)\cdot\beta_{offset}^{PUCCH})+g(i)$.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following: a channel quality indicator CQI and/or a precoding matrix indicator PMI, a hybrid automatic repeat request HARQ-ACK, or a rank indication RI. If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

$\beta_{offset}^{PUCCH}$ in the third power adjustment value may be one of the parameter $\beta_{offset}^{HARQ\text{-}ACK}$, $\beta_{offset}^{RI}$, or $\beta_{offset}^{CQI}$ that is corresponding to a parameter configured for the UE by the network device.

$\beta_{offset}^{PUCCH}$ in the third power adjustment value is configured for the user equipment by the network device by using the higher layer signaling. $\beta_{offset}^{PUCCH}$ may be $\beta_{offset}^{HARQ\text{-}ACK}$ corresponding to the parameter "betaOffset-ACK-Index" or "betaOffset-ACK-Index-MC-r10" that is configured for the UE by the network device. $\beta_{offset}^{HARQ\text{-}ACK}$ corresponding to the parameter "betaOffset-ACK-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{RI}$ corresponding to the parameter "betaOffset-RI-Index" or "betaOffset-RI-Index-MC-r10" that is configured for the UE by the network device. $\beta_{offset}^{RI}$ corresponding to the parameter "betaOffset-RI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{CQI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be $\beta_{offset}^{CQI}$ corresponding to the parameter "betaOffset-CQI-Index" or "betaOffset-CQI-Index-MC-r10" that is configured for the UE by the network device. $\beta_{offset}^{CQI}$ corresponding to the parameter "betaOffset-CQI-Index" is preferred.

Alternatively, $\beta_{offset}^{PUCCH}$ in the third power adjustment value is configured for the user equipment by the network device by using the higher layer signaling. $\beta_{offset}^{PUCCH}$ may be one of $\beta_{offset}^{HARQ\text{-}ACK}$, $\beta_{offset}^{RI}$, or $\beta_{offset}^{CQI}$ that is corresponding to a parameter configured for the UE by the network device. Specifically, if the first uplink control information includes the HARQ-ACK or the RI, $\beta_{offset}^{PUCCH}$ in the third power adjustment value may be $\beta_{offset}^{HARQ\text{-}ACK}$ or $\beta_{offset}^{RI}$ that is corresponding to a parameter configured for the UE by the network device; if the first uplink control information does not include the HARQ-ACK and the RI, $\beta_{offset}^{PUCCH}$ in the third power adjustment value may be $\beta_{offset}^{CQI}$ that is corresponding to a parameter configured for the UE by the network device.

This embodiment of the present invention specifically provides an expression for calculating the transmit power according to the sum of the base power adjustment value and any one of the first power adjustment value, the second power adjustment value, the third power adjustment value, the fourth power adjustment value, or the fifth power adjustment value, and provides a method for calculating the transmit power for sending the first uplink control information on the first PUCCH.

Figure 3:
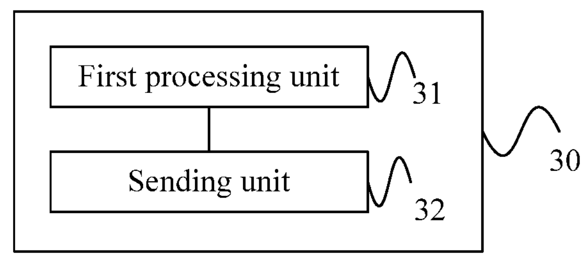
FIG. 3 is a structural diagram of user equipment according to an embodiment of the present invention.

FIG. 3 is a structural diagram of user equipment according to an embodiment of the present invention. The user equipment provided in this embodiment of the present invention can execute a processing procedure provided in the embodiments of the power control method for an uplink control channel. As shown in FIG. 3, the user equipment 30 includes a first processing unit 31 and a sending unit 32. The first power adjustment value is a power adjustment value determined by the user equipment according to a quantity of bits of the first uplink control information. The second power adjustment value is a power adjustment value determined by the user equipment according to the quantity of the bits of the first uplink control information and a quantity of resources of the first PUCCH. The third power adjustment value is a power adjustment value determined by the user equipment according to the quantity of the resources of the first PUCCH and a ratio of the quantity of the bits of the first uplink control information to the quantity of the resources of the first PUCCH. The fourth power adjustment value is a power adjustment value determined by the user equipment according to the quantity of the resources of the first PUCCH. The fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information.

The base power adjustment value includes a sum of $P_{O\_PUCCH}$ and $PL_c$, or the base power adjustment value includes a sum of $P_{O\_PUCCH}$ and $\alpha_c \cdot PL_c$, where $P_{O\_PUCCH}$ is a value configured for the user equipment by the network device by using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

The first processing unit 31 in this embodiment of the present invention may be implemented by a processor.

In this embodiment of the present invention, the transmit power for sending the first uplink control information on the first PUCCH and in the subframe i is determined by the user equipment by using the sum of the base power adjustment value and any one of the first power adjustment value determined according to the quantity of the bits of the first uplink control information that is to be sent on the first PUCCH, the second power adjustment value determined according to the quantity of the bits of the first uplink control information and the quantity of the resources of the first PUCCH, the third power adjustment value determined according to the quantity of the resources of the first PUCCH and the ratio of the quantity of the bits of the first uplink control information to the quantity of the resources of the first PUCCH, the fourth power adjustment value determined according to the quantity of the resources of the first PUCCH, the fifth power adjustment value determined according to the quantity of the resources of the first PUCCH and the ratio of the quantity of the bits of the second uplink control information to the quantity of the resources occupied on the first PUCCH by the second uplink control information, or the fifth power adjustment value determined according to the quantity of the resources of the first PUCCH and the ratio of the quantity of the bits of the second uplink control information to the quantity of the resources of the first PUCCH. Therefore, a method for determining the transmit power for sending the first uplink control information on the first PUCCH is provided.

Based on the foregoing embodiment, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

The first PUCCH is in a first physical uplink control channel PUCCH format. The PUCCH in the first PUCCH format is characterized in that:

the PUCCH occupies at least one RB, and in a case of a normal cyclic prefix, only one time-domain symbol in the middle of each timeslot corresponding to the PUCCH bears a demodulation reference signal, or two time-domain symbols in each timeslot bear a demodulation reference signal, or in a case of an extended cyclic prefix, the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

If a quantity of RBs occupied by the first PUCCH is not greater than $N_u$, the transmit power for sending, by the user equipment, the first uplink control information on the first PUCCH and in the subframe i is a sum of the first power adjustment value and the base power adjustment value, or the transmit power is a sum of the second power adjustment value and the base power adjustment value; or if a quantity of RBs occupied by the first PUCCH is greater than $N_u$, the transmit power for sending, by the user equipment, the first uplink control information on the first PUCCH and in the subframe i is a sum of the third power adjustment value and the base power adjustment value, where $N_u$ is 1, 2, 3, or 4.

The quantity of the resources of the first PUCCH is $K_{RE}$, a quantity of modulation symbols occupied by the first PUCCH.

Alternatively, the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH.

Alternatively, the quantity of the resources of the first PUCCH is $M_{RB}^{PUCCH}(i)$, a quantity of RBs included in the first PUCCH.

The quantity of the resources occupied on the first PUCCH by the second uplink control information is $M_{RE}$, a quantity of modulation symbols occupied on the first PUCCH by the second uplink control information.

Alternatively, the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

The first power adjustment value determined according to the quantity of the bits of the first uplink control information is $h'(n_{bit}(i))$, where $n_{bit}(i)$ indicates the quantity of the bits of the first uplink control information sent on the first PUCCH.

If $n_{bit}(i)$ is not greater than 22, $h'(n_{bit}(i))=P_1$, and $6.1 \le P_1 \le 8.76$;

if $n_{bit}(i)$ is greater than 22 and $n_{bit}(i)$ is not greater than 64, $h'(n_{bit}(i))=P_2$, and $8.2 \le P_2 \le 12.12$;

if $n_{bit}(i)$ is greater than 64 and $n_{bit}(i)$ is not greater than 128, $h'(n_{bit}(i)=P_3$, and $11.4 \le P_3 \le 17.24$; or $$h'(n_{bit}(i))=K_1 \cdot n_{bit}(i)+K_2, \text{ where } 0.05 \le K_1 \le 0.08, \text{ and } 5 \le K_2 \le 7.$$

The second power adjustment value determined according to the quantity of the bits of the first uplink control information and the quantity of the resources of the first PUCCH is $h'(n_{bit}(i),M_{RB}^{PUCCH}(i))$, where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i), M_{RB}^{PUCCH}(i))$ is determined by $n_{bit}(i)$ and $M_{RB}^{PUCCH}(i)$.

$$h'(n_{bit}(i), M_{RB}^{PUCCH}(i)) = 10\log_{10}(M_{RB}^{PUCCH}(i)) + h'(n_{bit}(i)),\text{ where}$$

when $M_{RB}^{PUCCH}(i)=1$:

if $n_{bit}(i)$ is not greater than 22, $h'(n_{bit}(i))=P_1$, and $6.1 \le P_1 \le 8.76$;

if $n_{bit}(i)$ is greater than 22 and $n_{bit}(i)$ is not greater than 64, $h'(n_{bit}(i))=P_2$, and $8.2 \le P_2 \le 12.12$;

if $n_{bit}(i)$ is greater than 64 and $n_{bit}(i)$ is not greater than 128, $h'(n_{bit}(i))=P_3$, and $11.4 \le P_3 \le 17.24$; or $$h'(n_{bit}(i)) = K_1 \cdot n_{bit}(i) + K_2,\text{ where } 0.05 \le K_1 \le 0.08,\text{ and } 5 \le K_2 \le 7;\text{ or}$$

when $M_{RB}^{PUCCH}(i)=2$:

if $n_{bit}(i)$ is not greater than 22, $h'(n_{bit}(i))=P_1$, and $5.9 \le P_1 \le 8.4$;

if $n_{bit}(i)$ is greater than 22 and $n_{bit}(i)$ is not greater than 64, $h'(n_{bit}(i))=P_2$, and $6.8 \le P_2 \le 10$;

if $n_{bit}(i)$ is greater than 64 and $n_{bit}(i)$ is not greater than 128, $h'(n_{bit}(i))=P_3$, and $8 \le P_3 \le 12.6$;

if $n_{bit}(i)$ is greater than 128 and $n_{bit}(i)$ is not greater than 256, $h'(n_{bit}(i))=P_4$, and $10.6 \le P_4 \le 17.7$; or $$h'(n_{bit}(i)) = K_1 \cdot n_{bit}(i) + K_2,\text{ where } 0.02 \le K_1 \le 0.04,\text{ and } 5.5 \le K_2 \le 7.5.$$

The second power adjustment value determined according to the quantity of the bits of the first uplink control information and the quantity of the resources of the first PUCCH is $h'(n'_{bit}(i), M_{RB}^{PUCCH}(i))$, where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i)$ is the quantity of the RBs included in the first PUCCH, and a value of $h'(n_{bit}(i), M_{RB}^{PUCCH}(i))$ is determined by $n'_{bit}(i)$ and $M_{RB}^{PUCCH}(i)$.

$$h'(n'_{bit}(i), M_{RB}^{PUCCH}(i)) = 10\log_{10}(M_{RB}^{PUCCH}(i)) + h'(n'_{bit}(i)),\text{ where}$$

when $M_{RB}^{PUCCH}(i)=1$, $h'(n'_{bit}(i))=K_1 \times n'_{bit}(i)+K_2$, where $0.05 \le K_1 \le 0.08$; and $-1.6 \le K_2 \le -0.7$; or when $M_{RB}^{PUCCH}(i)=2$, $h'(n'_{bit}(i))=K_1 \times n'_{bit}(i)+K_2$, where $0.03 \le K_1 \le 0.05$, and $-0.3 \le K_2 \le 0.5$.

$$h'n'_{bit}(i) M_{RB}^{PUCCH}(i)) = 10 \quad \log_{10}(M_{RB}^{PUCCH}(i)) + h'(n'_{bit})),\text{ where}$$

when $M_{RB}^{PUCCH}(i)=1$, $h'(n'_{bit}(i))=K_1 \times (n'_{bit}(i)+8)+K_2$, where $0.05 \le K_1 \le 0.075$, and $-2.2 \le K_2 \le -1.1$; or when $M_{RB}^{PUCCH}(i)=2$, $h'(n'_{bit}(i))=K_1 \times (n'_{bit}(i)+8)+K_2$, where $0.03 \le K_1 \le 0.08$; and $-0.6 \le K_2 \le 0.1$.

The third power adjustment value determined according to the quantity of the resources of the first PUCCH and the ratio of the quantity of the bits of the first uplink control information to the quantity of the resources of the first PUCCH is $k(m(i), M_{RB}^{PUCCH}(i))$, where $m(i)$ indicates the ratio of the quantity of the bits of the first uplink control information sent by the user equipment on the first PUCCH to the quantity of the resources of the first PUCCH, and a value of $k(m(i), M_{RB}^{PUCCH}(i))$ is determined by $m(i)$ and $M_{RB}^{PUCCH}(i)$.

When the quantity of the resources of the first PUCCH is $M_{RB}^{PUCCH}(t)$, the quantity of the RBs included in the first PUCCH, $k(m(i), M_{RB}^{PUCCH}(i))=10\log_{10}(M_{RB}^{PUCCH}(i))+q'(m(i))$, where when $M_{RB}^{PUCCH}(i)=1$:

if $m(i)$ is not greater than 22, $q'(m(i))=P_1$, and $6.1 \le P_1 \le 8.76$;

if $m(i)$ is greater than 22 and $m(i)$ is not greater than 64, $q'(m(i))=P_2$, and $8.2 \le P_2 \le 12.12$;

if $m(i)$ is greater than 64 and $m(i)$ is not greater than 128, $q'(m(i))=P_3$, and $11.4 \le P_3 \le 17.24$; or $$q'(m(i)) = K_1 \cdot m(i) + K_2,\text{ where } 0.05 \le K_1 \le 0.08\text{ and } 5 \le K_2 \le 7;\text{ or}$$

when $M_{RB}^{PUCCH}(i)=2$:

if $m(i)$ is not greater than 22, $q'(m(i))=P_1$, and $5.9 \le P_1 \le 8.4$;

if $m(i)$ is greater than 22 and $m(i)$ is not greater than 64, $q'(m(i))=P_2$, and $6.8 \le P_2 \le 10$;

if $m(i)$ is greater than 64 and $m(i)$ is not greater than 128, $q'(m(i))=P_3$, and $8 \le P_3 \le 12.6$;

if $m(i)$ is greater than 128 and $m(i)$ is not greater than 256, $q'(m(i))=P_4$, and $10.6 \le P_4 \le 17.7$; or $$q'(m(i)) = K_1 \cdot m(i) + K_2,\text{ where } 0.02 \le K_1 \le 0.04,\text{ and } 5.5 \le K_2 \le 7.5.$$

When the quantity of the resources of the first PUCCH is $K_{RE}$, the quantity of the modulation symbols occupied by the first PUCCH, $k(m(i), M_{RB}^{PUCCH}(i))=10\log_{10}(M_{RB}^{PUCCH}(i))+q'(m(i))$, where when $M_{RB}^{PUCCH}(i)=1$, $q'(m(i))=K_1 \cdot m(i)+K_2$, where $8 \le K_1$ 11, and $5 \le K_2 \le 7$; or when $M_{RB}^{PUCCH}(i)=2$, $q'(m(i))=K_1 \cdot m(i)+K_2$, where $8.5 \le K_1$ 10.5, and $6 \le K_2 \le 8$.

The determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is $10\log_{10}(M_{RB}^{PUCCH}(i))/+10\log_{10}((2^{K_S \cdot BPRE}-1)\cdot\beta_{offset}^{PUCCH}$, where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI.

If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

The fourth power adjustment value determined according to the quantity of the resources of the first PUCCH is $10\log_{10}(M_{RB}^{PUCCH}(i))$ where $M_{RB}^{PUCCH}(i)$ is the quantity of the RBs included in the first PUCCH.

The fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i),M_{RB}^{PUCCH}(i))$, where r(i) indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by r(i) and $M_{RB}^{PUCCH}(i)$.

The first PUCCH is in a third physical uplink control channel PUCCH format. The PUCCH in the third PUCCH format is characterized in that:

the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

The first power adjustment value determined according to the quantity of the bits of the first uplink control information is $k'(n_{bit}(i))$, where $n_{bit}(i)$ indicates the quantity of the bits of the first uplink control information sent on the first PUCCH; and $$k'(n_{bit}(i))=K_1\cdot n_{bit}(i)+K_2, \text{ where } 0.08\le K_1\le 0.12, \text{ and } -3.7\le K_2\le -2.7.$$

The third power adjustment value determined according to the quantity of the resources of the first PUCCH and the ratio of the quantity of the bits of the first uplink control information to the quantity of the resources of the first PUCCH is $10\log_{10}((2^{K_S\cdot BPRE}-1)\cdot\beta_{offset}^{PUCCH})$, where BPRE is a ratio of the quantity of the bits of the first uplink control information to $K_{RE}$, a quantity of modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI.

If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

The user equipment provided in this embodiment of the present invention may be specifically configured to execute the method embodiment provided in FIG. 1. Detailed functions are not described herein again.

This embodiment of the present invention specifically defines characteristics of the PUCCH in the first PUCCH format, to distinguish between the PUCCH in the first PUCCH format and a PUCCH in an existing PUCCH format, and also specifically defines a method for determining the quantity of the resources of the first PUCCH and the quantity of the resources occupied on the first PUCCH by the second uplink control information. This embodiment of the present invention specifically provides an expression for calculating the transmit power according to the sum of the base power adjustment value and any one of the first power adjustment value, the second power adjustment value, the third power adjustment value, the fourth power adjustment value, or the fifth power adjustment value, and provides a method for calculating the transmit power for sending the first uplink control information on the first PUCCH.

Figure 4:
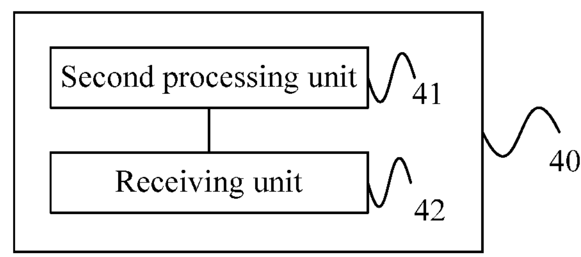
FIG. 4 is a structural diagram of a network device according to an embodiment of the present invention.

FIG. 4 is a structural diagram of a network device according to an embodiment of the present invention. The network device provided in this embodiment of the present invention can execute a processing procedure provided in the embodiments of the power control method for an uplink control channel. As shown in FIG. 4, the network device 40 includes a second processing unit 41 and a receiving unit 42. The first power adjustment value is a power adjustment value determined by the user equipment according to a quantity of bits of the first uplink control information. The second power adjustment value is a power adjustment value determined by the user equipment according to the quantity of the bits of the first uplink control information and a quantity of resources of the first PUCCH. The third power adjustment value is a power adjustment value determined by the user equipment according to the quantity of the resources of the first PUCCH and a ratio of the quantity of the bits of the first uplink control information to the quantity of the resources of the first PUCCH. The fourth power adjustment value is a power adjustment value determined by the user equipment according to the quantity of the resources of the first PUCCH. The fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of second uplink control information to the quantity of the resources of the first PUCCH, where the second uplink control information is a subset of the first uplink control information.

The base power adjustment value includes a sum of $P_{O\_PUCCH}$ and $PL_c$, or the base power adjustment value includes a sum of $P_{O\_PUCCH}$ and $\alpha_c\cdot PL_c$, where $P_{O\_PUCCH}$ is a value configured for the user equipment by the network device by using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

The second processing unit 41 in this embodiment of the present invention may be implemented by a processor.

In this embodiment of the present invention, the transmit power for sending the first uplink control information on the first PUCCH and in the subframe i is determined by the user equipment by using the sum of the base power adjustment value and any one of the first power adjustment value determined according to the quantity of the bits of the first uplink control information that is to be sent on the first PUCCH, the second power adjustment value determined according to the quantity of the bits of the first uplink control information and the quantity of the resources of the first PUCCH, the third power adjustment value determined according to the quantity of the resources of the first PUCCH and the ratio of the quantity of the bits of the first uplink control information to the quantity of the resources of the first PUCCH, the fourth power adjustment value determined according to the quantity of the resources of the first PUCCH, the fifth power adjustment value determined according to the quantity of the resources of the first PUCCH and the ratio of the quantity of the bits of the second uplink control information to the quantity of the resources occupied on the first PUCCH by the second uplink control information, or the fifth power adjustment value determined according to the quantity of the resources of the first PUCCH and the ratio of the quantity of the bits of the second uplink control information to the quantity of the resources of the first PUCCH. Therefore, a method for determining the transmit power for sending the first uplink control information on the first PUCCH is provided.

Based on the foregoing embodiment, the quantity of the bits of the first uplink control information includes a quantity of bits of a cyclic redundancy code CRC corresponding to the first uplink control information, and the quantity of the bits of the second uplink control information includes a quantity of bits of a cyclic redundancy code CRC corresponding to the second uplink control information.

The first PUCCH is in a first physical uplink control channel PUCCH format. The PUCCH in the first PUCCH format is characterized in that:

the PUCCH occupies at least one RB, and in a case of a normal cyclic prefix, only one time-domain symbol in the middle of each timeslot corresponding to the PUCCH bears a demodulation reference signal, or two time-domain symbols in each timeslot bear a demodulation reference signal, or in a case of an extended cyclic prefix, the third time-domain symbol in each timeslot bears a demodulation reference signal; or the PUCCH is capable of encoding the first uplink control information according to a convolutional code encoding manner; or a maximum quantity of bits that are of the first uplink control information and that the PUCCH is capable of bearing is greater than 22.

If a quantity of RBs occupied by the first PUCCH is not greater than $N_u$, the transmit power for sending, by the user equipment, the first uplink control information on the first PUCCH and in the subframe i is a sum of the first power adjustment value and the base power adjustment value, or the transmit power is a sum of the second power adjustment value and the base power adjustment value; or if a quantity of RBs occupied by the first PUCCH is greater than $N_u$, the transmit power for sending, by the user equipment, the first uplink control information on the first PUCCH and in the subframe i is a sum of the third power adjustment value and the base power adjustment value, where $N_u$ is 1, 2, 3, or 4.

The quantity of the resources of the first PUCCH is $K_{RE}$, a quantity of modulation symbols occupied by the first PUCCH.

Alternatively, the quantity of the resources of the first PUCCH is Q', a quantity of bits corresponding to modulation symbols occupied by the first PUCCH, where $Q'=K_{RE}*Q_m$, and $Q_m$ is a modulation order used by the user equipment for sending the first uplink control information on the first PUCCH.

Alternatively, the quantity of the resources of the first PUCCH is $M_{RB}^{PUCCH}(i)$, a quantity of RBs included in the first PUCCH.

The quantity of the resources occupied on the first PUCCH by the second uplink control information is $M_{RE}$, a quantity of modulation symbols occupied on the first PUCCH by the second uplink control information.

Alternatively, the quantity of the resources occupied on the first PUCCH by the second uplink control information is Q", a quantity of bits corresponding to modulation symbols occupied on the first PUCCH by the second uplink control information, where $Q''=M_{RE}*Q_m'$, and $Q_m'$ is a modulation order used by the user equipment for sending the second uplink control information on the first PUCCH.

The first power adjustment value determined according to the quantity of the bits of the first uplink control information is $h'(n_{bit})$ where $n_{bit}(i)$ indicates the quantity of the bits of the first uplink control information sent on the first PUCCH; and if $n_{bit}(i)$ is not greater than 22, $h'(n_{bit}(i))=P_1$, and $6.1\le P\le 8.76$;

if $n_{bit}(i)$ is greater than 22 and $n_{bit}(i)$ is not greater than 64 $h'(n_{bit}(i)=P_2$, and $8.2\le P_2\le 12.12$;

if $n_{bit}(i)$ is greater than 64 and $n_{bit}(i)$ is not greater than 128, $h'(n_{bit}(i)=P_3$, and $11.4\le P_3\le 17.24$; or $$h'(n_{bit}(i))=K_1\cdot n_{bit}(i)+K_2, \text{ where } 0.05\le K_1\le 0.08, \text{ and } 5\le K_2\le 7.$$

The second power adjustment value determined according to the quantity of the bits of the first uplink control information and the quantity of the resources of the first PUCCH is $h'(n_{bit}(i),M_{RB}^{PUCCH}(i))$, where $n_{bit}(i)$ indicates the quantity of the bits of the first uplink control information sent on the first PUCCH, $M_{RB}^{PUCCH}(i)$ is the quantity of the RBs included in the first PUCCH, and a value of $h'(n_{bit}(i), M_{RB}^{PUCCH}(i))$ is determined by $n_{bit}(i)$ and $M_{RB}^{PUCCH}(i)$.

$$h'(n_{bit}(i),M_{RB}^{PUCCH}(i))=10\log_{10}(M_{RB}^{PUCCH}(i))+h'(n_{bit}(i)), \text{ where}$$

when $M_{RB}^{PUCCH}(i)=1$:

if $n_{bit}(i)$ is not greater than 22, $h'(n_{bit}(i))=P_1$, and $6.1\le P_1\le 8.76$;

if $n_{bit}(i)$ is greater than 22 and $n_{bit}(i)$ is not greater than 64, $h'(n_{bit}(i))=P_2$, and $8.2\le P_2\le 12.12$;

if $n_{bit}(i)$ is greater than 64 and $n_{bit}(i)$ is not greater than 128, $h'(n_{bit}(i))=P_3$, and $11.4\le P_3\le 17.24$; or $$h'(n_{bit}(i))=K_1\cdot n_{bit}(i)+K_2, \text{ where } 0.05\le K_1\le 0.08, \text{ and } 5\le K_2\le 7; \text{ or}$$

when $M_{RB}^{PUCCH}(i)=2$:

if $n_{bit}(i)$ is not greater than 22, $h'(n_{bit}(i))=P_1$, and $5.9\le P_1\le 8.4$;

if $n_{bit}(i)$ is greater than 22 and $n_{bit}(i)$ is not greater than 64, $h'(n_{bit}(i))=P_2$, and $6.8\le P_2\le 10$;

if $n_{bit}(i)$ is greater than 64 and $n_{bit}(i)$ is not greater than 128, $h'(n_{bit}(i))=P_3$, and $8\le P_3\le 12.6$;

if $n_{bit}(i)$ is greater than 128 and $n_{bit}(i)$ is not greater than 256, $h'(n_{bit}(i))=P_4$, and $10.6 \le P_4 \le 17.7$; or $$h'(n_{bit}(i))=K_1 \cdot n_{bit}(i)+K_2, \text{ where } 0.02 \le K_1 \le 0.04, \text{ and } 5.5 \le K_2 \le 7.5.$$

The second power adjustment value determined according to the quantity of the bits of the first uplink control information and the quantity of the resources of the first PUCCH is $h'(n'_{bit}(i),M_{RB}^{PUCCH}(i))$, where $n'_{bit}(i)$ indicates a quantity of bits obtained by subtracting the quantity of the bits of the cyclic redundancy code CRC corresponding to the second uplink control information from the quantity of the bits of the second uplink control information, $M_{RB}^{PUCCH}(i)$ is the quantity of the RBs included in the first PUCCH, and a value of $h'(n_{bit}(i),M_{RB}^{PUCCH}(i))$ is determined by $n'_{bit}(i)$ and $M_{RB}^{PUCCH}(i)$.

$$h'(n'_{bit}(i),M_{RB}^{PUCCH}(i))=10\log_{10}(M_{RB}^{PUCCH}(i))+h'(n'_{bit}(i)), \text{ where}$$

when $M_{RB}^{PUCCH}(i)=1$, $h'(n'_{bit}(i))=K_1 \times n'_{bit}(i)+K_2$, where $0.05 \le K_1 \le 0.08$; and $-1.6 \le K_2 \le -0.7$; or when $M_{RB}^{PUCCH}(i)=2$, $h'(n'_{bit}(i))=K_1 \times n'_{bit}(i)+K_2$, where $0.03 \le K_1 \le 0.05$, and $-0.3 \le K_2 \le 0.5$.

$$h'(n'_{bit}(i),M_{RB}^{PUCCH}(i))=10\log_{10}(M_{RB}^{PUCCH}(i))+h'(n'_{bit}(i)), \text{ where}$$

when $M_{RB}^{PUCCH}(i)=1$, $h'(n'_{bit}(i))=K_1 \times (n'_{bit}(i)+8)+K_2$, where $0.05 \le K_1 \le 0.075$, and $-2.2 \le K_2 \le -1.1$; or when $M_{RB}^{PUCCH}(i)=2$, $h'(n'_{bit}(i))=K_1 \times (n'_{bit}(i)+8)+K_2$, where $0.03 \le K_1 \le 0.08$, and $-0.6 \le K_2 \le 0.1$.

The third power adjustment value determined according to the quantity of the resources of the first PUCCH and the ratio of the quantity of the bits of the first uplink control information to the quantity of the resources of the first PUCCH is $k(m(i),M_{RB}^{PUCCH}(i))$, where $m(i)$ indicates the ratio of the quantity of the bits of the first uplink control information sent by the user equipment on the first PUCCH to the quantity of the resources of the first PUCCH, and a value of $k(m(i),M_{RB}^{PUCCH}(i))$ is determined by $m(i)$ and $M_{RB}^{PUCCH}(i)$.

When the quantity of the resources of the first PUCCH is $M_{RB}^{PUCCH}(i)$, the quantity of the RBs included in the first PUCCH, $k(m(i),M_{RB}^{PUCCH}(i))=10\log_{10}(M_{RB}^{PUCCH}(i))+q'(m(i))$, where when $M_{RB}^{PUCCH}(i)=1$:

if $m(i)$ is not greater than 22, $q'(m(i))=P_1$, and $6.1 \le P_1 \le 8.76$;

if $m(i)$ is greater than 22 and $m(i)$ is not greater than 64, $q'(m(i))=P_2$, and $8.2 \le P_2 \le 12.12$;

if $m(i)$ is greater than 64 and $m(i)$ is not greater than 128, $q'(m(i))=P_3$, and $11.4 \le P_3 \le 17.24$; or $$q'(m(i))=K_1 \cdot m(i)+K_2, \text{ where } 0.05 \le K_1 \le 0.08, \text{ and } 5 \le K_2 \le 7; \text{ or}$$

when $M_{RB}^{PUCCH}(i)=2$:

if $m(i)$ is not greater than 22, $q'(m(i))=P_1$, and $5.9 \le P_1 \le 8.4$;

if $m(i)$ is greater than 22 and $m(i)$ is not greater than 64, $q'(m(i))=P_2$, and $6.8 \le P_2 \le 10$;

if $m(i)$ is greater than 64 and $m(i)$ is not greater than 128, $q'(m(i))=P_3$, and $8 \le P_3 \le 12.6$;

if $m(i)$ is greater than 128 and $m(i)$ is not greater than 256, $q'(m(i))=P_4$, and $10.6 \le P_4 \le 17.7$; or $$q'(m(i))=K_1 \cdot m(i)+K_2, \text{ where } 0.02 \le K_1 \le 0.04, \text{ and } 5.5 \le K_2 \le 7.5.$$

When the quantity of the resources of the first PUCCH is $K_{RE}$, the quantity of the modulation symbols occupied by the first PUCCH, $k(m(i),M_{RB}^{PUCCH}(i))=10\log_{10}(M_{RB}^{PUCCH}(i))+q'(m(i))$, where when $M_{RB}^{PUCCH}(i)=1$, $q'(m(i))=K_1 \cdot m(i)+K_2$, where $8 \le K_1 \le 11$, and $5 \le K_2 \le 7$; or when $M_{RB}^{PUCCH}(i)=2$, $q'(m(i))=K_1 \cdot m(i)+K_2$, where $8.5 \le K_1 \le 10.5$, and $6 \le K_2 \le 8$.

The determining the third power adjustment value according to the quantity of the resources of the first PUCCH and the ratio of the quantity of the bits of the first uplink control information to the quantity of the resources of the first PUCCH includes:

determining the third power adjustment value according to a ratio of the quantity of the bits of the first uplink control information to $K_{RE}$, the quantity of the modulation symbols occupied by the first PUCCH, where the third power adjustment value is $10\log_{10}(M_{RB}^{PUCCH}(i))+10\log_{10}((2^{K_S \cdot BPRE}-1)\cdot\beta_{offset}^{PUCCH})$, where $M_{RB}^{PUCCH}(i)$ is the quantity of the RBs included in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI.

If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

The fourth power adjustment value determined according to the quantity of the resources of the first PUCCH is $10\log_{10}(M_{RB}^{PUCCH}(i)$, where $M_{RB}^{PUCCH}(i)$ is the quantity of the RBs included in the first PUCCH.

The fifth power adjustment value determined according to the quantity of the resources of the first PUCCH and the ratio of the quantity of the bits of the second uplink control information to the quantity of the resources occupied on the first PUCCH by the second uplink control information or the fifth power adjustment value determined according to the quantity of the resources of the first PUCCH and the ratio of the quantity of the bits of the second uplink control information to the quantity of the resources of the first PUCCH is $R(r(i),M_{RB}^{PUCCH}(i))$, where $r(i)$ indicates the ratio of the quantity of the bits of the second uplink control information to the quantity of the resources occupied on the first PUCCH by the second uplink control information or the ratio of the quantity of the bits of the second uplink control information to the quantity of the resources of the first PUCCH, and a value of $R(r(i),M_{RB}^{PUCCH}(i))$ is determined by $r(i)$ and $M_{RB}^{PUCCH}(i)$.

The first PUCCH is in a third physical uplink control channel PUCCH format. The PUCCH in the third PUCCH format is characterized in that:

the PUCCH occupies one RB, and in a case of a normal cyclic prefix, only one time-domain symbol in the middle of each timeslot corresponding to the PUCCH bears a demodulation reference signal, or in a case of an extended cyclic prefix, the third time-domain symbol in each timeslot bears a demodulation reference signal, where uplink control information of at least two user equipments is capable of being sent on the PUCCH by means of code division; or the PUCCH is capable of encoding the first uplink control information according to a convolutional code encoding manner; or a maximum quantity of bits that are of the first uplink control information and that the PUCCH is capable of bearing is greater than 22.

The first power adjustment value determined according to the quantity of the bits of the first uplink control information is $k(n_{bit}(i))$, where $n_{bit}(i)$ indicates the quantity of the bits of the first uplink control information sent on the first PUCCH; and $$k'(n_{bit}(i))=K_1\cdot n_{bit}(i)+K_2,\text{ where }0.08\leq K_1\leq 0.12,\text{ and }-3.7\leq K_2\leq -2.7.$$

The third power adjustment value determined according to the quantity of the resources of the first PUCCH and the ratio of the quantity of the bits of the first uplink control information to the quantity of the resources of the first PUCCH is $10\log_{10}((2^{K_S\cdot BPRE}-1)\cdot\beta_{offset}^{PUCCH})$, where BPRE is a ratio of the quantity of the bits of the first uplink control information to $K_{RE}$, a quantity of modulation symbols occupied by the first PUCCH, $\beta_{offset}^{PUCCH}$ is a value configured for the user equipment by the network device by using higher layer signaling, and $K_S$ is a value configured for the user equipment by the network device by using higher layer signaling.

$\beta_{offset}^{PUCCH}$ is a parameter used to determine a quantity of modulation symbols in a PUSCH resource that are occupied when first-type uplink control information is sent on a PUSCH, where the first-type uplink control information is any one of the following:

a channel quality indicator CQI and/or a precoding matrix indicator PMI;

a hybrid automatic repeat request HARQ-ACK; or a rank indication RI.

If the first uplink control information includes the HARQ-ACK or the RI, the first-type uplink control information is the HARQ-ACK or the RI; or if the first uplink control information does not include the HARQ-ACK and the RI, the first-type uplink control information is the CQI and/or the PMI.

The network device provided in this embodiment of the present invention may be specifically configured to execute the method embodiment provided in FIG. 2. Detailed functions are not described herein again.

This embodiment of the present invention specifically defines characteristics of the PUCCH in the first PUCCH format, to distinguish between the PUCCH in the first PUCCH format and a PUCCH in an existing PUCCH format, and also specifically defines a method for determining the quantity of the resources of the first PUCCH and the quantity of the resources occupied on the first PUCCH by the second uplink control information. This embodiment of the present invention specifically provides an expression for calculating the transmit power according to the sum of the base power adjustment value and any one of the first power adjustment value, the second power adjustment value, the third power adjustment value, the fourth power adjustment value, or the fifth power adjustment value, and provides a method for calculating the transmit power for sending the first uplink control information on the first PUCCH.

Figure 5:
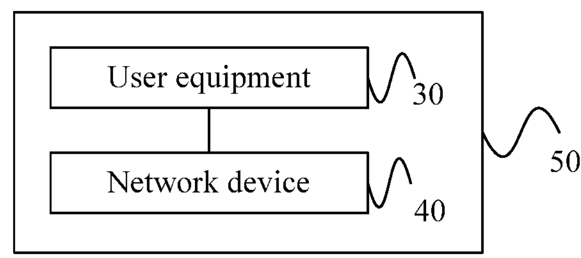
FIG. 5 is a structural diagram of a power control system for an uplink control channel according to an embodiment of the present invention.

FIG. 5 is a structural diagram of a power control system for an uplink control channel according to an embodiment of the present invention. The power control system for an uplink control channel that is provided in this embodiment of the present invention can execute a processing procedure provided in the embodiments of the power control method for an uplink control channel. As shown in FIG. 5, the power control system 50 for an uplink control channel includes the user equipment 30 and the network device 40 that are described in the foregoing embodiments.

The power control system for an uplink control channel that is provided in this embodiment of the present invention can execute the processing procedure provided in the embodiments of the power control method for an uplink control channel.

To sum up, in this embodiment of the present invention, transmit power for sending first uplink control information on a first PUCCH and in a subframe i is determined by the user equipment by using a sum of a base power adjustment value and any one of a first power adjustment value determined according to a quantity of bits of the first uplink control information that is to be sent on the first PUCCH, a second power adjustment value determined according to the quantity of the bits of the first uplink control information and a quantity of resources of the first PUCCH, a third power adjustment value determined according to the quantity of the resources of the first PUCCH and a ratio of the quantity of the bits of the first uplink control information to the quantity of the resources of the first PUCCH, a fourth power adjustment value determined according to the quantity of the resources of the first PUCCH, a fifth power adjustment value determined according to the quantity of the resources of the first PUCCH and a ratio of a quantity of bits of second uplink control information to a quantity of resources occupied on the first PUCCH by the second uplink control information, or the fifth power adjustment value determined according to the quantity of the resources of the first PUCCH and a ratio of a quantity of bits of second uplink control information to the quantity of the resources of the first PUCCH. Therefore, a method for determining the transmit power for sending the first uplink control information on the first PUCCH is provided. This embodiment of the present invention specifically defines characteristics of a PUCCH in a first PUCCH format, to distinguish between the PUCCH in the first PUCCH format and a PUCCH in an existing PUCCH format, and also specifically defines a method for determining the quantity of the resources of the first PUCCH and the quantity of the resources occupied on the first PUCCH by the second uplink control information. This embodiment of the present invention specifically provides an expression for calculating the transmit power according to the sum of the base power adjustment value and any one of the first power adjustment value, the second power adjustment value, the third power adjustment value, the fourth power adjustment value, or the fifth power adjustment value, and provides a method for calculating the transmit power for sending the first uplink control information on the first PUCCH.

In the several embodiments provided in the present invention, it should be understood that the disclosed apparatus and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be indirect couplings or communication connections implemented by using some interfaces, apparatuses or units, and may be implemented in electrical, mechanical, or other forms.

The units described as separate parts may or may not be physically separated. Parts shown as units may or may not be physical units, and may be located in one position or distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A power control method for a physical uplink control channel (PUCCH), comprising:

determining, by user equipment, to send first uplink control information on a first PUCCH and in a subframe i, wherein the first uplink control information comprises channel state information (CSI), a hybrid automatic repeat request-acknowledgment (HARQ-ACK), and/or a scheduling request (SR);

determining, by the user equipment, transmit power for sending the first uplink control information on the first PUCCH and in the subframe i, wherein the transmit power is a sum of a base power adjustment value and any one of a first power adjustment value, a second power adjustment value, a third power adjustment value, a fourth power adjustment value, or a fifth power adjustment value; and sending, by the user equipment, the first uplink control information on the first PUCCH by using power that is not greater than the transmit power, wherein (a) the first power adjustment value is a power adjustment value determined by the user equipment according to a quantity of bits of the first uplink control information, (b) the second power adjustment value is a power adjustment value determined by the user equipment according to the quantity of the bits of the first uplink control information and a quantity of resources of the first PUCCH, (c) the third power adjustment value is a power adjustment value determined by the user equipment according to the quantity of the resources of the first PUCCH and a ratio of the quantity of the bits of the first uplink control information to the quantity of the resources of the first PUCCH, (d) the fourth power adjustment value is a power adjustment value determined by the user equipment according to the quantity of the resources of the first PUCCH, and the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or (e) the fifth power adjustment value is a power adjustment value determined by the user equipment according to the quantity of the resources of the first PUCCH and a ratio of a quantity of bits of the second uplink control information to the quantity of the resources of the first PUCCH, wherein the second uplink control information is a subset of the first uplink control information; and the base power adjustment value comprises a sum of $P_{O\_PUCCH}$ and $PL_c$, or the base power adjustment value comprises a sum of $P_{O\_PUCCH}$ and $\alpha_c \cdot PL_c$, wherein $P_{O\_PUCCH}$ is a value configured for the user equipment by a network device by using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

2. The method according to claim 1, wherein the quantity of the bits of the first uplink control information comprises a quantity of bits of a cyclic redundancy code (CRC) associated with the first uplink control information, and the quantity of the bits of the second uplink control information comprises a quantity of bits of a cyclic redundancy code (CRC) associated with the second uplink control information.

3. The method according to claim 1, wherein the first PUCCH is in a first PUCCH format, and the first PUCCH in the first PUCCH format satisfies one of the following:

(a) the PUCCH occupies at least one resource block (RB), and in a case of a normal cyclic prefix, only one time-domain symbol in the middle of each timeslot associated with the PUCCH bears a demodulation reference signal, or two time-domain symbols in each timeslot bear a demodulation reference signal, or in a case of an extended cyclic prefix, the third time-domain symbol in each timeslot bears a demodulation reference signal;

(b) the PUCCH encodes the first uplink control information according to a convolutional code encoding manner; or (c) a maximum quantity of bits that are of the first uplink control information and that the PUCCH bears is greater than 22.

4. The method according to claim 1, wherein the quantity of the resources of the first PUCCH is one of the following:

(a) $K_{RE}$, which is a quantity of modulation symbols occupied by the first PUCCH;

(b) Q', which is a quantity of bits corresponding to modulation symbols occupied by the first PUCCH, wherein $Q'=K_{RE}*Q_m$, and $Q_m$ is a modulation order used by the user equipment for sending the first uplink control information on the first PUCCH; or (c) $M_{RB}^{PUCCH}(i)$, which is a quantity of resource blocks (RBs) comprised in the first PUCCH; and wherein the quantity of the resources occupied on the first PUCCH by the second uplink control information is one of the following:

(i) $M_{RE}$, which is a quantity of modulation symbols occupied on the first PUCCH by the second uplink control information; or (ii) Q', which is a quantity of bits associated with modulation symbols occupied on the first PUCCH by the second uplink control information, wherein $Q'=M_{RE}*Q_m'$, and $Q_m'$ is a modulation order used by the user equipment for sending the second uplink control information on the first PUCCH.

5. The method according to claim 1, wherein determining the third power adjustment value comprises:

determining the third power adjustment value according to a ratio of the quantity of the bits of the first uplink control information to $K_{RE}$, which is the quantity of the modulation symbols occupied by the first PUCCH, wherein the third power adjustment value is $10\,\mathrm{Log}_{10}(M_{RB}^{PUCCH}(i))+10\,\log_{10}((2^{K_s BPRE}-1)\cdot\beta_{offset}^{PUCCH})$, wherein $M_{RB}^{PUCCH}(i)$ is the quantity of the RBs comprised in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device using the higher layer signaling, and $K_s$ is a value configured for the user equipment by the network device using the higher layer signaling.

6. A power control method for a physical uplink control channel (PUCCH), comprising:

determining, by a network device, that user equipment is to send first uplink control information on a first PUCCH and in a subframe i, wherein the first uplink control information comprises channel state information CSI, a hybrid automatic repeat request-acknowledgment (HARQ-ACK), and/or a scheduling request (SR);

determining, by the network device, transmit power for sending, by the user equipment, the first uplink control information on the first PUCCH and in the subframe i, wherein the transmit power is a sum of a base power adjustment value and any one of a first power adjustment value, a second power adjustment value, a third power adjustment value, a fourth power adjustment value, or a fifth power adjustment value; and receiving, by the network device, the first uplink control information that is sent by the user equipment on the first PUCCH by using power that is not greater than the transmit power, wherein (a) the first power adjustment value is a power adjustment value determined by the user equipment according to a quantity of bits of the first uplink control information, (b) the second power adjustment value is a power adjustment value determined by the user equipment according to the quantity of the bits of the first uplink control information and a quantity of resources of the first PUCCH, (c) the third power adjustment value is a power adjustment value determined by the user equipment according to the quantity of the resources of the first PUCCH and a ratio of the quantity of the bits of the first uplink control information to the quantity of the resources of the first PUCCH, (d) the fourth power adjustment value is a power adjustment value determined by the user equipment according to the quantity of the resources of the first PUCCH, and (e) the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of the second uplink control information to the quantity of the resources of the first PUCCH, wherein the second uplink control information is a subset of the first uplink control information; and the base power adjustment value comprises a sum of $P_{O\_PUCCH}$ and $PL_c$, or the base power adjustment value comprises a sum of $P_{O\_PUCCH}$ and $\alpha_c\cdot PL_c$, wherein $P_{O\_PUCCH}$ is a value configured for the user equipment by the network device using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

7. The method according to claim 6, wherein the quantity of the bits of the first uplink control information comprises a quantity of bits of a cyclic redundancy code (CRC) associated with the first uplink control information, and the quantity of the bits of the second uplink control information comprises a quantity of bits of a cyclic redundancy code (CRC) associated with the second uplink control information.

8. The method according to claim 6, wherein the first PUCCH is in a first PUCCH format, and the first PUCCH in the first PUCCH format satisfies one of the following:

(a) the PUCCH occupies at least one resource block (RB), and in a case of a normal cyclic prefix, only one time-domain symbol in the middle of each timeslot associated with the PUCCH bears a demodulation reference signal, or two time-domain symbols in each timeslot bear a demodulation reference signal, or in a case of an extended cyclic prefix, the third time-domain symbol in each timeslot bears a demodulation reference signal;

(b) the PUCCH encodes the first uplink control information according to a convolutional code encoding manner; or (c) a maximum quantity of bits that are of the first uplink control information and that the PUCCH bears is greater than 22.

9. The method according to claim 6, wherein the quantity of the resources of the first PUCCH is one of the following:

(a) $K_{RE}$, which is a quantity of modulation symbols occupied by the first PUCCH;

(b) Q', which is a quantity of bits corresponding to modulation symbols occupied by the first PUCCH, wherein $Q'K_{RE}*Q_m$, and $Q_m$ is a modulation order used by the user equipment for sending the first uplink control information on the first PUCCH; or (c) $M_{RB}^{PUCCH}(i)$, which is a quantity of resource blocks (RBs) comprised in the first PUCCH; and wherein the quantity of the resources occupied on the first PUCCH by the second uplink control information is one of the following:

(i) $M_{RE}$, which is a quantity of modulation symbols occupied on the first PUCCH by the second uplink control information; or (ii) Q", which is a quantity of bits associated with modulation symbols occupied on the first PUCCH by the second uplink control information, wherein $Q''=M_{RE}*Q_m''$, and $Q_m'$ is a modulation order used by the user equipment for sending the second uplink control information on the first PUCCH.

10. The method according to claim 6, wherein determining the third power adjustment value comprises:

determining the third power adjustment value according to a ratio of the quantity of the bits of the first uplink control information to $K_{RE}$, which is equal to the quantity of the modulation symbols occupied by the first PUCCH, wherein the third power adjustment value is $10\log_{10}(M_{RB}^{PUCCH}(i))+10\log_{10}((2^{K_S \cdot BPRE}-1)\cdot\beta_{offset}^{PUCCH})$, wherein $M_{RB}^{PUCCH}(i)$ is the quantity of the RBs comprised in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device using the higher layer signaling, and $K_S$ is a value configured for the user equipment by the network device using the higher layer signaling.

11. User equipment, comprising:

a processor; and a memory coupled to the processor, storing processor-readable medium which when executed causes the processor to implement operations including:

determining that first uplink control information is to be sent on a first physical uplink control channel (PUCCH) and in a subframe i, wherein the first uplink control information comprises channel state information (CSI), a hybrid automatic repeat request-acknowledgment (HARQ-ACK), and/or a scheduling request (SR);

determining transmit power for sending the first uplink control information on the first PUCCH and in the subframe i, wherein the transmit power is a sum of a base power adjustment value and any one of a first power adjustment value, a second power adjustment value, a third power adjustment value, a fourth power adjustment value, or a fifth power adjustment value; and sending the first uplink control information on the first PUCCH by using power that is not greater than the transmit power, wherein (a) the first power adjustment value is a power adjustment value determined by the user equipment according to a quantity of bits of the first uplink control information, (b) the second power adjustment value is a power adjustment value determined by the user equipment according to the quantity of the bits of the first uplink control information and a quantity of resources of the first PUCCH, (c) the third power adjustment value is a power adjustment value determined by the user equipment according to the quantity of the resources of the first PUCCH and a ratio of the quantity of the bits of the first uplink control information to the quantity of the resources of the first PUCCH, (d) the fourth power adjustment value is a power adjustment value determined by the user equipment according to the quantity of the resources of the first PUCCH, and (e) the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of the second uplink control information to the quantity of the resources of the first PUCCH, wherein the second uplink control information is a subset of the first uplink control information; and the base power adjustment value comprises a sum of $P_{O\_PUCCH}$ and $PL_c$, or the base power adjustment value comprises a sum of $P_{O\_PUCCH}$ and $\alpha_c \cdot PL_c$, wherein $O_{O\_PUCCH}$ is a value configured for the user equipment by the network device using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

12. The user equipment according to claim 11, wherein the quantity of the bits of the first uplink control information comprises a quantity of bits of a cyclic redundancy code (CRC) associated with the first uplink control information, and the quantity of the bits of the second uplink control information comprises a quantity of bits of a cyclic redundancy code (CRC) associated with the second uplink control information.

13. The user equipment according to claim 11, wherein the first PUCCH is in a first PUCCH format, and the first PUCCH in the first PUCCH format satisfies one of the following:

(a) the PUCCH occupies at least one resource block (RB), and in a case of a normal cyclic prefix, only one time-domain symbol in the middle of each timeslot associated with the PUCCH bears a demodulation reference signal, or two time-domain symbols in each timeslot bear a demodulation reference signal, or in a case of an extended cyclic prefix, the third time-domain symbol in each timeslot bears a demodulation reference signal; or (b) the PUCCH encodes the first uplink control information according to a convolutional code encoding manner; or (c) a maximum quantity of bits that are of the first uplink control information and that the PUCCH bears is greater than 22.

14. The user equipment according to claim 11, wherein the quantity of the resources of the first PUCCH is one of the following:

(a) $K_{RE}$, which is a quantity of modulation symbols occupied by the first PUCCH;

(b) Q' which is a quantity of bits corresponding to modulation symbols occupied by the first PUCCH, wherein $Q'=K_{RE}*Q_m$, and $Q_m$ is a modulation order used by the user equipment for sending the first uplink control information on the first PUCCH; or (c) $M_{RB}^{PUCCH}(i)$, which is a quantity of resource blocks (RBs) comprised in the first PUCCH; and wherein the quantity of the resources occupied on the first PUCCH by the second uplink control information is one of the following:

(i) $M_{RE}$, a quantity of modulation symbols occupied on the first PUCCH by the second uplink control information; or (ii) Q", a quantity of bits associated with modulation symbols occupied on the first PUCCH by the second uplink control information, wherein $Q''=M_{RE}*Q_m'$, and $Q_m'$ is a modulation order used by the user equipment for sending the second uplink control information on the first PUCCH.

15. The user equipment according to claim 11, wherein the operation of determining the third power adjustment value comprises:

determining the third power adjustment value according to a ratio of the quantity of the bits of the first uplink control information to $K_{RE}$, which is the quantity of the modulation symbols occupied by the first PUCCH, wherein the third power adjustment value is $10\log_{10}(M_{RB}^{PUCCH}(i))+10\log_{10}((2^{K_S \cdot BPRE}-1)\cdot\beta_{offset}^{PUCCH})$, wherein $M_{RB}^{PUCCH}(i)$ is the quantity of the RBs comprised in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device using the higher layer signaling, and $K_S$ is a value configured for the user equipment by the network device using the higher layer signaling.

16. A network device, comprising:

a processor; and a memory coupled to the processor, storing processor-readable instructions which when executed causes the processor to implement operations including:

determining that user equipment is to send first uplink control information on a first physical uplink control channel (PUCCH) and in a subframe i, wherein the first uplink control information comprises channel state information (CSI), a hybrid automatic repeat request-acknowledgment (HARQ-ACK), and/or a scheduling request (SR);

determining transmit power for sending the first uplink control information on the first PUCCH and in the subframe i, wherein the transmit power is a sum of a base power adjustment value and any one of a first power adjustment value, a second power adjustment value, a third power adjustment value, a fourth power adjustment value, or a fifth power adjustment value; and receiving the first uplink control information that is sent by the user equipment on the first PUCCH by using power that is not greater than the transmit power, wherein (a) the first power adjustment value is a power adjustment value determined by the user equipment according to a quantity of bits of the first uplink control information, (b) the second power adjustment value is a power adjustment value determined by the user equipment according to the quantity of the bits of the first uplink control information and a quantity of resources of the first PUCCH, (c) the third power adjustment value is a power adjustment value determined by the user equipment according to the quantity of the resources of the first PUCCH and a ratio of the quantity of the bits of the first uplink control information to the quantity of the resources of the first PUCCH, (d) the fourth power adjustment value is a power adjustment value determined by the user equipment according to the quantity of the resources of the first PUCCH, and (e) the fifth power adjustment value is a power adjustment value determined by the user equipment according to the quantity of the resources of the first PUCCH and a ratio of a quantity of bits of second uplink control information to a quantity of resources occupied on the first PUCCH by the second uplink control information, or the fifth power adjustment value is a power adjustment value determined by the user equipment according to the quantity of the resources of the first PUCCH and a ratio of a quantity of bits of the second uplink control information to the quantity of the resources of the first PUCCH, wherein the second uplink control information is a subset of the first uplink control information; and the base power adjustment value comprises a sum of $P_{O\_PUCCH}$ and $PL_c$, or the base power adjustment value comprises a sum of $P_{O\_PUCCH}$ and $\alpha_c \cdot PL_c$, wherein $P_{O\_PUCCH}$ is a value configured for the user equipment by the network device using higher layer signaling;

$PL_c$ is a path loss that is determined by the user equipment and that is of a downlink of a cell c in which the first PUCCH is located; and $\alpha_c$ is a path loss factor that is configured for the user equipment by the network device and that is of the cell c in which the first PUCCH is located.

17. The network device according to claim 16, wherein the quantity of the bits of the first uplink control information comprises a quantity of bits of a cyclic redundancy code (CRC) associated with the first uplink control information, and the quantity of the bits of the second uplink control information comprises a quantity of bits of a cyclic redundancy code (CRC) associated with the second uplink control information.

18. The network device according to claim 16, wherein the first PUCCH is in a first PUCCH format, and the first PUCCH in the first PUCCH format satisfies one of the following:

(a) the PUCCH occupies at least one resource block (RB), and in a case of a normal cyclic prefix, only one time-domain symbol in the middle of each timeslot corresponding to the PUCCH bears a demodulation reference signal, or two time-domain symbols in each timeslot bear a demodulation reference signal, or in a case of an extended cyclic prefix, the third time-domain symbol in each timeslot bears a demodulation reference signal;

(b) the PUCCH encodes the first uplink control information according to a convolutional code encoding manner; or (c) a maximum quantity of bits that are of the first uplink control information and that the PUCCH bears is greater than 22.

19. The network device according to claim 16, wherein the quantity of the resources of the first PUCCH is one of the following:

(a) $K_{RE}$, which is a quantity of modulation symbols occupied by the first PUCCH;

(b) Q', which is a quantity of bits associated with modulation symbols occupied by the first PUCCH, wherein $Q'=K_{RE}*Q_m$, and $Q_m$ is a modulation order used by the user equipment for sending the first uplink control information on the first PUCCH; or (c) $M_{RB}^{PUCCH}(i)$, which is a quantity of resource blocks (RBs) comprised in the first PUCCH; and wherein the quantity of the resources occupied on the first PUCCH by the second uplink control information is one of the following:

(i) $M_{RE}$, a quantity of modulation symbols occupied on the first PUCCH by the second uplink control information; or (ii) the quantity of the resources occupied on the first PUCCH by the second uplink control information is Q", a quantity of bits associated with modulation symbols occupied on the first PUCCH by the second uplink control information, wherein $Q''=M_{RE}*Q_m'$, and $Q_m'$ is a modulation order used by the user equipment for sending the second uplink control information on the first PUCCH.

20. The network device according to claim 16, wherein the operation of determining the third power adjustment value comprises:

determining the third power adjustment value according to a ratio of the quantity of the bits of the first uplink control information to $K_{RE}$, which is the quantity of the modulation symbols occupied by the first PUCCH, wherein the third power adjustment value is $10\log_{10}(M_{RB}^{PUCCH}(i))+10\log_{10}((2^{K_S BPRE}-1)\cdot\beta_{offset}^{PUCCH})$, wherein $M_{RB}^{PUCCH}(i)$ is the quantity of the RBs comprised in the first PUCCH, BPRE is the ratio of the quantity of the bits of the first uplink control information to $K_{RE}$, the quantity of the modulation symbols occupied by the first PUCCH, $\beta_{offset}^{PUCCH}$ is a value configured for the user equipment by the network device using the higher layer signaling, and $K_S$ is a value configured for the user equipment by the network device using the higher layer signaling.

* * * * *